(12) United States Patent
Fenton

(10) Patent No.: US 8,104,411 B2
(45) Date of Patent: Jan. 31, 2012

(54) SUPPORT DEVICE FOR ATTACHMENT TO EXERCISE EQUIPMENT AND OTHER APPARATUS

(76) Inventor: James R. Fenton, Redondo Beach, CA (US)

( * ) Notice: Subject to any disclaimer, the term of this patent is extended or adjusted under 35 U.S.C. 154(b) by 586 days.

(21) Appl. No.: 12/005,131

(22) Filed: Dec. 21, 2007

(65) Prior Publication Data

US 2008/0197248 A1    Aug. 21, 2008

Related U.S. Application Data

(60) Provisional application No. 60/877,054, filed on Dec. 26, 2006, provisional application No. 60/920,159, filed on Mar. 27, 2007.

(51) Int. Cl.
*A47B 23/00* (2006.01)
(52) U.S. Cl. .......................................... 108/42; 108/152
(58) Field of Classification Search .................. 108/42, 108/40, 47, 46, 33, 44, 108, 185, 152, 50.01, 108/50.02; 482/148; 248/444.1, 441.1
See application file for complete search history.

(56) References Cited

U.S. PATENT DOCUMENTS

| | | | | | |
|---|---|---|---|---|---|
| 491,093 | A | * | 2/1893 | Edgerton | 108/47 |
| 1,174,755 | A | * | 3/1916 | Mullen | 108/47 |
| 2,768,043 | A | * | 10/1956 | Kristoff et al. | 108/46 |
| 4,357,881 | A | * | 11/1982 | De Long | 108/49 |
| 4,620,488 | A | * | 11/1986 | Formo | 108/46 |
| 4,877,284 | A | * | 10/1989 | Doane | 108/46 |
| 4,909,158 | A | * | 3/1990 | Sorensen | 108/40 |
| 5,060,581 | A | | 10/1991 | Malinski | |
| 5,158,023 | A | * | 10/1992 | Allen | 108/42 |
| 5,257,701 | A | | 11/1993 | Edelson | |
| D344,625 | S | * | 3/1994 | Berry | D12/416 |
| 5,411,192 | A | * | 5/1995 | Xiao | 108/42 |
| 5,487,521 | A | | 1/1996 | Callahan | |
| 5,527,084 | A | * | 6/1996 | Scherf | 108/152 |
| 5,720,465 | A | | 2/1998 | Peltzer et al. | |
| 5,755,411 | A | * | 5/1998 | Strong et al. | 108/44 |
| 5,813,947 | A | | 9/1998 | Densmore | |
| 6,148,738 | A | | 11/2000 | Richter | |
| 6,273,310 | B1 | | 8/2001 | Gregory | |
| 6,520,894 | B1 | | 2/2003 | Mesloh | |
| 2001/0003961 | A1 | * | 6/2001 | Hodge et al. | 108/42 |
| 2002/0043909 | A1 | | 4/2002 | Nielson | |

(Continued)

FOREIGN PATENT DOCUMENTS

GB        2150882 A   *  7/1985

OTHER PUBLICATIONS

PCT International Searching Authority Invitation to Pay Additional Fees, International Appl. No. PCT/US2007/026218, filing date Dec. 21, 2007.

(Continued)

*Primary Examiner* — Jose V Chen

(57) ABSTRACT

A device for supporting equipment and for attaching to an apparatus. The device includes a tray which supports the equipment and which includes a mounting location. The device also includes a back plate which is configured to engage the mounting location. The back plate is also attached to the apparatus. The mounting location may include a tooth and notch, a step or other types of mounts that engage the back plate. The device is suitable for supporting a computer or other equipment, and for attaching to an exercise apparatus or other apparatus.

20 Claims, 62 Drawing Sheets

U.S. PATENT DOCUMENTS

| | | |
|---|---|---|
| 2004/0094677 A1 | 5/2004 | Guo et al. |
| 2006/0247109 A1 | 11/2006 | Powell |
| 2006/0258513 A1 | 11/2006 | Routley et al. |
| 2007/0069101 A1 | 3/2007 | Shevin-Sandy |

OTHER PUBLICATIONS

Patent Cooperation Treaty, Notification of Transmittal of the International Search Report and the Written Opinion of the International Searching Authority or the Declaration, Jul. 31, 2008, International Application No. PCT/US2007/026218, European Patent Office.

Patent Cooperation Treaty, International Search Report, Apr. 11, 2008, International Application No. PCT/US2007/026218, European Patent Office.

Patent Cooperation Treaty, Written Opinion of the International Searching Authority, Jul. 31, 2008, International Application No. PCT/US2007/026218, European Patent Office.

* cited by examiner

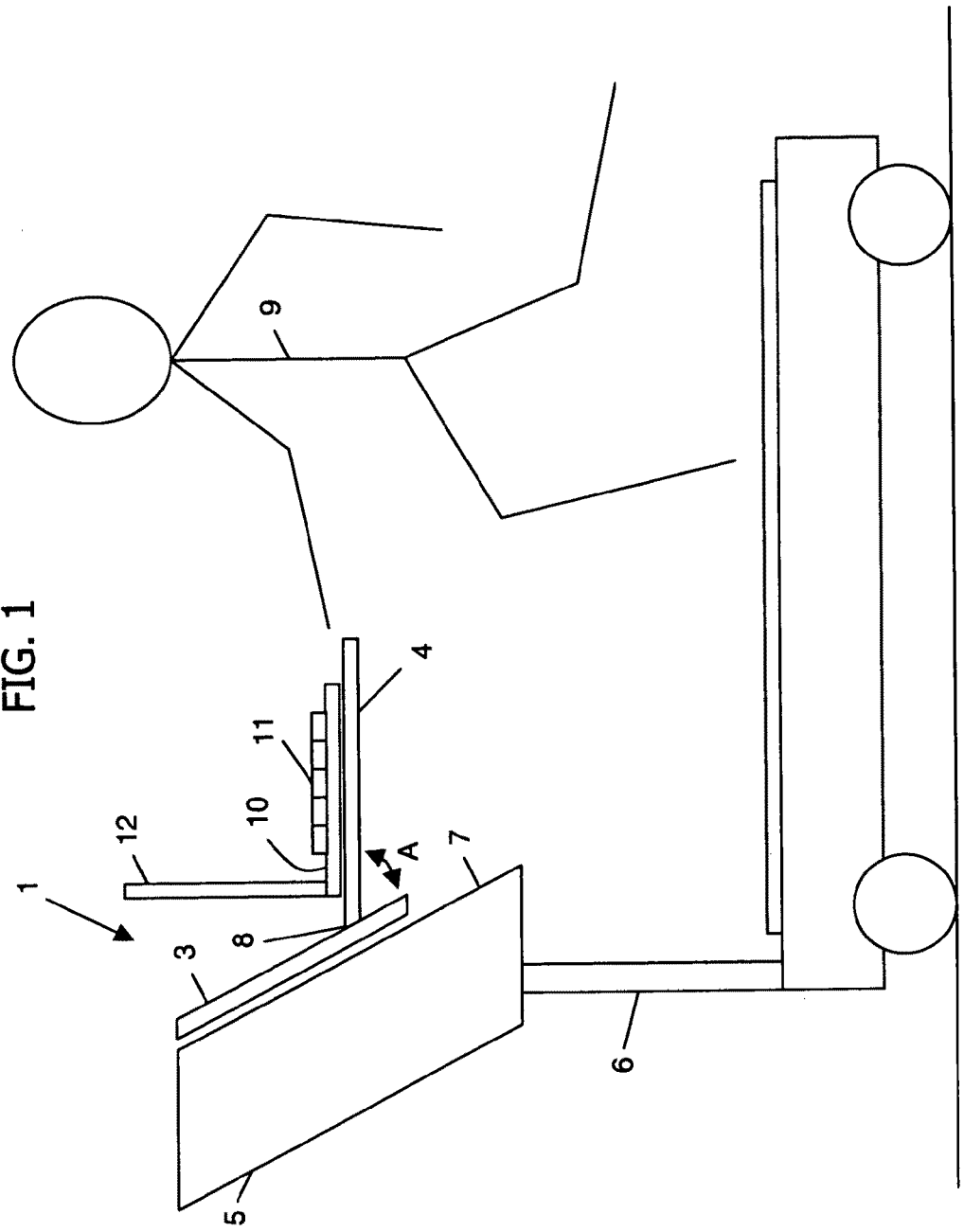

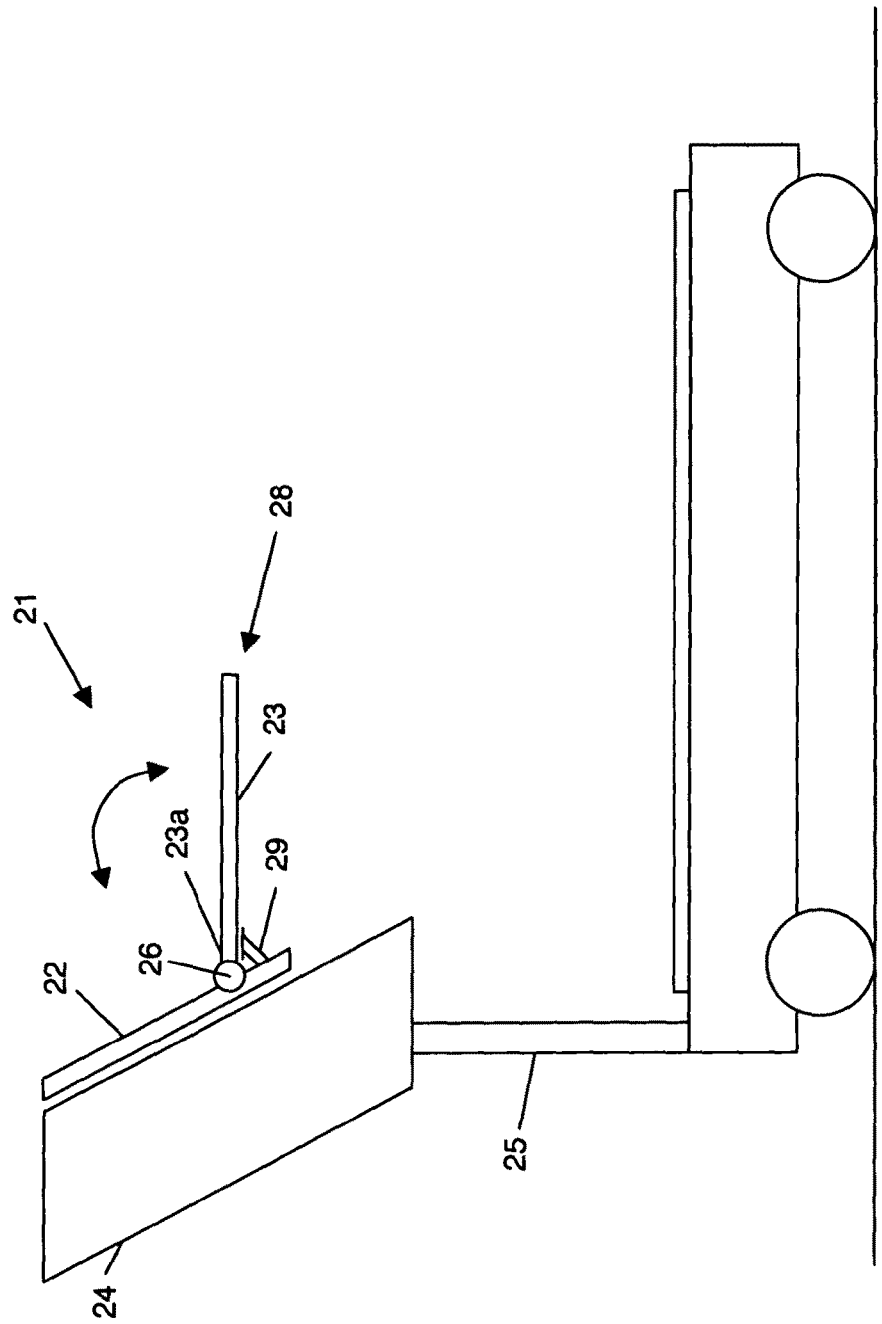

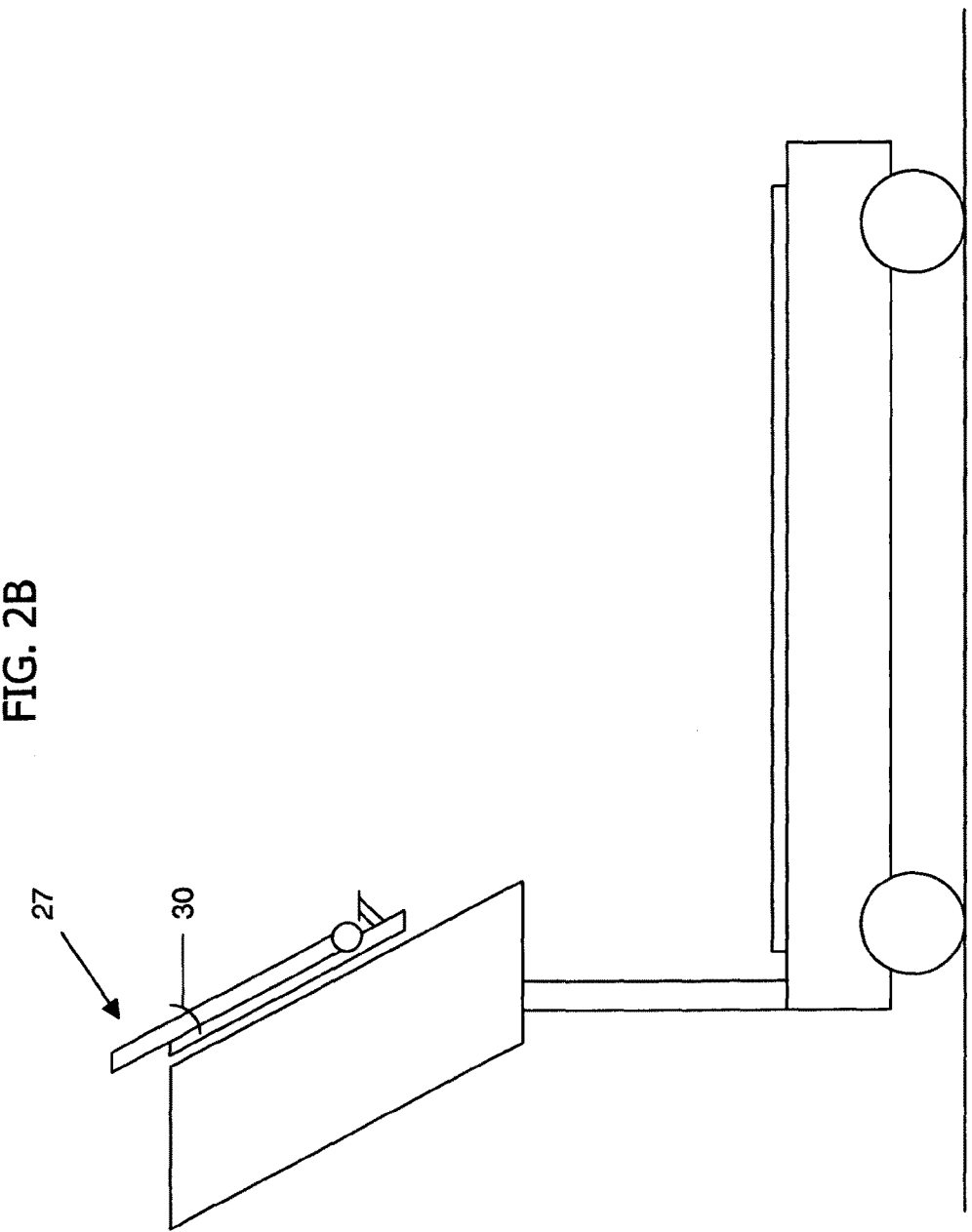

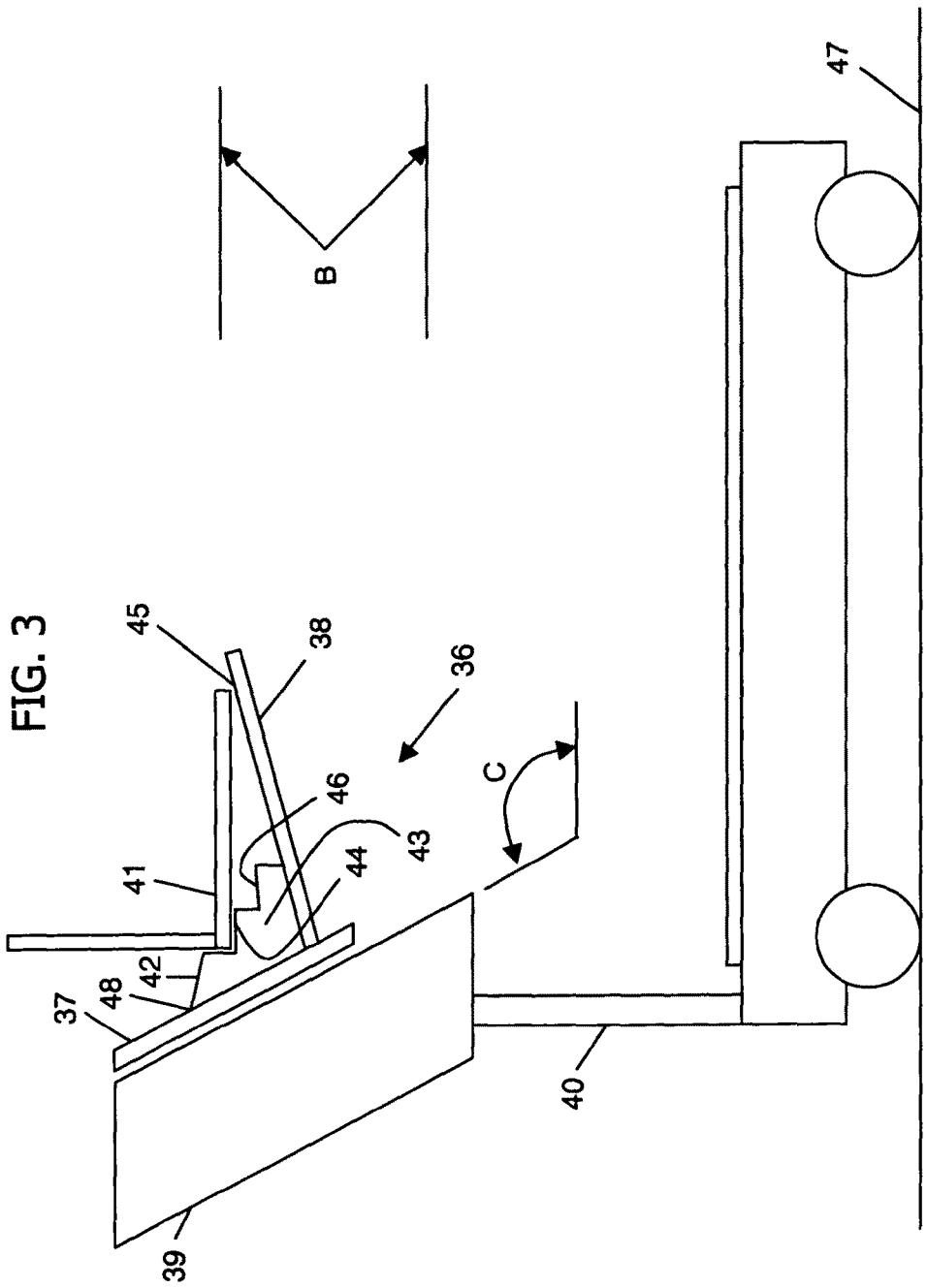

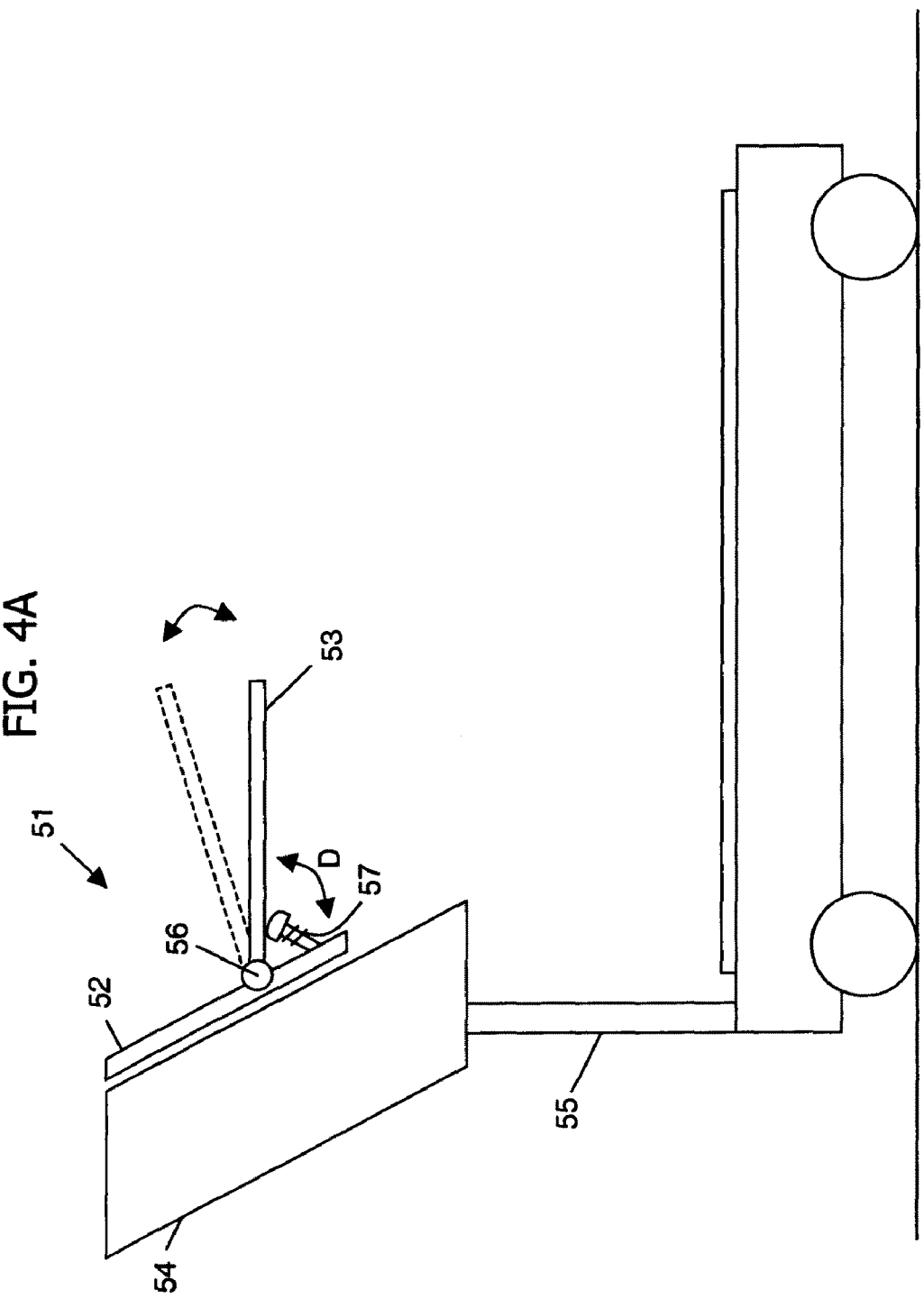

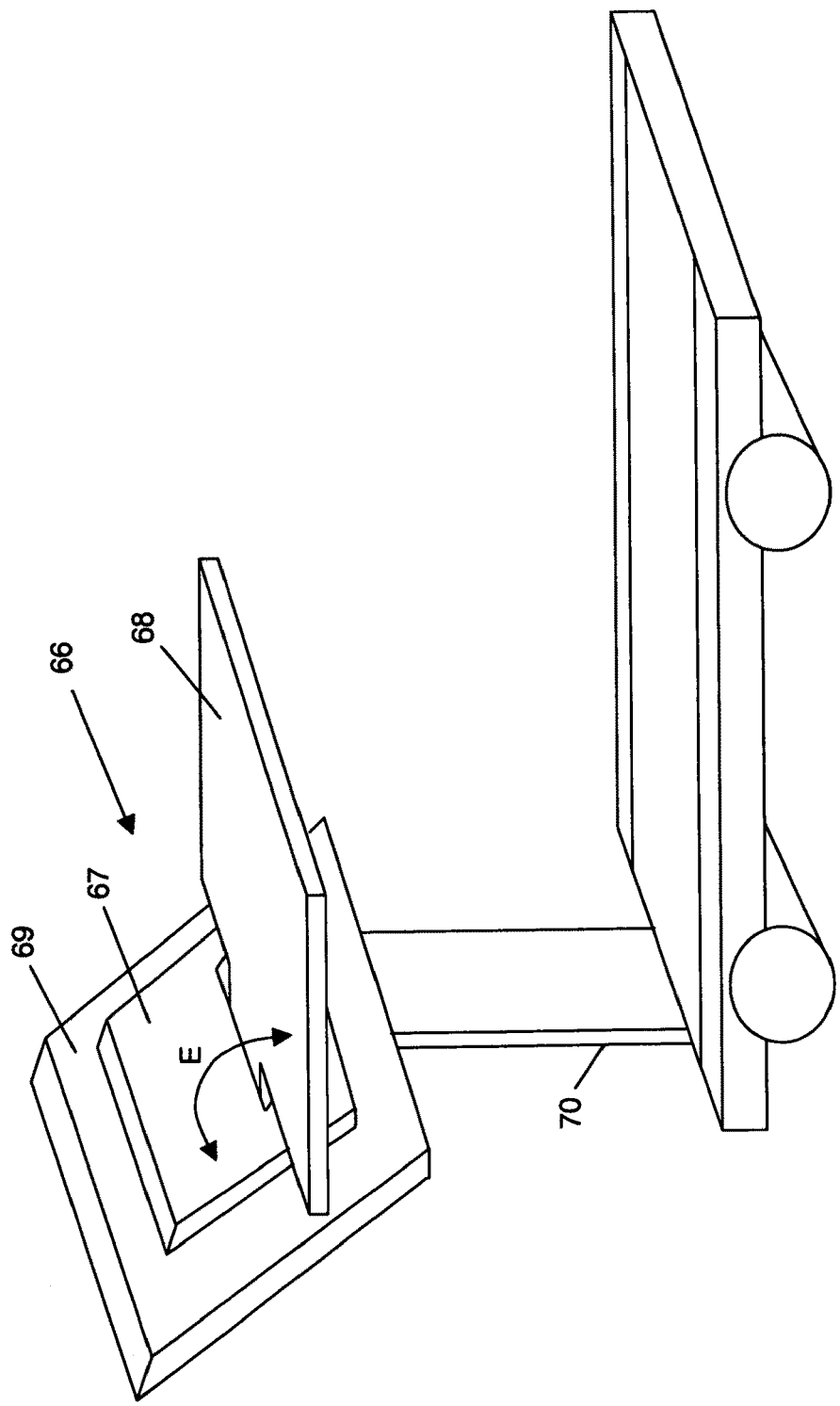

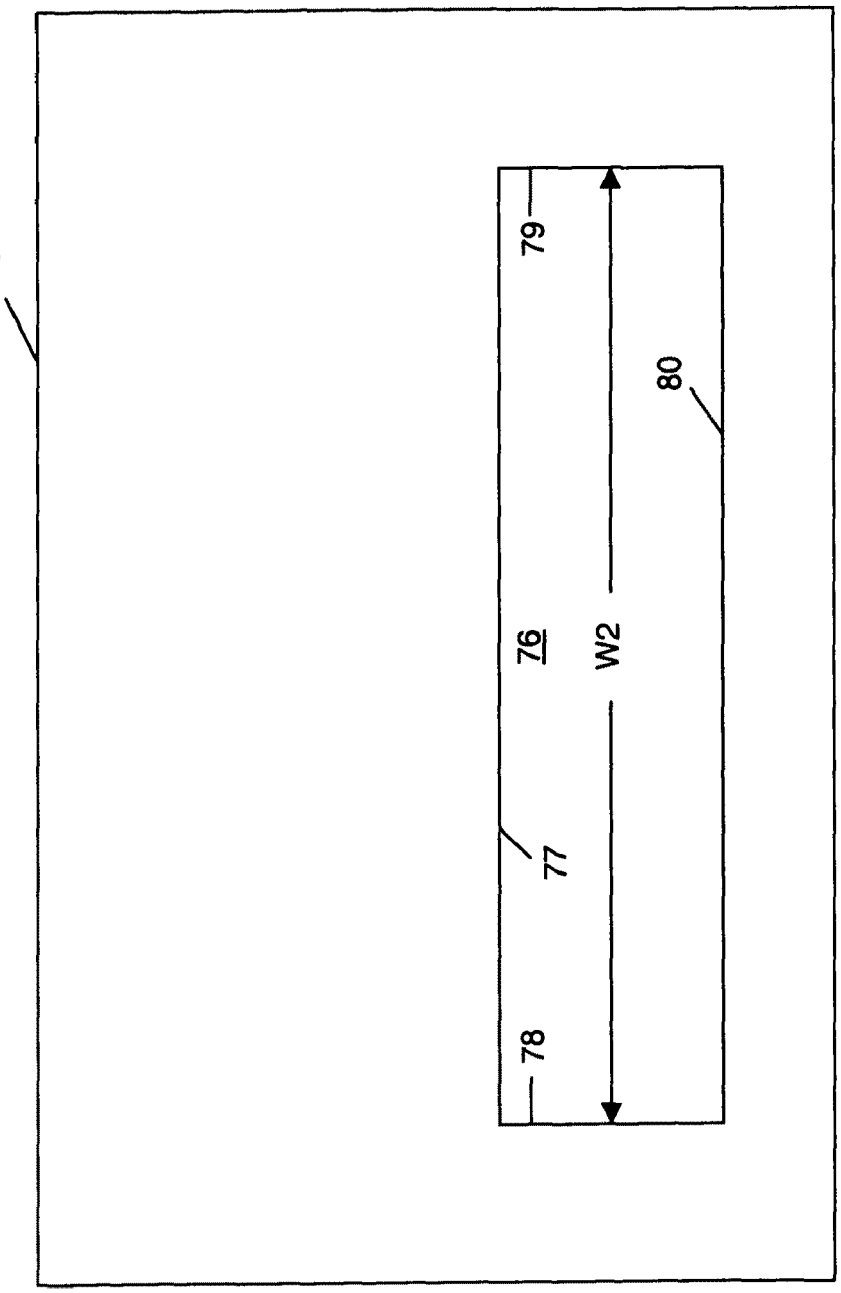

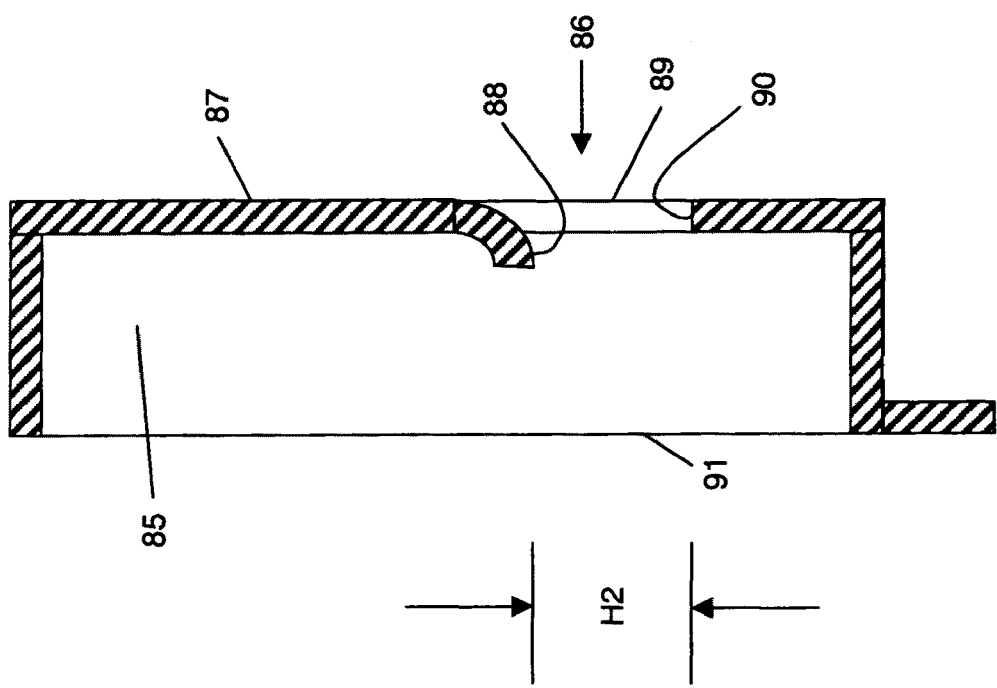

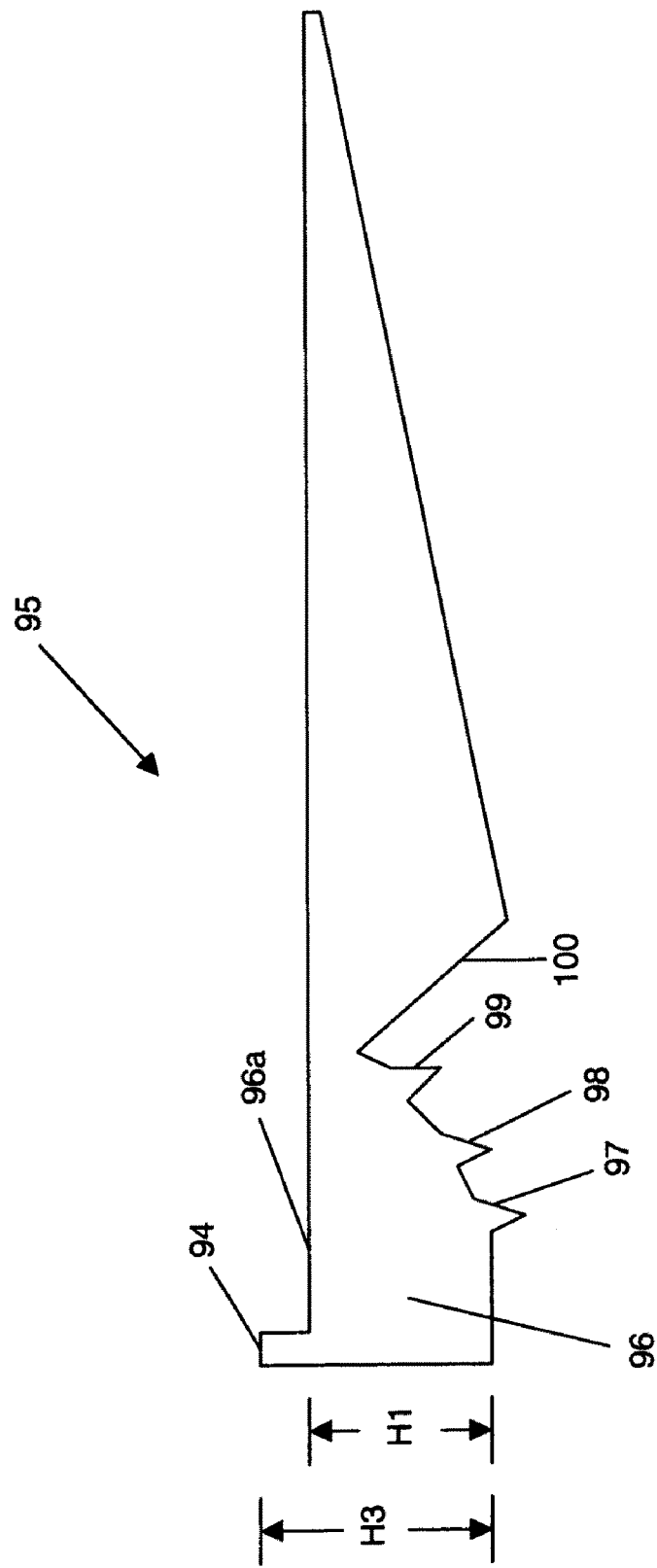

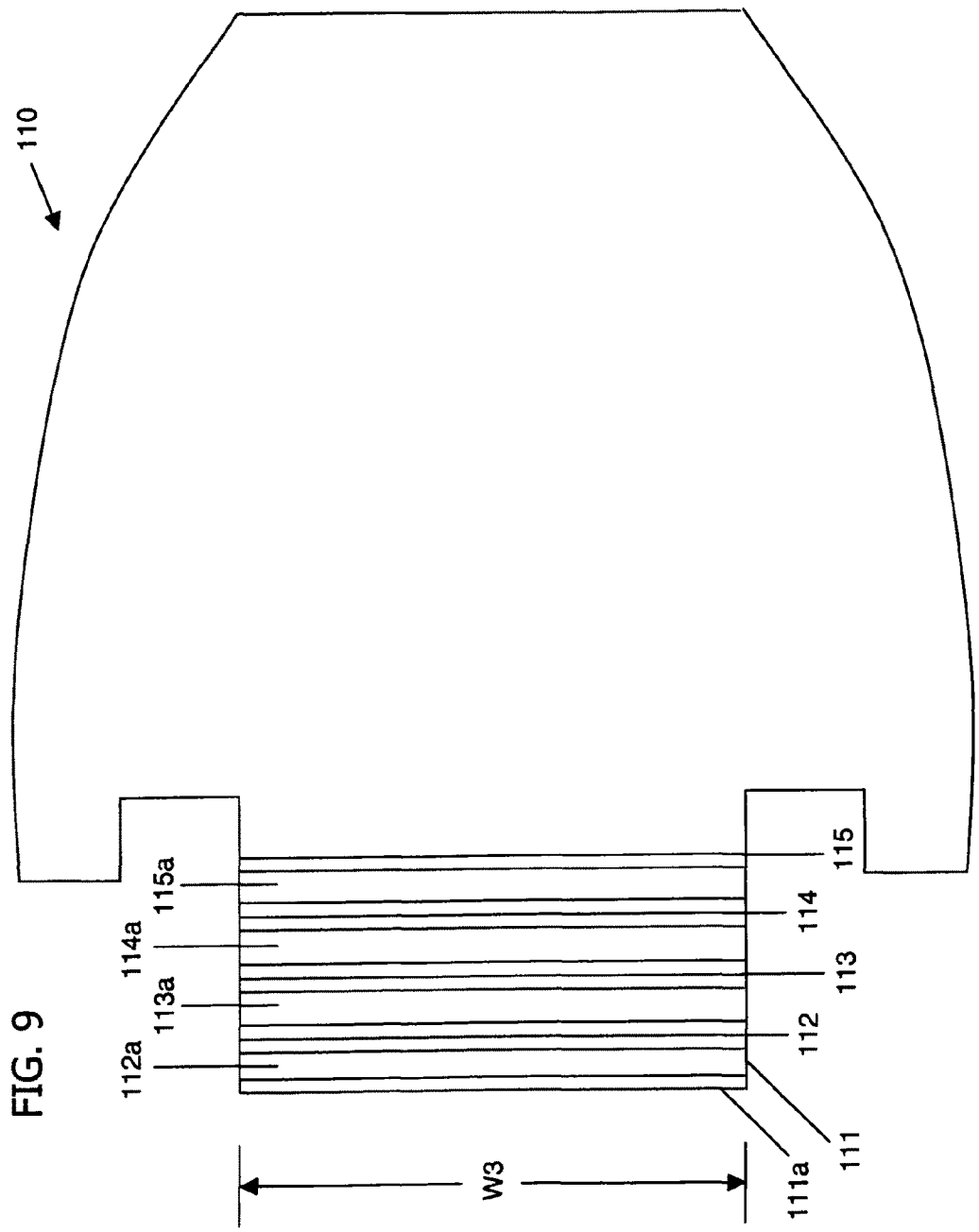

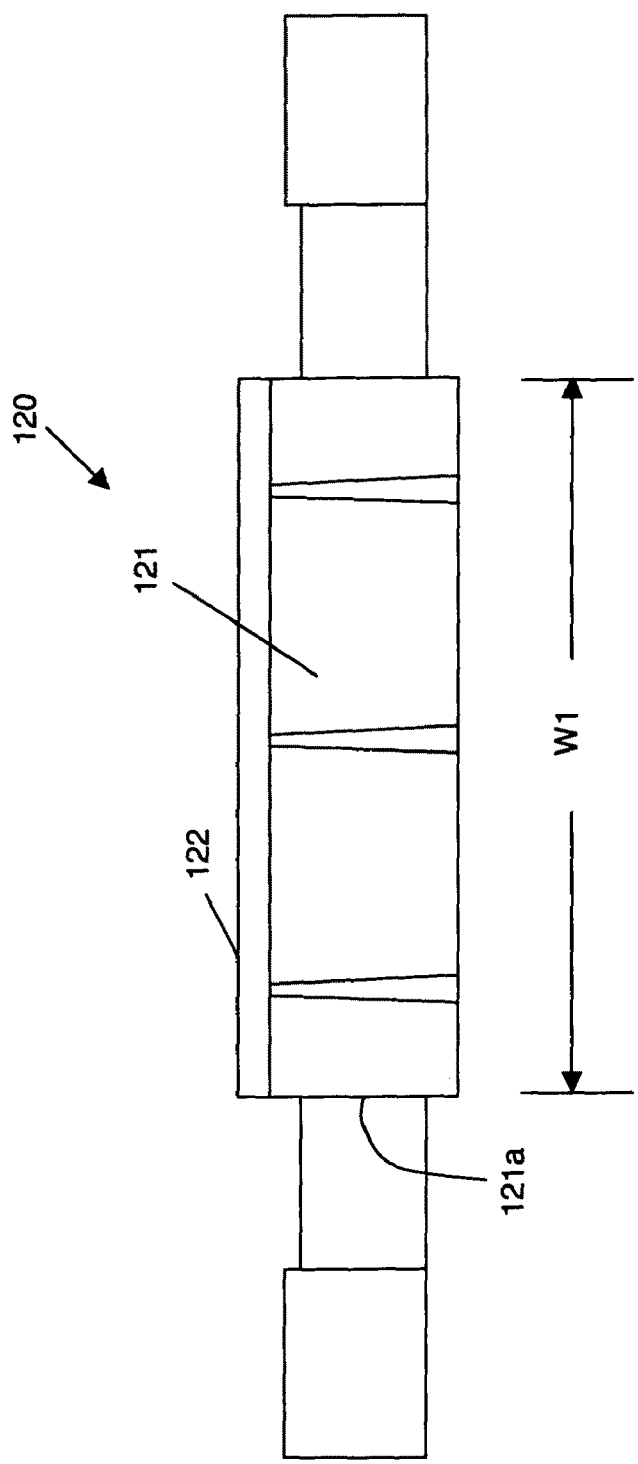

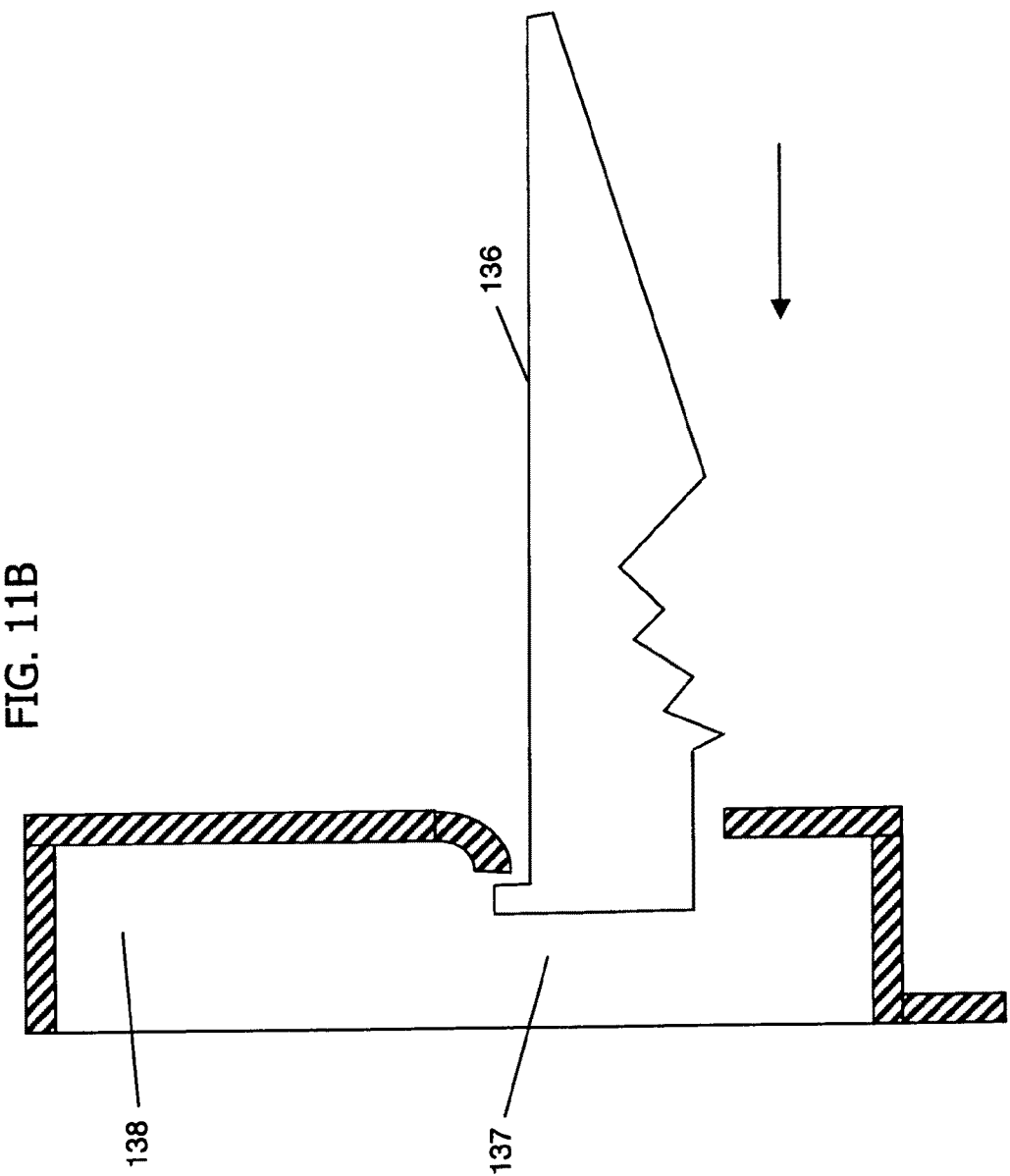

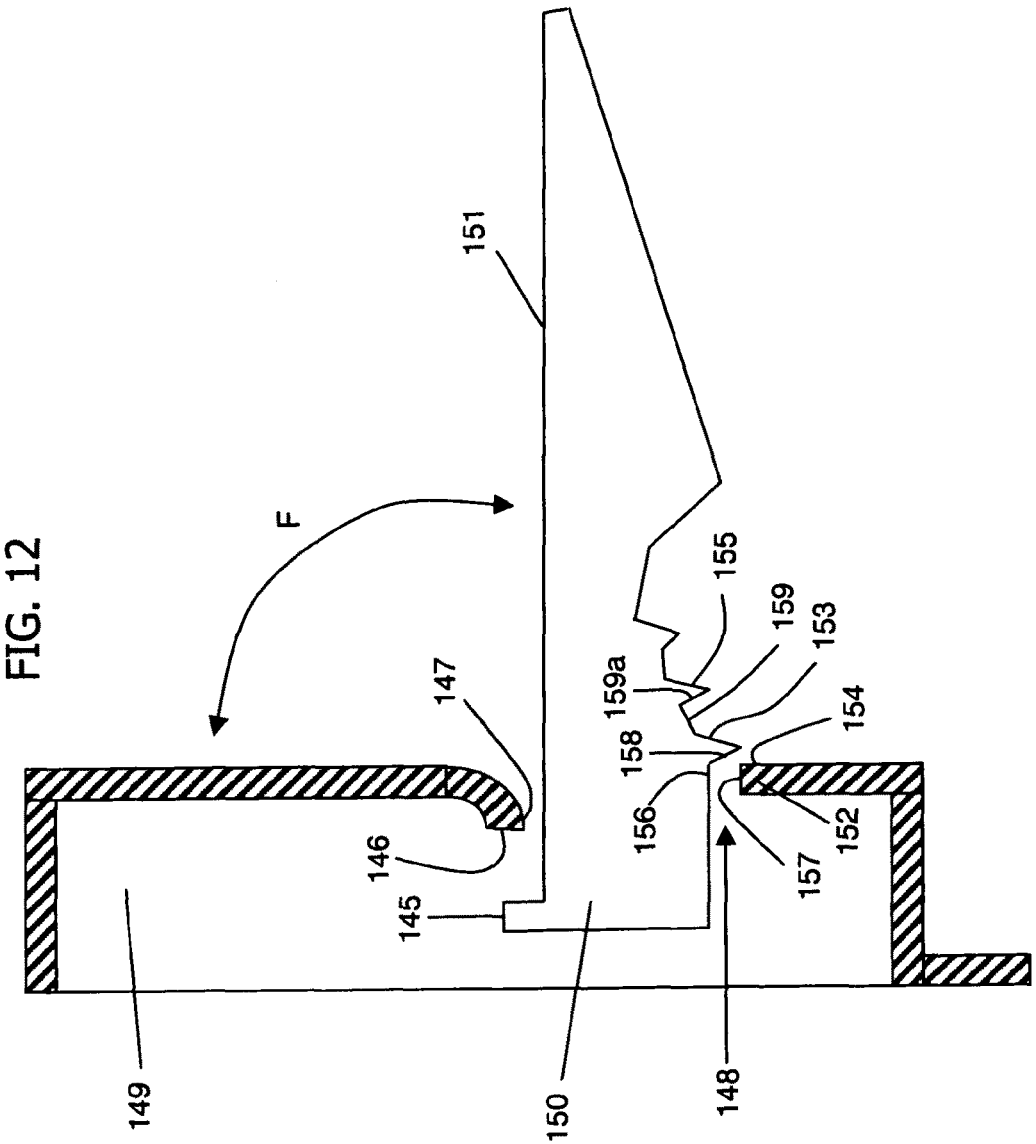

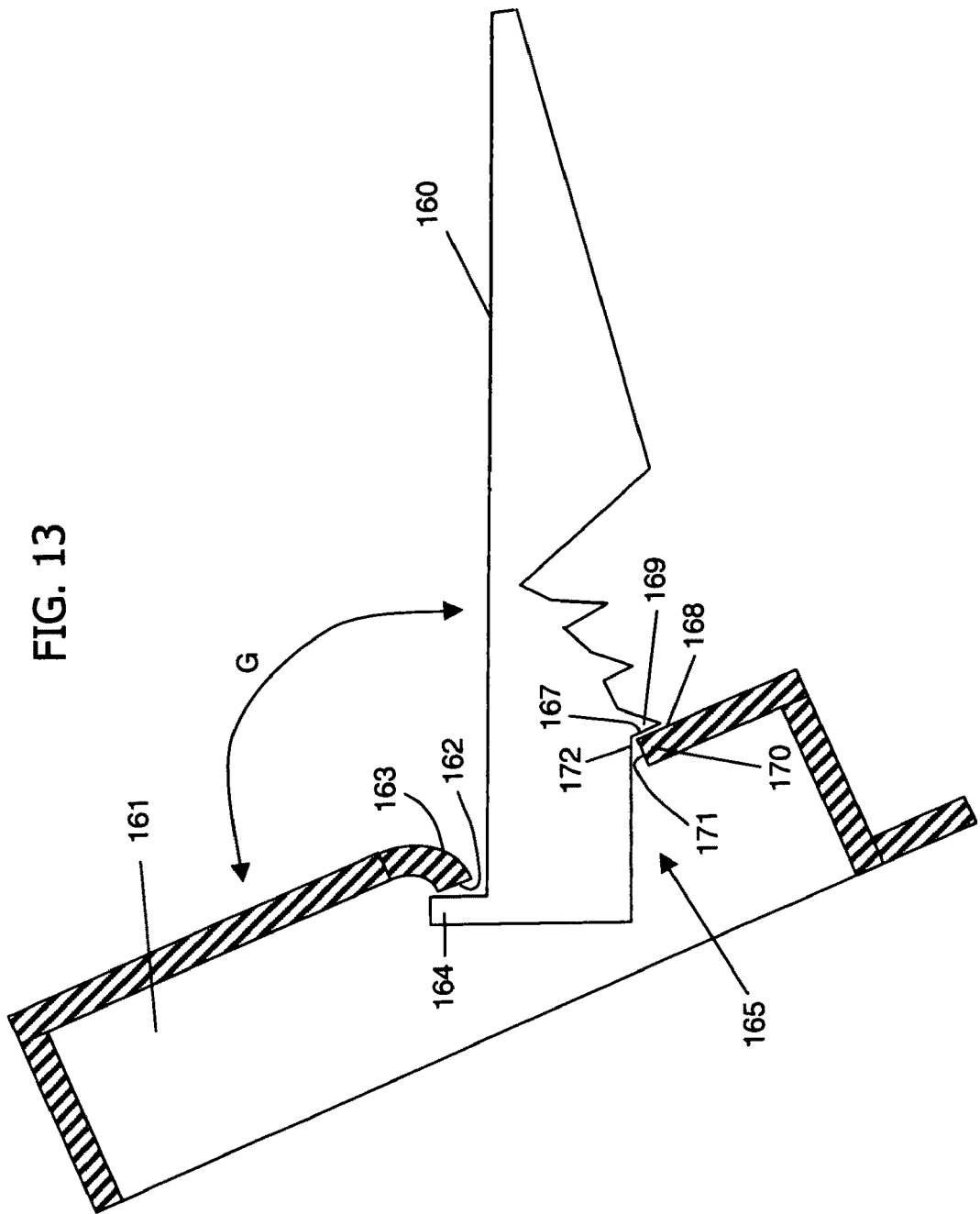

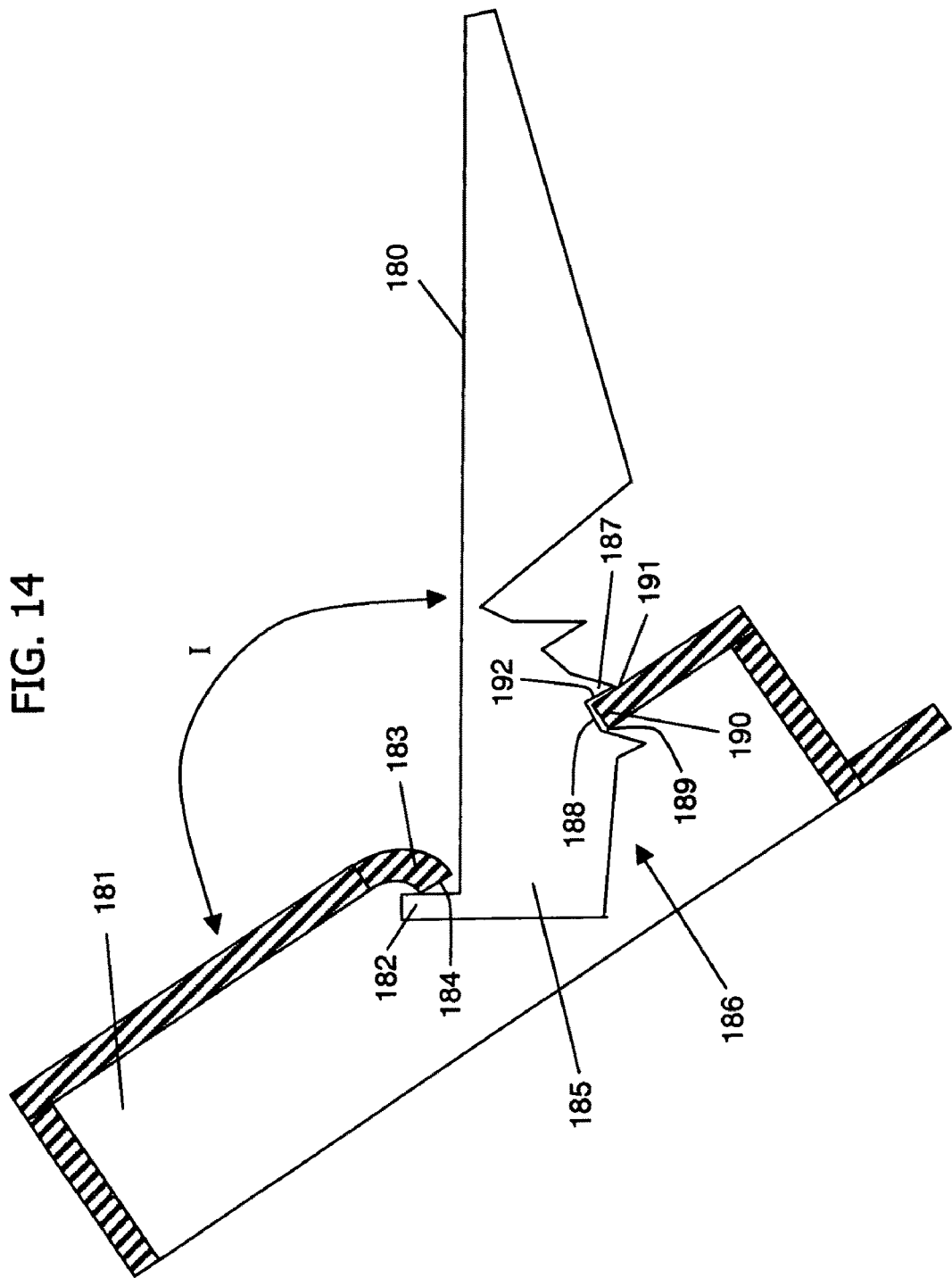

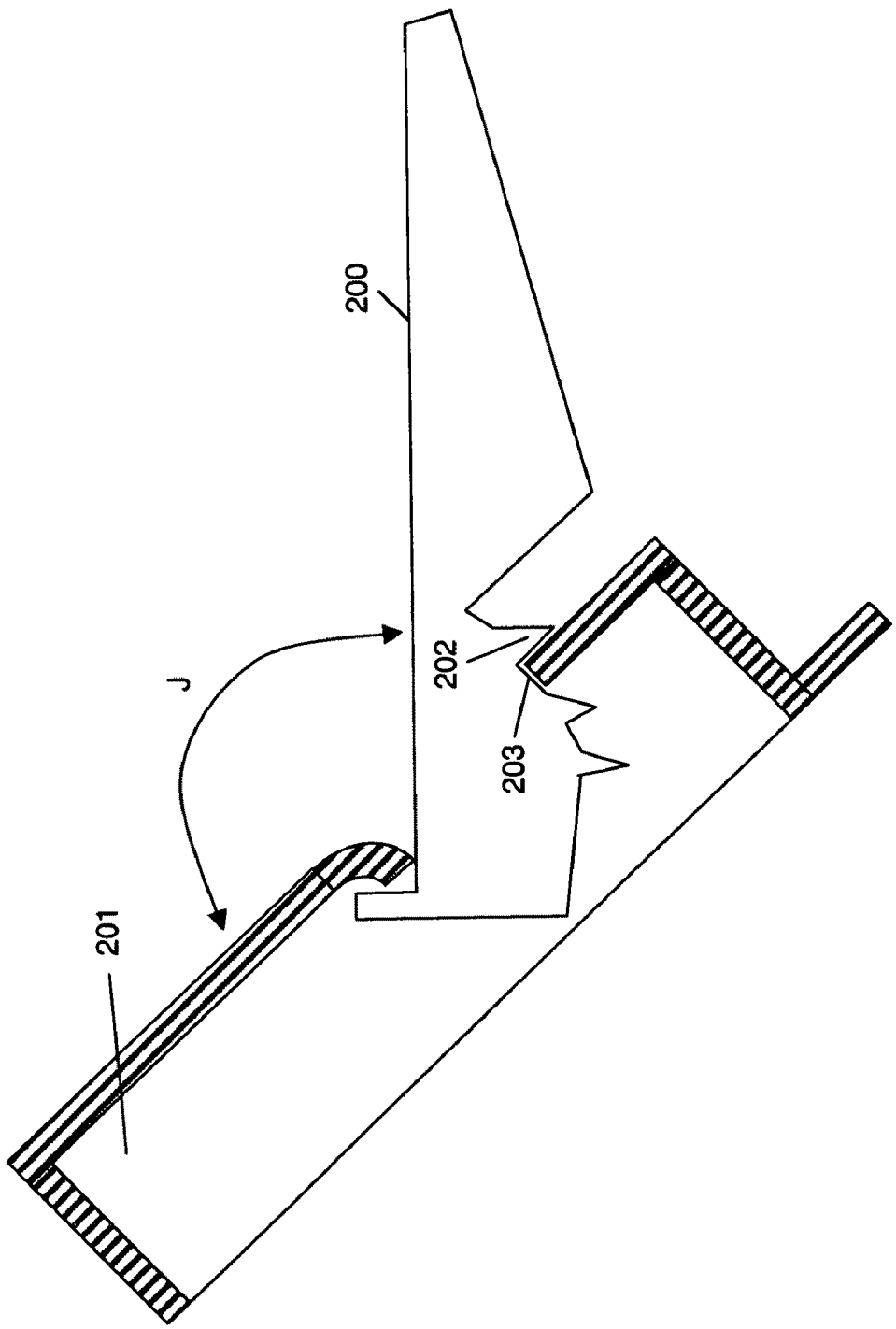

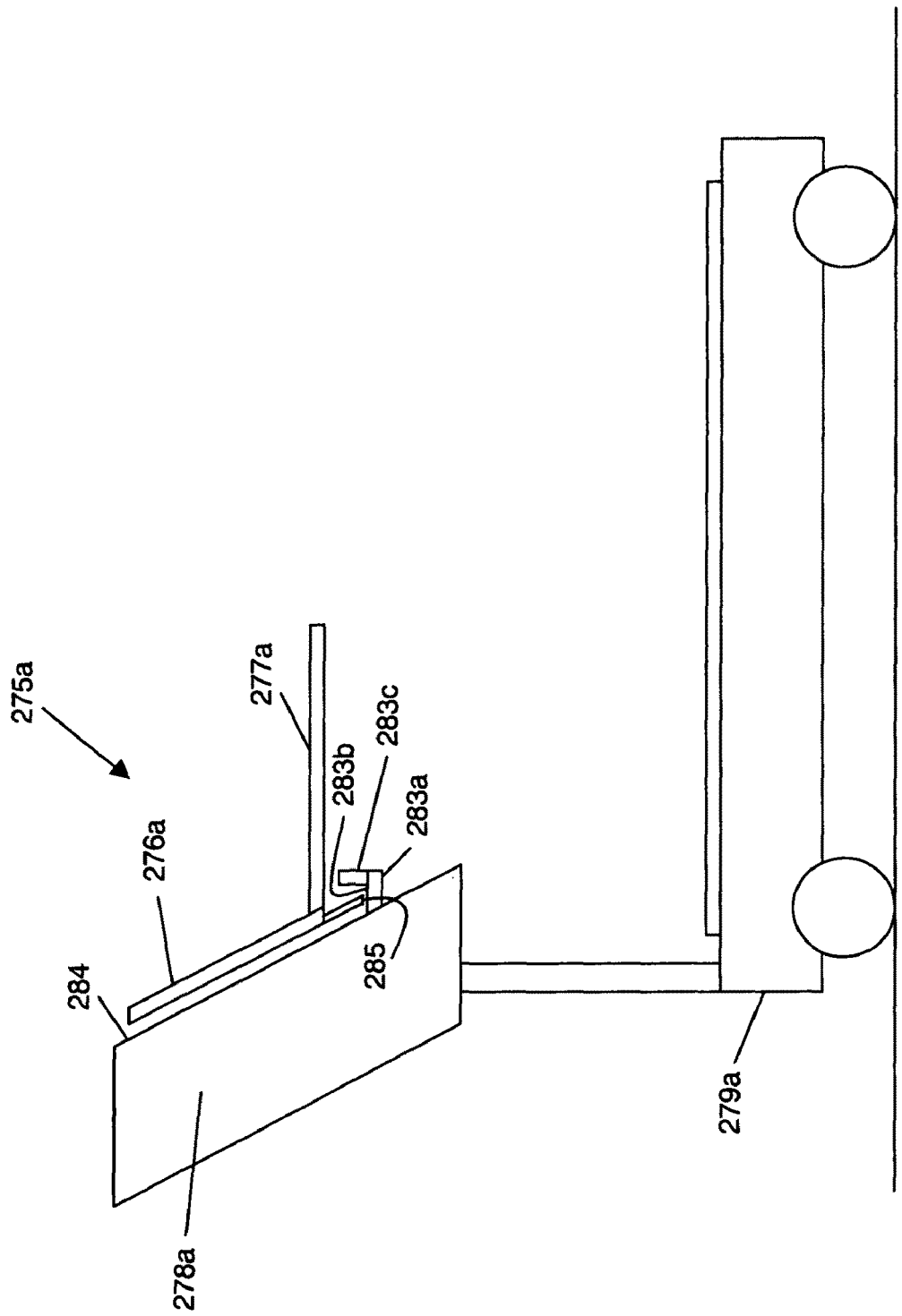

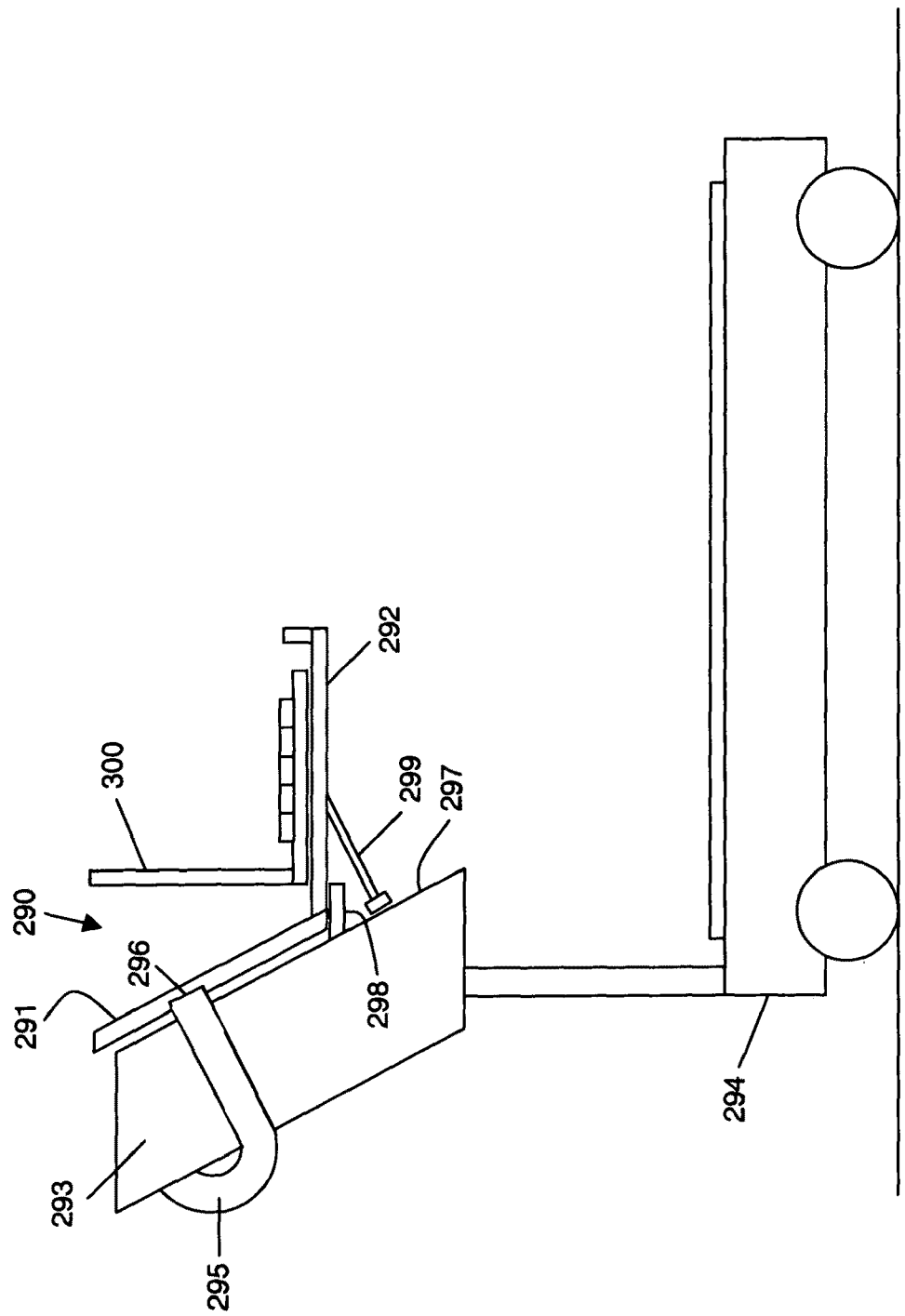

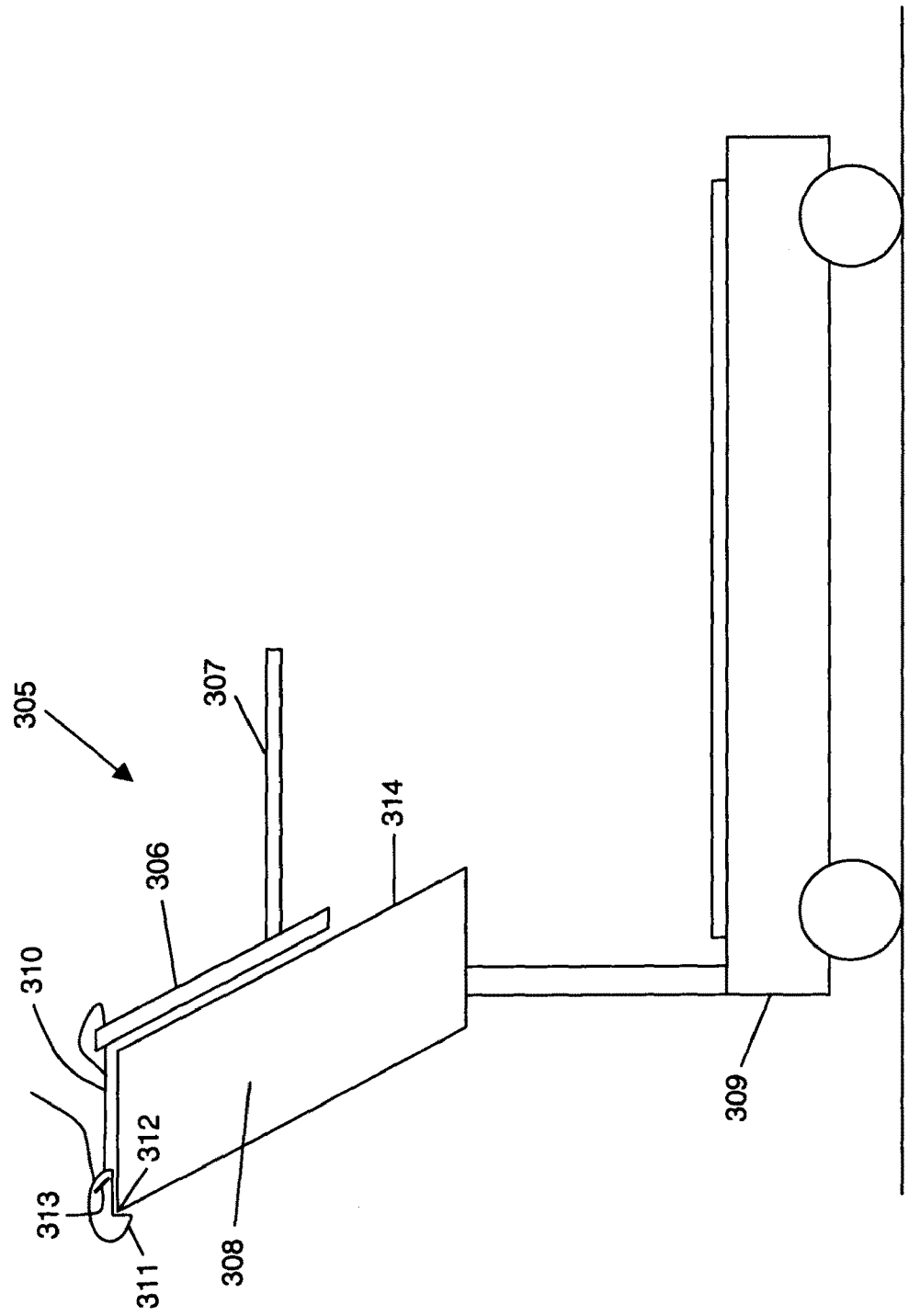

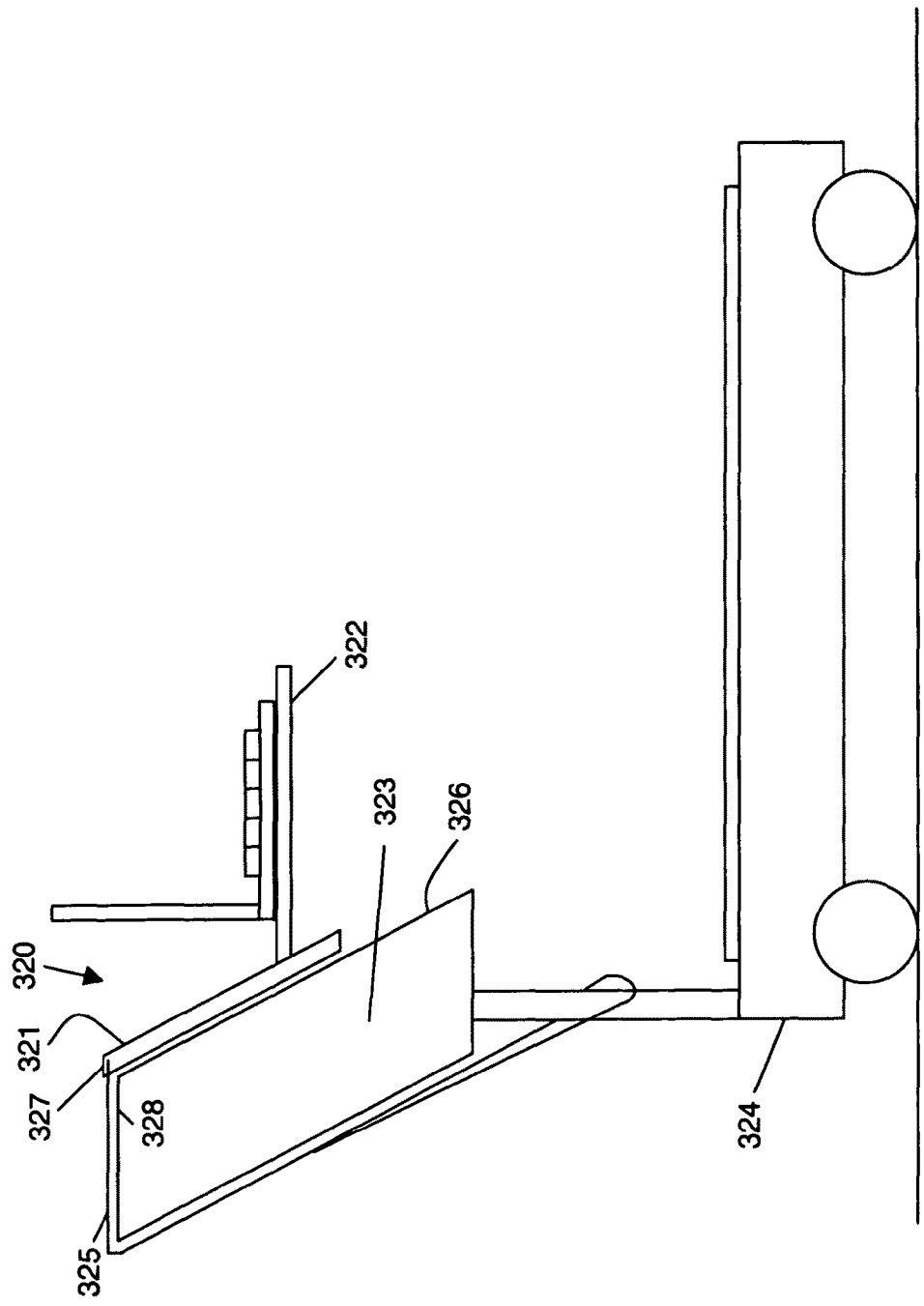

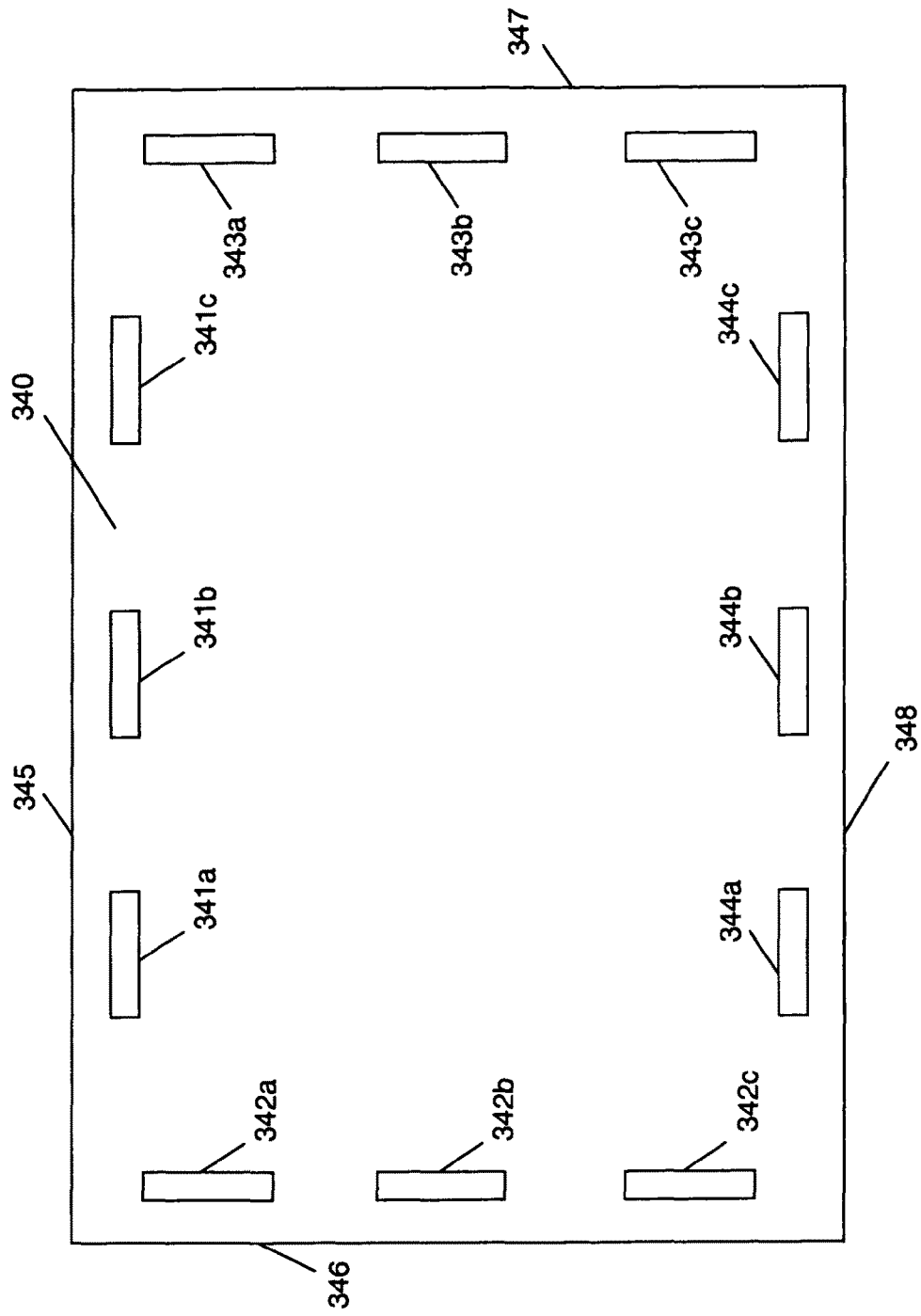

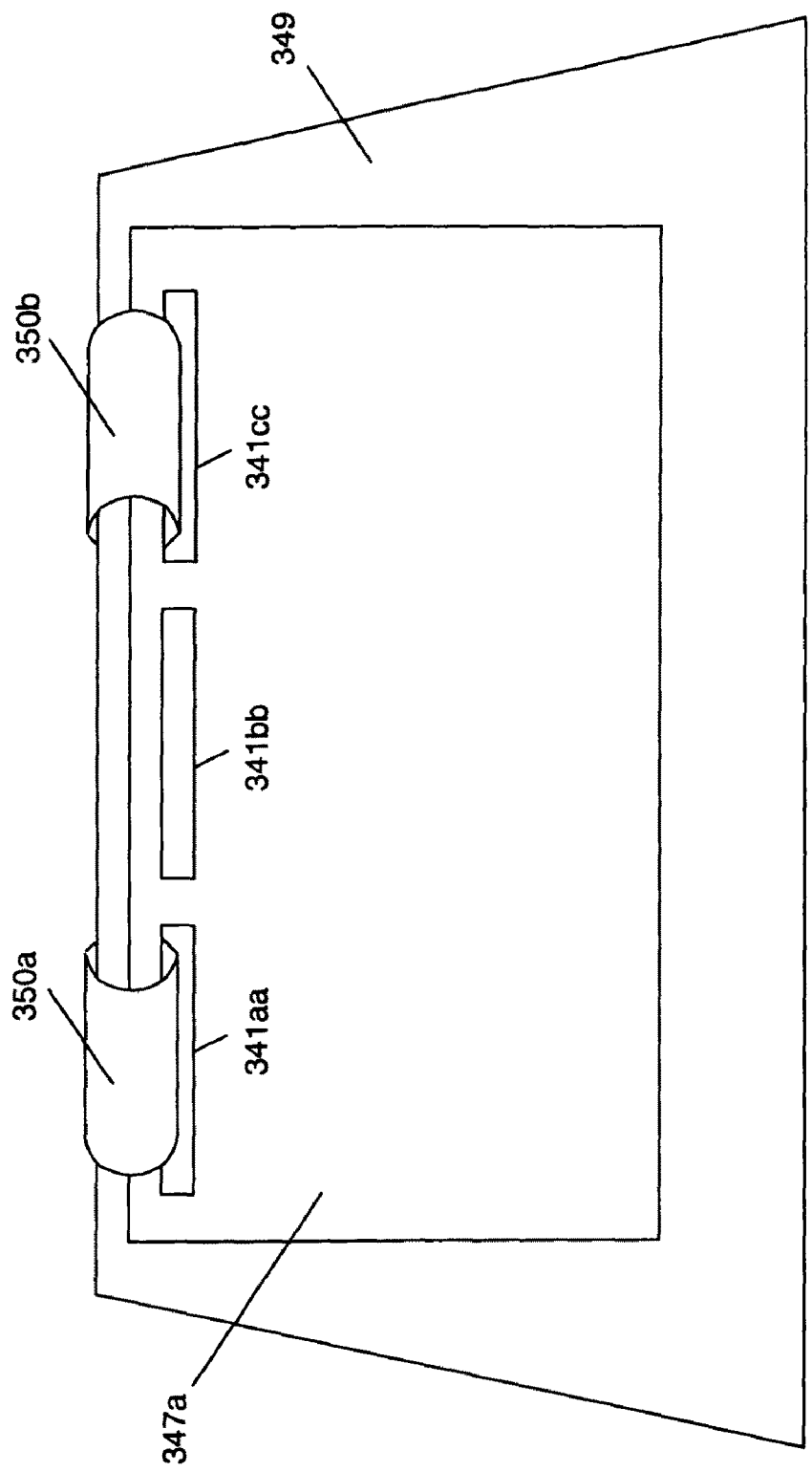

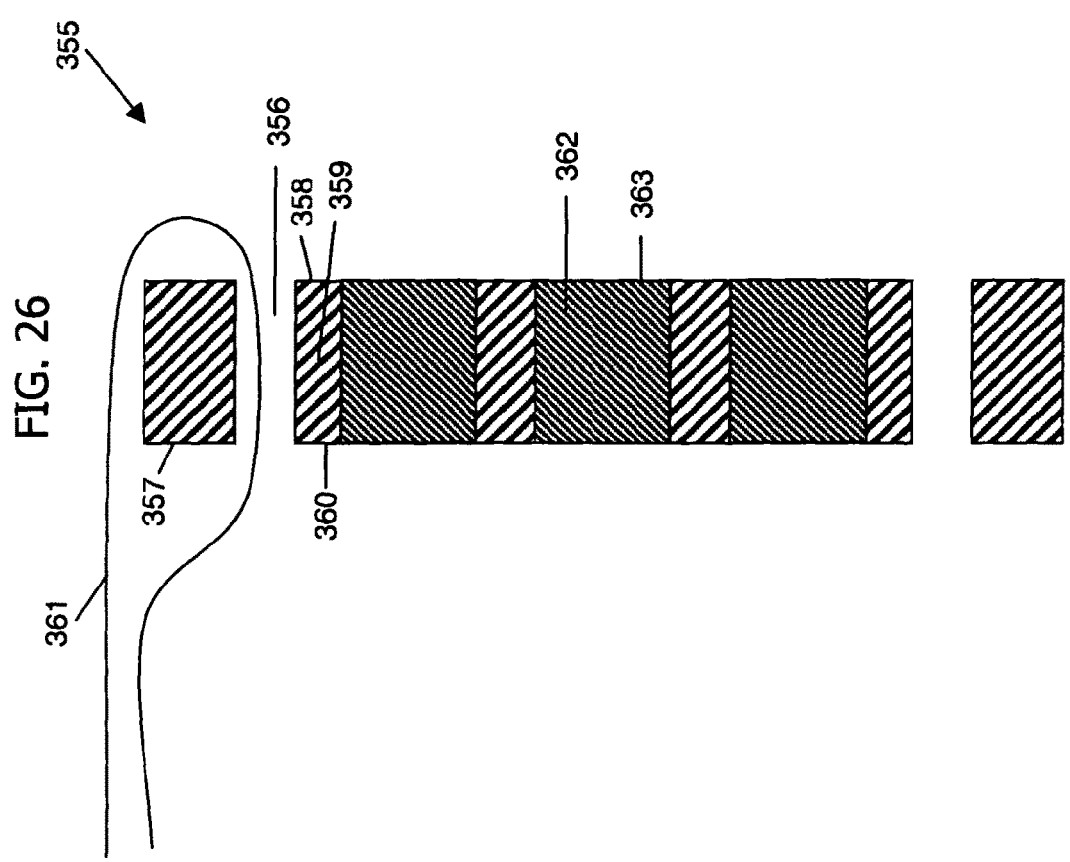

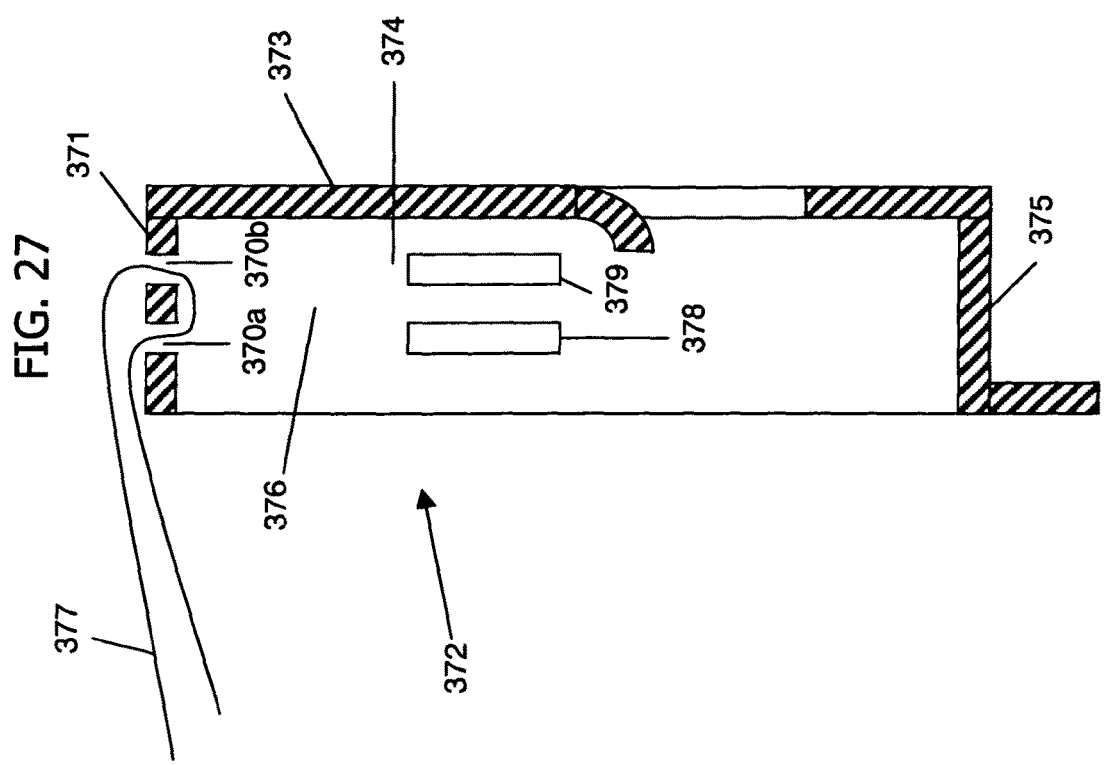

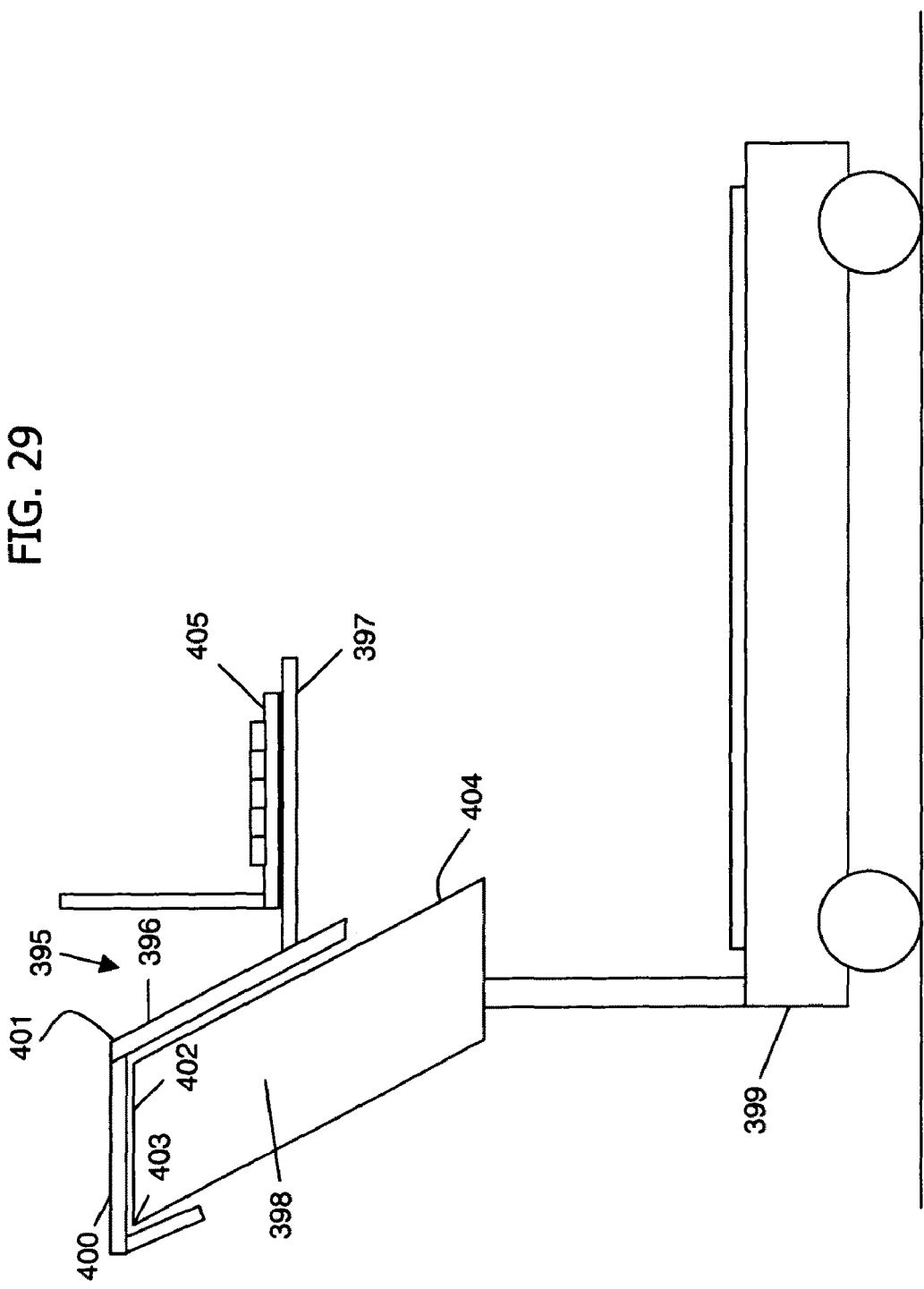

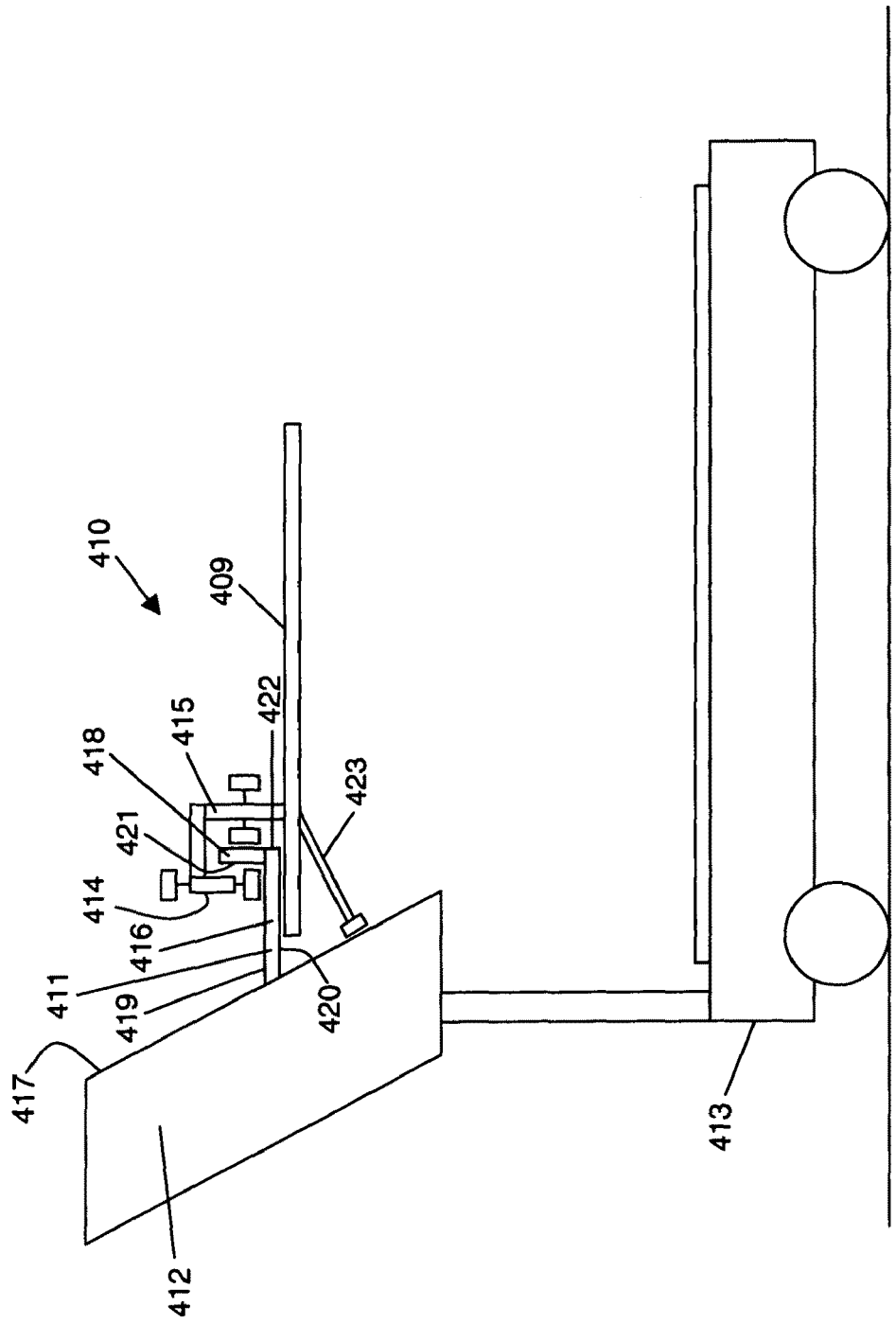

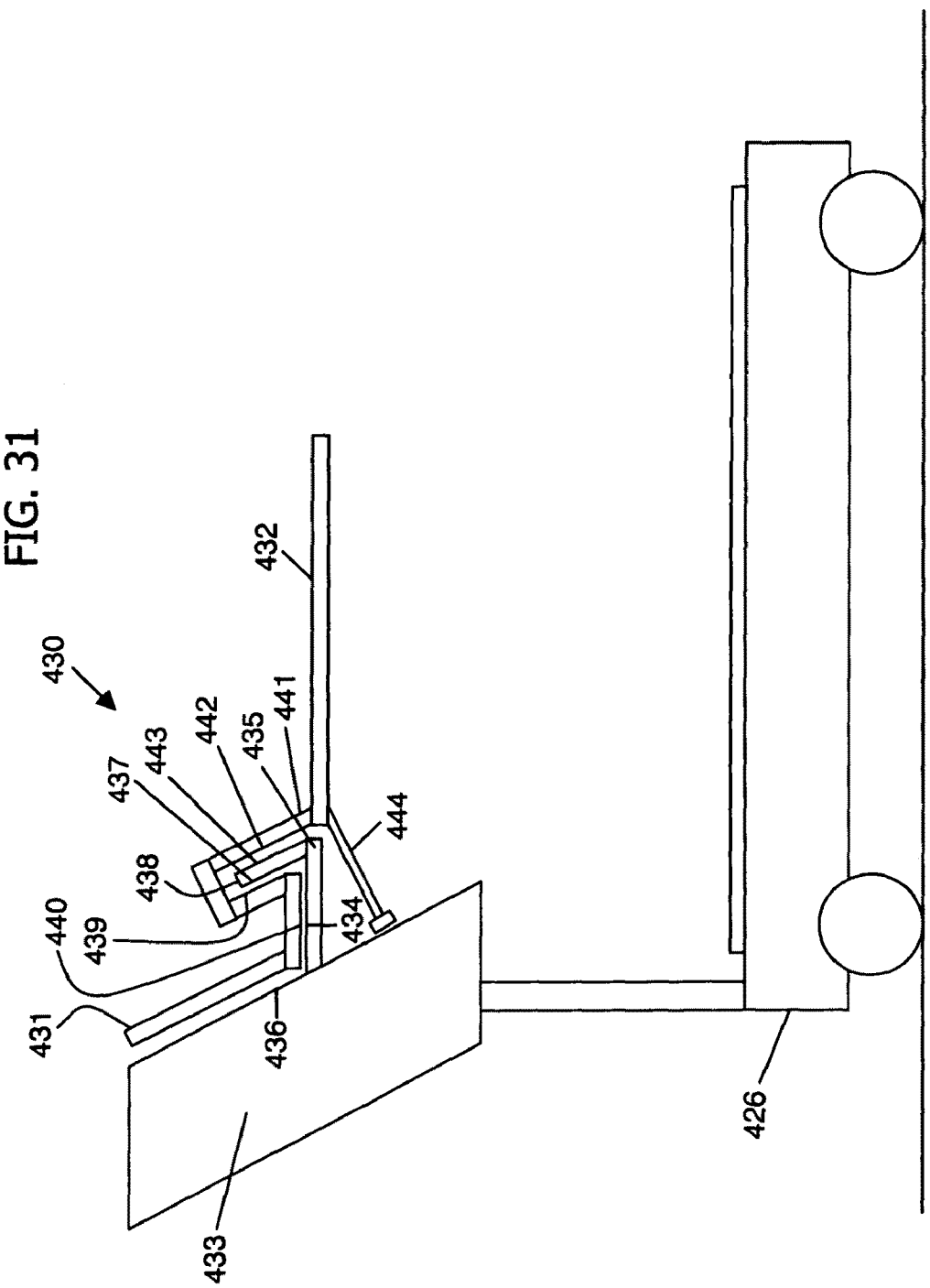

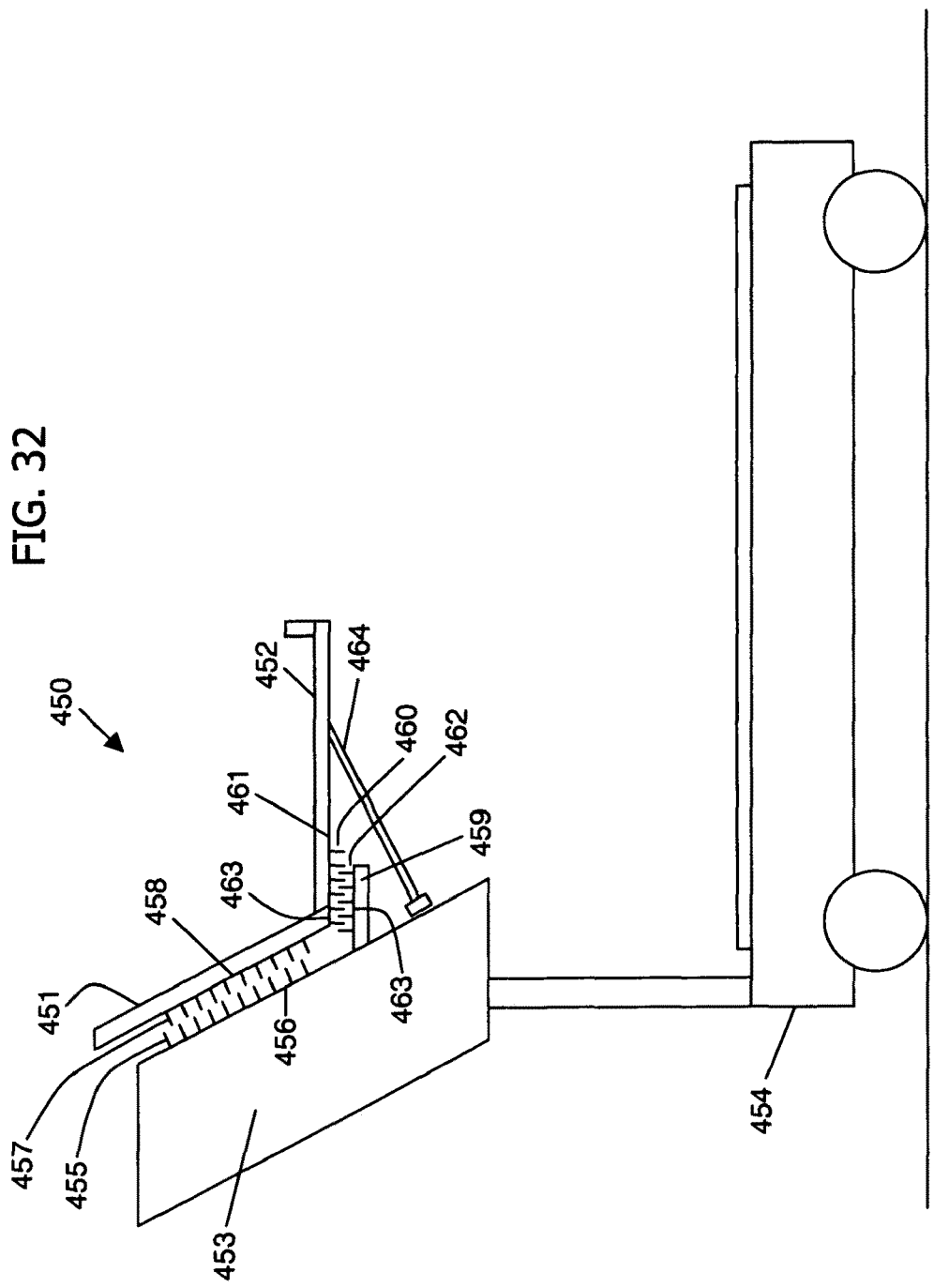

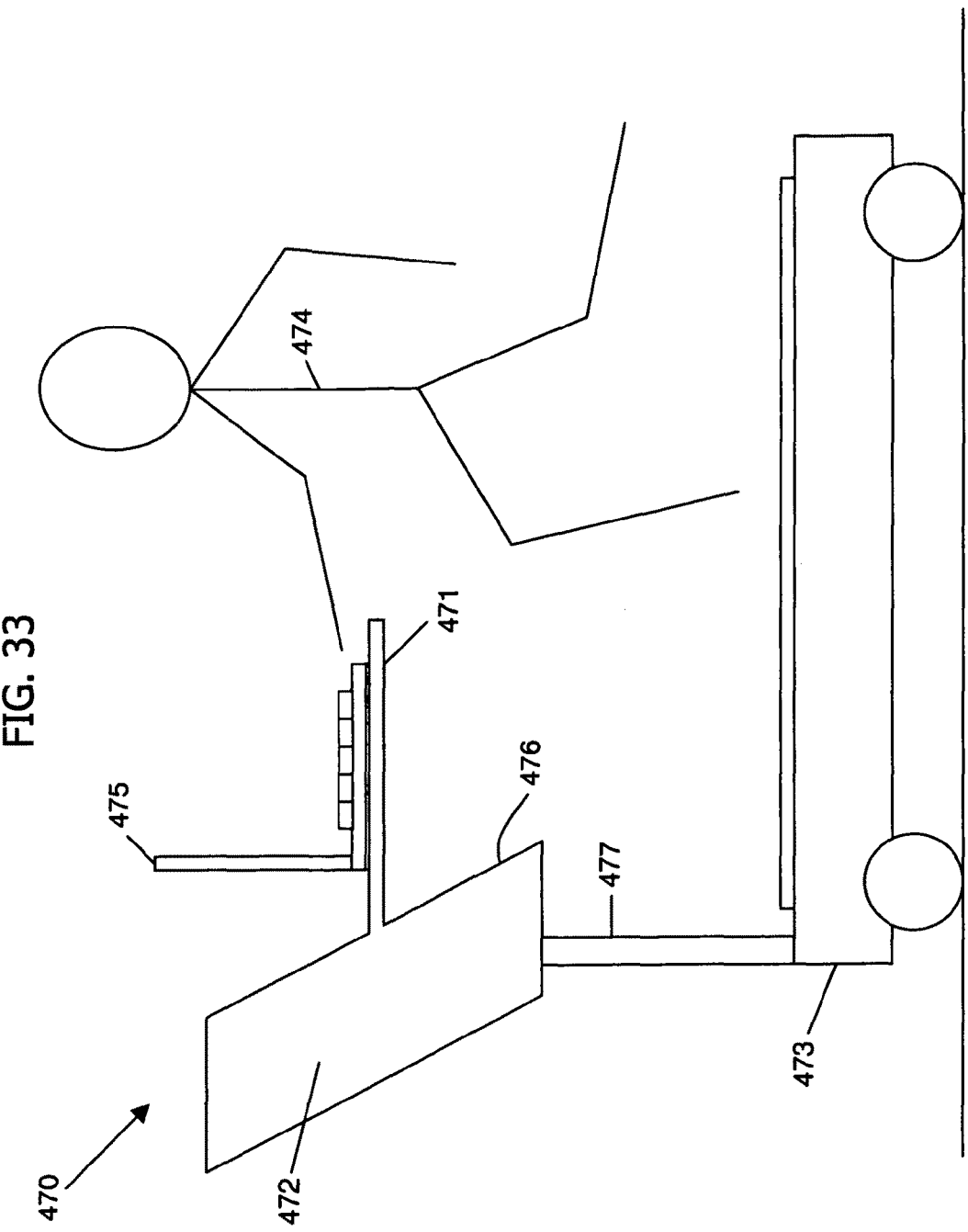

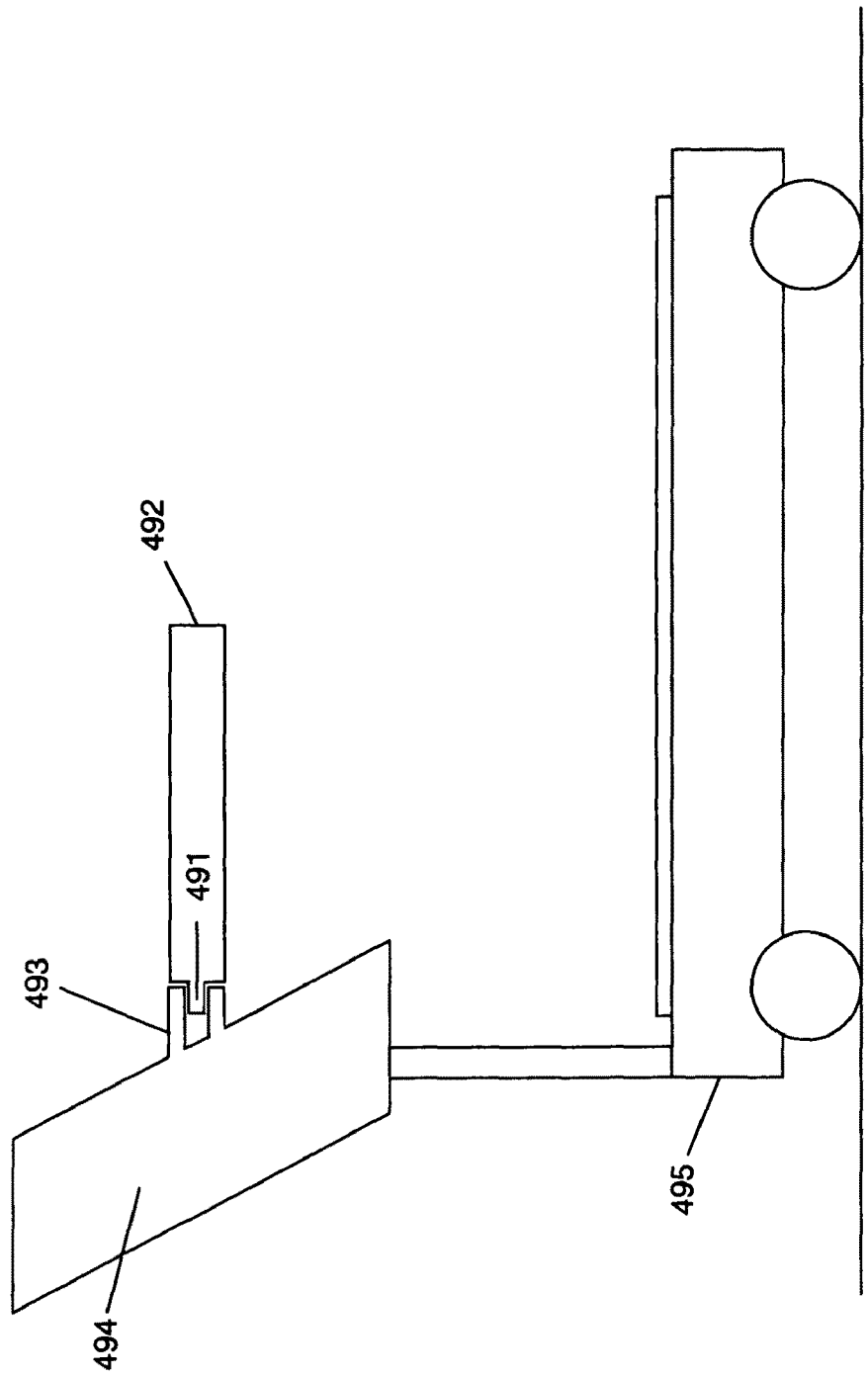

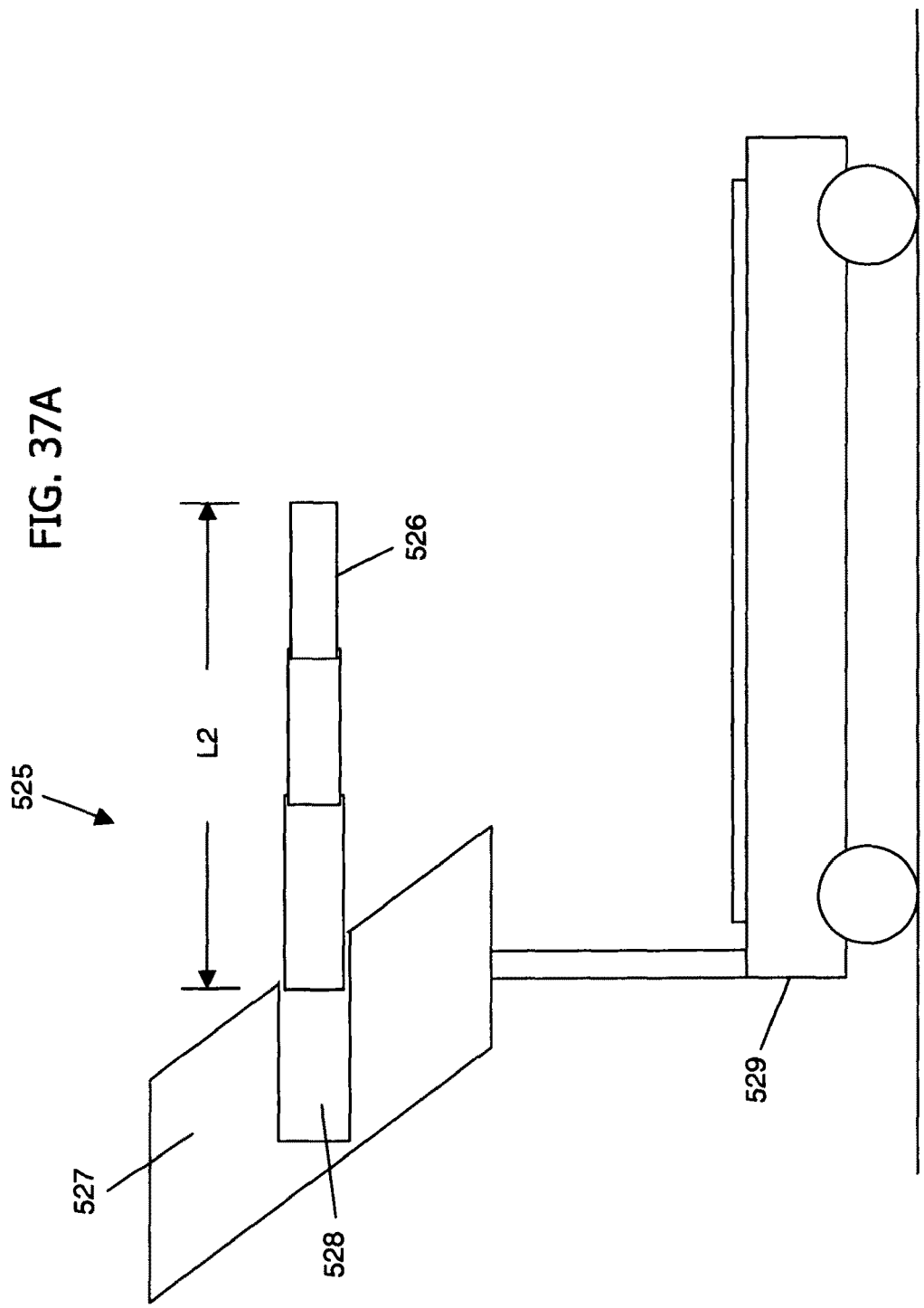

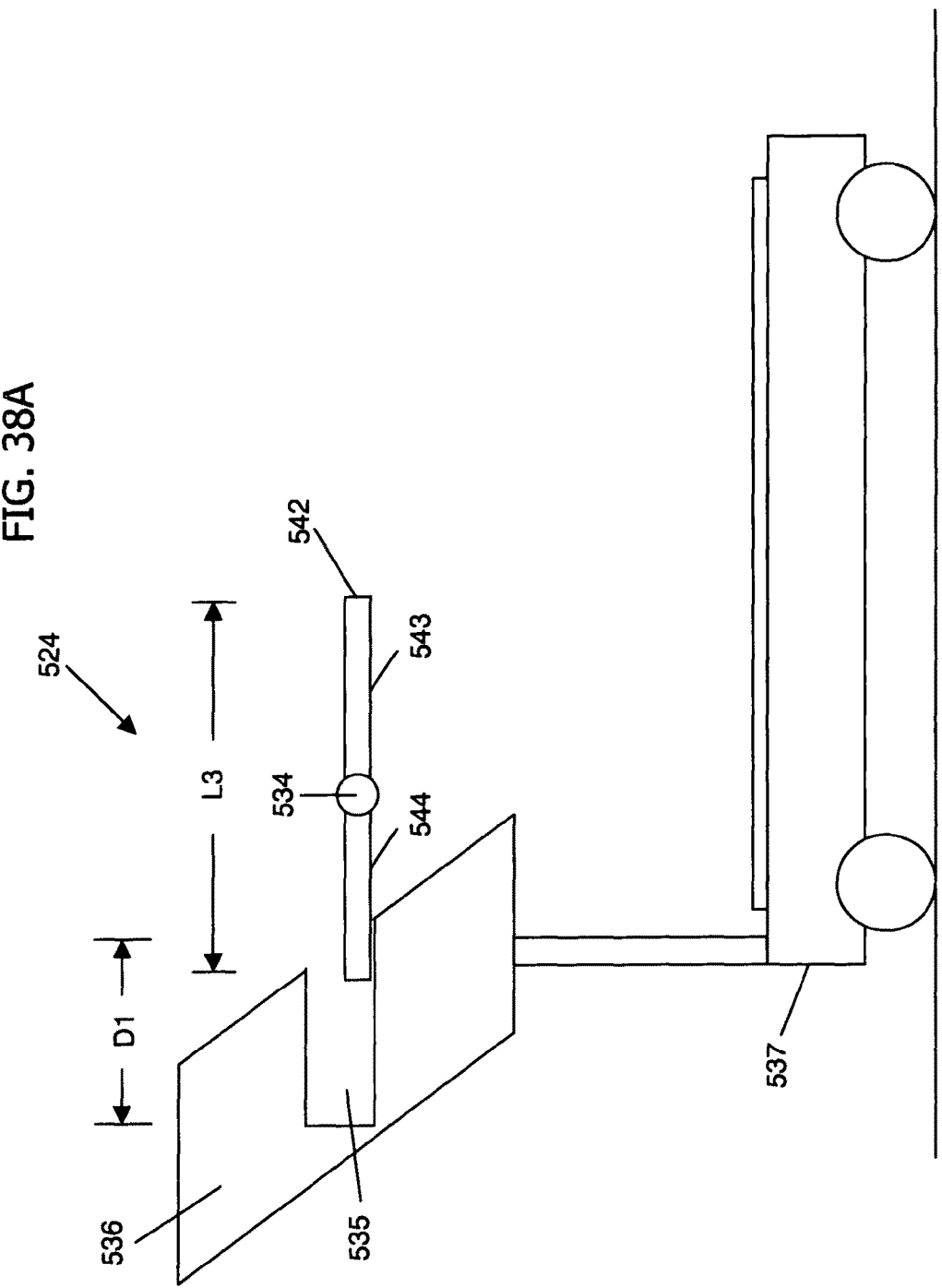

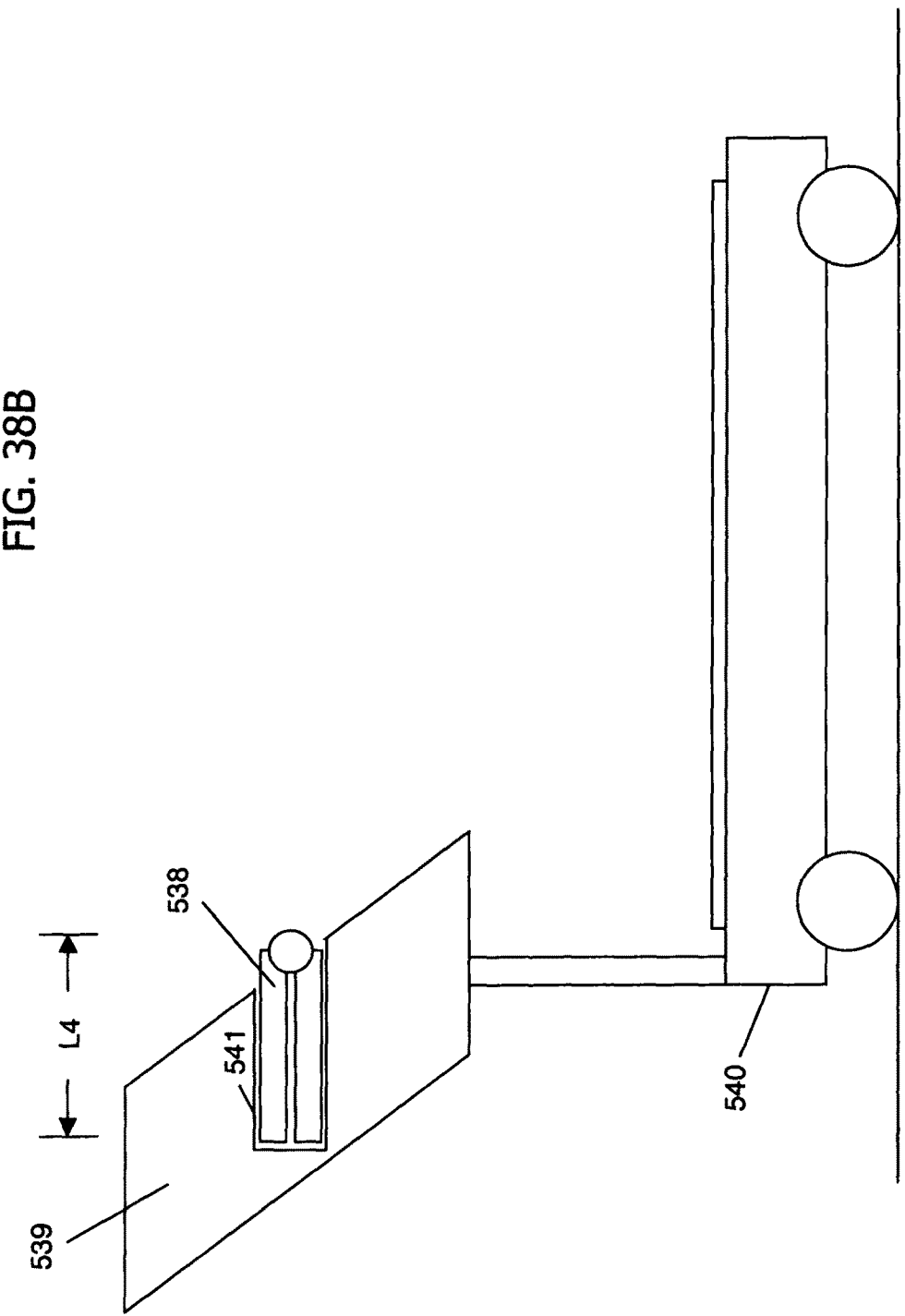

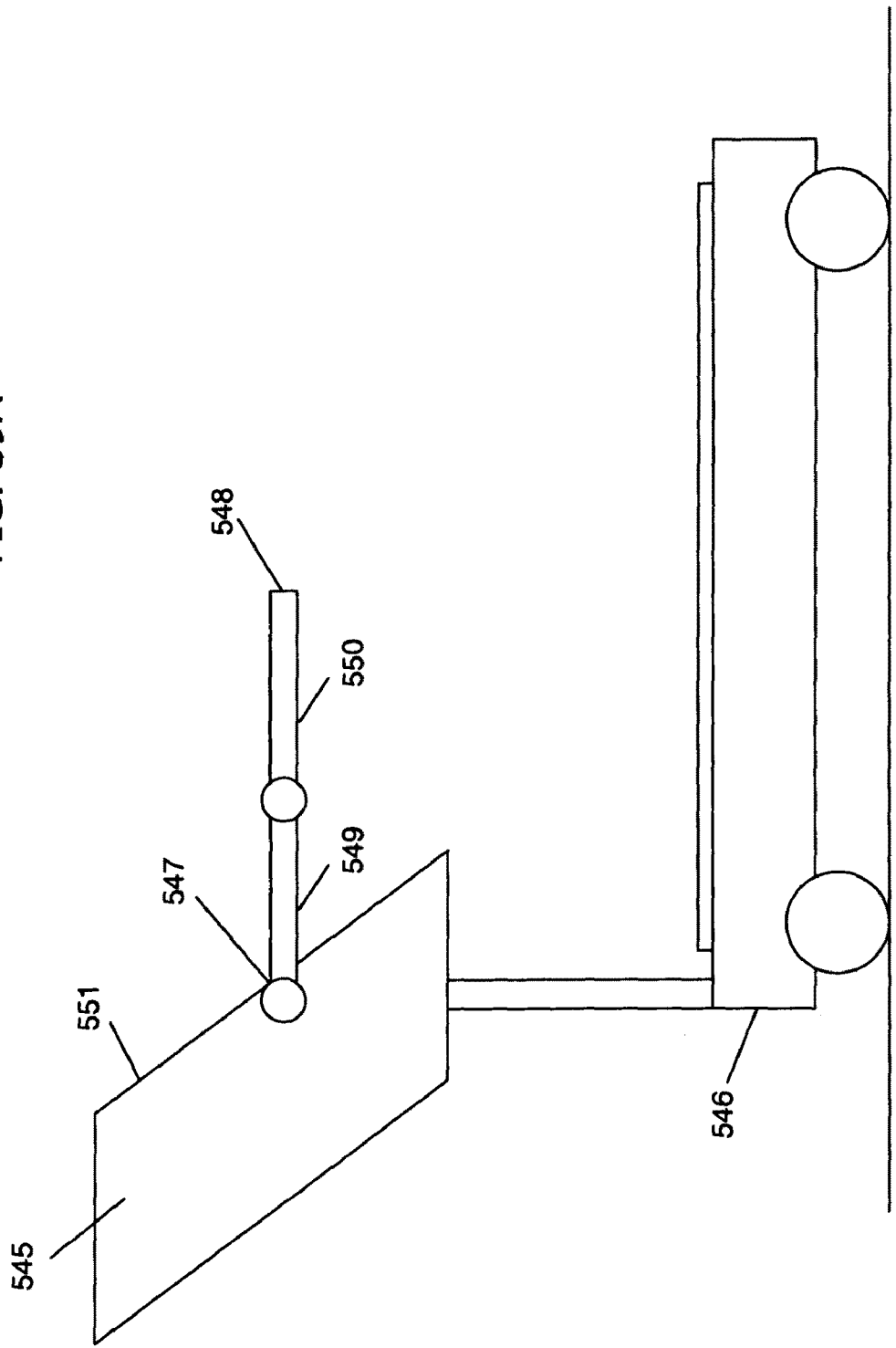

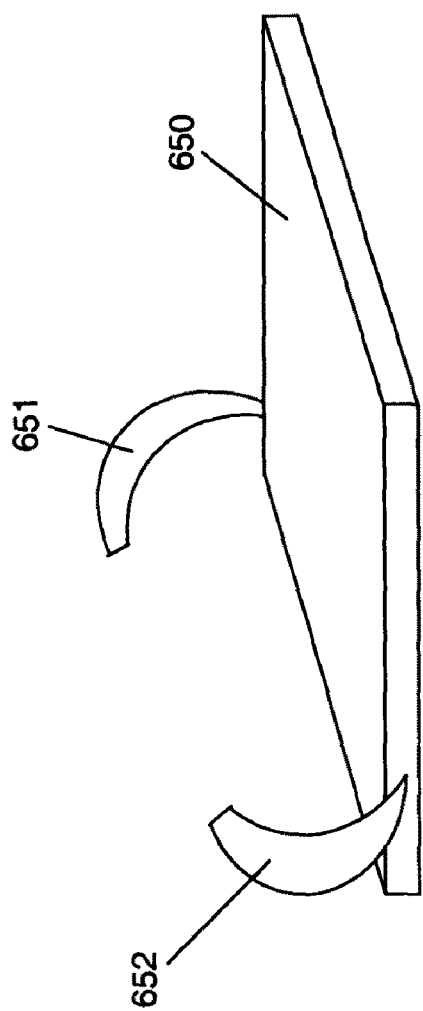

SUPPORT DEVICE FOR ATTACHMENT TO EXERCISE EQUIPMENT AND OTHER APPARATUS

CROSS-REFERENCE TO RELATED APPLICATION

This application claims priority from U.S. Provisional Patent Application Ser. No. 60/877,054, filed on Dec. 26, 2006, and from U.S. Provisional Patent Application Ser. No. 60/920,159, filed on Mar. 27, 2007, the entireties of which are expressly incorporated by reference herein.

FIELD OF THE INVENTION

The field of the invention relates generally to devices for supporting a computer. More specifically, the invention relates to supporting and attaching a computer to a piece of exercise equipment or other apparatus.

BACKGROUND OF THE INVENTION

Using stationary exercise machines such as treadmills, stationary bicycles, elliptical trainers, and stair masters is an extremely popular form of cardio vascular exercise. Millions of these types of exercise machines can be found in commercial health clubs, hotel gyms, businesses and homes throughout the world.

For best results, users of these types of exercise machines typically use the machines 30 to 60 minutes at a time (this is the time necessary for the human body to benefit from exercise) several days a week.

Because the exercise machines are typically located indoors, using the machines for 30 to 60 minutes at a time can become somewhat boring without other forms of distraction to "pass the time". Indeed, many exercise machine users will attempt to read magazines or books while using the machines. For this reason, many exercise machines are designed to include magazine racks that hold the exerciser's magazine or book in front of them so that they can read it while they work out. However, some exercises such as jogging on a treadmill entail excessive body movement that makes it difficult to read small text on a page of a book or magazine.

Watching video is an easier form of distraction while using stationary exercise machines because the images are much larger and do not require the user to read small text. For this reason, many commercial health clubs are equipped with television monitors that the exercisers can watch during their work out. These television monitors are often hung on the wall or from the ceiling in front of the exercise machine so that the users can view them. Home exercisers may position the stationary exercise machine in front of their personal television set so that they too can watch television while they exercise. In addition, more expensive exercise machines have television monitors built into or attached to the machine's control console allowing the user to view their own personal television while they exercise.

However, watching television monitors while using an exercise machine at a health club requires the user to watch whatever programming happens to be on the television monitor at the time of the exercise. In many cases the users do not have control of the television programming and therefore may not enjoy the programming that is presented to them.

If the exerciser does have control of the television set, as is the case for home users, they are still limited to watching whatever shows are available at the time of their workout. In many cases, the time of their workout may not coincide with television programming that they enjoy and they therefore do not get the benefit of the distraction.

Also, exercisers do not typically begin and end their workout on the same schedule as television programming. That is, most television shows begin at the top of the hour or possibly at thirty minutes past the top of the hour. It may not be convenient for the exerciser to begin their workout at the same time a particular television show begins, and therefore they may miss the beginning of the show. In addition, if an exerciser is watching an hour-long show, and their workout ends before the hour is over, they will miss the ending of the show. Unless they have some type of recording device, it will be difficult for them to find the same show again in order to watch the ending.

It would therefore be desirable for the exerciser to have the ability to choose the video they desired, control the time the video starts and have the ability to view it over several workout sessions. One solution to this would be for the exerciser to subscribe to a cable or satellite entertainment provider such as Comcast or DirecTV that provides a multitude of channels as well as movies on-demand. The exerciser could also purchase a digital video recorder (DVR) to be able to save the video that they purchased in order to be able to view it over several workout sessions. However, this solution is very expensive with these services costing hundreds of dollars each month with additional charges to purchase movies. In addition, the purchase of the DVR can also be prohibitively expensive and can cost several hundreds of dollars on top of the monthly service. This solution is also not practical for health clubs, as there would need to be one television and one DVR for each exercise machine.

However, with the recent proliferation of broadband Internet access, online video viewing has become extremely popular. In fact, the top three national broadcasting companies—ABC, NBC and CBS—all offer full episodes of many of their popular television shows on the Internet for free the day after they appear on broadcast television. In addition, millions of other videos are also available online ranging from sports highlights, news programming and a wide variety of other topics. These videos are available for free, and are completely on-demand. That is, the consumer can view the videos whenever they choose, can stop and resume whenever it is convenient, and can do this all for the small cost of an Internet connection.

Given the amount of free online video that is available for on-demand consumption, it would therefore be desirable for the exerciser to be able to view the display of their Internet enabled personal computer or laptop computer while they are using a stationary exercise machine. This way they could watch any online video of their choice at any time they choose using their Internet enabled computer. However, because exercise machines do not have a rack or shelf to hold an Internet enabled computer, the exerciser would need to position the exercise machine such that the display of the personal computer or the laptop is within their view. This may be impractical due to the height and weight of the exercise machine, and there may be no convenient stand or such to hold the computer in the proper position and at the proper height in order to be viewed.

In addition, the user of the exercise machine may also be interested in utilizing other functionality of the Internet and of the computer itself while they use the stationary exercise machine. For instance, they may wish to check their email on their computer while they exercise. In addition, they could view other content in the computer's memory such as documents or videos. They could also listen to music they have stored on the computer, or view content such as movies or other video utilizing the computer's CD or DVD drive. However, this would require that the computer be in very close proximity to the exerciser while they exercise in order to allow the exerciser to engage with the computer's keyboard and mouse. This scenario runs into the same problems as stated above in that there may be no convenient stand or such to hold the computer in the proper position, at the proper height and in close enough proximity for the user to engage with the computer's keyboard and mouse while they use the exercise machine.

Up to this time there has been no system or method to offer a shelf that is either part of the stationary exercise machine or that can be attached to the exercise machine that would hold a computer to allow the exerciser to view online content, check email, view content held in memory within the computer or utilize other functions of the computer while they exercise. Consequently, there has also been no system or method for generating revenue that would benefit from a shelf that is either part of the stationary exercise machine or that can be attached to the exercise machine that would hold a computer, such as a laptop, or a computer monitor to allow the exerciser to view online content, check email, view content held in memory within the computer or utilize other functions of the computer while they exercise.

SUMMARY OF THE INVENTION

In one aspect of the current invention, the foregoing shortcomings are overcome by the effective design of a shelf that is either part of the exercise machine or that can be attached to the exercise machine upon which a computer may be placed in order to allow the person using the exercise equipment to view content on the computer monitor while they exercise.

Because laptop computers are small, self contained and compact, using a laptop computer in conjunction with the invention exemplifies many of the benefits of the invention in that it allows the exerciser to easily place the laptop on the shelf, to manipulate the laptop computer using the laptop's easily accessible keyboard and mouse, and to view content on the laptop's monitor while they exercise. For this reason, the specification will focus primarily on describing the invention with use in conjunction with a laptop computer and will refer to the invention as a laptop shelf. However, it will be apparent to those skilled in the art to which the invention pertains that the scope of the invention is not limited for use with only a laptop computer, and that the invention may be used with any type of electronic equipment that provides content to be viewed by the exerciser while engaging with the stationary exercise machine. Examples of such electronic equipment include DVD players, PDAs, Pocket PCs, smart phones, etc. And while the specification will focus primarily on using the invention with exercise equipment, it will also be apparent to one skilled in the art that the invention may be used with apparatus other than exercise equipment.

The laptop shelf may or may not be a part of the exercise machine's original design.

In several embodiments, the laptop shelf is not originally designed as part of the exercise machine but can be attached to and removed from the exercise machine.

In one embodiment in which the laptop shelf is not part of the exercise machine's original design, the laptop shelf may consist of a back plate and a tray. The back plate may be affixed to the control console or other component of the exercise machine, and the tray may be connected to the back plate so that the tray extends generally horizontally towards the user. This way, the laptop computer may be placed on the tray and the back plate, being connected to the control console or other component of the exercise machine, will hold the tray securely in place. This allows the user to view the laptop screen and utilize the laptop keyboard while engaging the exercise machine.

In one embodiment of this type, the back plate and the tray are permanently connected together and the angle of the tray with respect to the back plate is fixed so that when the back plate is attached to the control console, frame or other component of a particular exercise machine, the tray is generally horizontal with respect to the ground. This allows the laptop to be in a generally horizontal position when resting on the tray.

In another embodiment, the back plate is affixed to the control console, frame or other component of the exercise machine, and the tray is attached to the back plate by a hinge so that the tray may be rotated up and down. This allows the tray to be rotated upward and out of the way for when not in use and downward into a generally horizontal position for when in use with a laptop computer.

In another embodiment, the design of the laptop shelf allows the position of the laptop body when placed on the tray to be adjustable in order to be as close as possible to a horizontal position when the laptop shelf is attached to the exercise machine. The reason this is desirable is that control consoles and other components of different exercise machines are designed to be at different angles with respect to the ground. The angle of the laptop is therefore preferably adjustable so that it can rest in a generally horizontal position independent of the angle of the control console of the exercise machine.

In one embodiment where the angle of the laptop is adjustable with respect to the back plate, the tray upon which the laptop is placed has a series of steps that begin at the back of the tray before the back plate and extend upwards and backwards towards the back plate until the steps intersect the back plate at a position above the plane of the tray. Each of these steps is wide enough and deep enough to securely hold the back of the laptop if the laptop was placed on the particular step. With the laptop placed on a particular step, the back of the laptop is held by the step and the front of the laptop extends forward and intersects the tray portion of the laptop shelf at a position towards the front of the tray. The laptop can therefore be set in a generally horizontal position by choosing the appropriate step upon which to place the back portion of the laptop.

In another embodiment where the angle of the laptop is adjustable with respect to the back plate, the tray is attached to the back plate in such a way that the angle of the tray with respect to the back plate is adjustable. Because the angle of the tray itself with respect to the back plate is adjustable, and the laptop rests fully on the tray, the angle of the laptop body is therefore also adjustable. By adjusting the angle of the tray to be generally horizontal with respect to the ground, the laptop will be held in a generally horizontal position.

In one embodiment of this adjustable type, the tray is attached to the back plate by inserting the back of the tray into a cutout hole in the back plate. The portion of the tray that is inserted into the back plate has an upward pointing lip and a plurality of downward pointing teeth. The lip in conjunction with one of the downward pointing teeth holds the tray attached to the back plate at a particular angle. To set the tray to a generally horizontal position while attached to the back plate, the appropriate downward pointing tooth is chosen to engage with the bottom edge of the cutout hole in the back plate. In this embodiment, the tray is removable so that the back plate may be left in place against the face of the control console when the tray is removed and not in use.

In another embodiment of the adjustable type, the tray is attached to the back plate using a hinge mechanism that allows the tray to be rotated up and down. When the tray is in the down position, it is held in place by an adjustable stop. By adjusting the stop to the proper setting, the tray is held in a generally horizontal position.

There are several ways in which the back plate may be affixed to the exercise machine control console or other component.

In several embodiments, the back plate rests generally flush against the front surface of the exercise machine's control console and is affixed to the exercise machine using one or more straps. These straps may loop through slots in the top or sides of the back plate and extend around the top and back or around the sides of the control console of the exercise machine. The straps may also loop around structural components of the exercise machine such as a cross bar on the frame, or the neck holding the control console.

The straps may be adjustable in length or may be made of elastic material so that they may be drawn tight in order to hold the back plate firmly in place. The straps may also employ snap-in buckles or Velcro so that when the buckles or Velcro are disengaged the ends of the straps may be easily extended around the console or other component of the exercise machine for easy mounting of the back plate. Once in place, the straps can be re-attached to each other or to the back plate re-engaging the buckles or Velcro in order to hold the back plate securely in place.

In another embodiment, the back plate may be secured to the exercise machine control console by one or more hooks that extend from the top of the back plate over the top of the control console and that then hook to some portion of the control console or another component of the exercise machine such as a cross bar.

In another embodiment, the back plate may be secured to the exercise machine control console by one or more straps having hooks with the straps extending from the top of the back plate over the top of the control console and the hooks hooking to some portion of the control console or to another component of the exercise machine such as a cross bar.

In another embodiment, the tray may be affixed to the magazine rack on the control console of an exercise machine through the use of one or more clamps. The clamps may be part of the tray and may be loosened so that the tray is slipped over the magazine rack. The clamps are then tightened to securely attach the tray to the magazine rack on the control console. For additional support, this embodiment may also have a support beam that extends from the bottom of the tray down and backwards until it intersects with the bottom portion of the control console. This support beam will help securely hold the tray generally horizontal when the laptop is placed on the tray for use.

In another embodiment, the back plate and tray are connected together and are held in place against the front face of the exercise machine control console by fitting snugly into the notch formed by the front face of the control console the magazine rack's horizontal top surface and the magazine rack's front vertical front lip.

In another embodiment, the back plate may be secured to the front face of the exercise machine control console and/or to the exercise machine magazine rack using Velcro. Velcro may be affixed to the face of the control console and to the back surface of the back plate. This way, when the back plate is pressed against the face of the control console such that the Velcro on the face of the control console engages with the Velcro on the back surface of the back plate, the back plate is secured in place. In addition, if the exercise machine control console has a magazine rack, Velcro may be affixed to the bottom surface of the back plate or tray and to the top surface of the magazine rack. This way, when the bottom surface of the back plate or tray is pressed against the top surface of the magazine rack such that the Velcro on the bottom surface of the back plate or tray engages with the Velcro on the top surface of the magazine rack, the back plate or tray is held securely in place.

In other embodiments, the laptop shelf may be designed as part of the exercise machine.

In one embodiment where the laptop shelf is designed as part of the exercise machine, the laptop shelf may consist of a tray that extends from the control console of an exercise machine towards the user of the exercise machine in a generally horizontal and secure position upon which a laptop may be placed and used. In this embodiment the laptop shelf may be a permanent part of the exercise machine and may not be removed.

In another embodiment, the laptop shelf is attachable to and detachable from the exercise machine. In this embodiment, the laptop shelf may consist of a tray that is attached to the control console of the exercise machine using a clamp or other means of attachment. When attached, the tray extends from the control console of an exercise machine towards the user of the exercise machine in a generally horizontal and secure position such that a laptop may be placed on the tray and used.

In another embodiment, the laptop shelf consists of a tray that is attached to the exercise machine console or other component of the exercise machine by a hinge such that the tray is able to rotate up or down. In a down position, the laptop shelf is generally horizontal and sturdy so as to hold the laptop for viewing and use. The laptop shelf can be stored by pushing it up into its storage position against the front face of the control console. The tray may be made up of sections that fold upon each other in order to reduce the length of the tray when in storage.

In another embodiment, the laptop shelf is part of the exercise machine console and is deployable by pulling it out horizontally from the control console body. When the laptop shelf is pulled out of the control console it is in a generally horizontal position and is sturdy to hold the laptop for viewing and use. The laptop shelf can then be pushed back into the control console for storage when not in use. The tray may be made up of telescopically collapsing sections to reduce its overall length for when in storage. The tray may also be made up of folding sections to also reduce its overall length when in storage.

In another embodiment, the laptop shelf contains electronic circuitry and buttons that may be programmed to control particular functions of the user's laptop when the laptop is placed on the tray of the laptop shelf. Specifically, the electronic circuitry may be programmed to control which website content the laptop's Internet browser loads for the user to view. For instance, one button on the front of the laptop shelf tray may be programmed to bring up a particular show on the ABC.com website that the user may wish to visit during a workout. Instead of having to use the mouse and keyboard of the laptop to bring up this particular website during a workout (which would necessitate pausing the workout), the user simply pushes the button on the front of the laptop shelf tray that is programmed for that particular website.

The laptop shelf buttons and electronic circuitry may be hardwired with particular web addresses that cannot be changed, or may be programmed using a software program that runs on the user's laptop. The software program may utilize user interfaces that allow the user to enter the desired web addresses into the software program. The software program may then program the laptop shelf's electronic circuitry and the buttons to direct the Internet browser to the websites entered when the buttons are pushed.

In another embodiment, the laptop shelf contains electronic circuitry that control liquid crystal displays (LCD) or other types of displays that are able to display different types of content such as advertising. The LCD displays are positioned on the back plate and/or on the tray to be easily viewed by the user.

The content to be displayed on the LCD displays may be hardwired into the electronic circuitry of the laptop shelf or may be re-programmed periodically. The content to be displayed could be transferred from an outside source such as a computer or a memory stick to the laptop shelf's electronic circuitry. In addition, if the outside source is a computer connected to the Internet, the content could be transferred from the Internet to the computer and then to the electronic circuitry that controls the LCD displays. The LCD displays may be programmed using a software program that utilizes user interfaces in order to identify the content to be displayed and deliver it to the electronic circuitry in the laptop shelf. In this case, the user's laptop could be used with the software program.

In another embodiment, the laptop shelf contains a computer that is built into the laptop shelf. In this case, the user does not require his or her own laptop to view content while they exercise, but instead can use the computer that is built into the laptop shelf for this purpose. The built-in computer may contain all or some of the basic components of a personal computer such as a monitor, a keyboard, a mouse, and the electronic circuitry, hardware and software necessary to operate the computer.

In the above embodiments, the top surface of the tray may have a lip at the front and/or sides to prevent the laptop from sliding off the tray. The tray may also have pads or strips made of rubber or some other material providing friction on its upper surface that engage with the bottom of the laptop thus helping to hold it securely in place and preventing it from sliding off the tray.

In the above embodiments, there may also be a strap that is looped around the keyboard portion of the laptop and the tray portion of the laptop shelf thus holding the laptop securely in place against the tray. There may also be notches or slots in the tray that hold such a looped strap in place.

In the above embodiments, some portions or all of the back plate and the tray may be transparent or may contain cutout holes so that the user can see portions of the exercise machine control console that may be blocked by the laptop shelf by looking through the transparent or cutout portions of the back plate or tray. This may be desirable in order to allow the exerciser to view the readouts on the control console such as elapsed time spent on the exercise machine.

In another aspect of the invention, various methods are employed to generate revenue. This includes novel methods in and of themselves, as well as existing methods that are used in novel applications.

BRIEF DESCRIPTION OF THE FIGURES

FIG. 1 is a diagram of a side view of an exercise machine laptop shelf comprising a back plate and a tray connected together and resting on an exercise machine control console.

FIG. 2A is a diagram of a side view of an exercise machine laptop shelf comprising a back plate and a tray connected together with a hinge with the tray rotated down into a deployed position.

FIG. 2B is a diagram of a side view of an exercise machine laptop shelf comprising a back plate and a tray connected together with a hinge with the tray rotated up into a storage position.

FIG. 3 is a diagram of a side view of an exercise machine laptop shelf comprising a back plate and a tray connected together with a series of steps extending upward from the back of the tray to the back plate upon which the laptop may be placed to adjust the level of the laptop body.

FIG. 4A is a diagram of a side view of an exercise machine laptop shelf comprising a back plate and a tray connected together with a hinge and an adjustable stop so that the angle of the tray in the deployed position may be adjustable.

FIG. 5 is a diagram of an exercise machine laptop shelf comprising a back plate and a tray connected together by inserting the tray into a cutout hole in the back plate.

FIG. 6 is a diagram of the front of an exercise machine laptop shelf back plate with a cutout hole.

FIG. 7 is a diagram of the side cross-section of an exercise machine laptop shelf back plate with a cutout hole.

FIG. 8A is a diagram of the side cross-section of an exercise machine laptop shelf tray with a back portion containing an upward pointing lip and a plurality of downward pointing teeth.

FIG. 9 is a diagram of the top of an exercise machine laptop shelf tray.

FIG. 10 is a diagram of the back of an exercise machine laptop shelf tray.

FIG. 11B is a diagram of a side view of back portion of the laptop shelf tray inserted in to the cutout hole of the back plate of the laptop shelf.

FIG. 12 is a diagram of a side view of one of the downward pointing teeth on the back portion of the laptop shelf tray being positioned over the bottom edge of the cutout hole in the back plate of the laptop shelf.

FIG. 13 is a diagram of a close up side view cross section of the back portion of the exercise machine laptop shelf tray inserted and locked into a position within the cutout hole of the back plate of the laptop shelf.

FIG. 14 is a diagram of a close up side view cross section of the back portion of the exercise machine laptop shelf tray inserted and locked into another position within the cutout hole of the back plate of the laptop shelf.

FIG. 15 is a diagram of a close up side view cross section of the back portion of the exercise machine laptop shelf tray inserted and locked into another position within the cutout hole of the back plate of the laptop shelf.

FIG. 20B is a diagram of a side view of an exercise machine laptop shelf comprising a back plate and a tray connected together and resting on the exercise machine control console magazine rack behind the vertical lip.

FIG. 21 is a diagram of a side view of an exercise machine laptop shelf comprising a back plate and a tray connected together and resting on the control console of an exercise machine and attached to the exercise machine using a strap that extends around the sides of the control console.

FIG. 22 is a diagram of a side view of an exercise machine laptop shelf comprising a back plate and a tray connected together and resting on the control console of an exercise machine and attached to the exercise machine using a strap with a hook.

FIG. 23 is a diagram of a side view of an exercise machine laptop shelf comprising a back plate and a tray attached to the control console of an exercise machine in the proper vertical position.

FIG. 25A is a diagram of the front of a laptop shelf back plate showing slots in the top, sides and bottom of the back plate to accommodate straps.

FIG. 25B is a diagram of the front of a laptop shelf back plate attached to the control console of an exercise machine using two straps.

FIG. 26 is a diagram of a side view cross section of a strap looping through a slot that passes through the body of the laptop shelf back plate located towards the top edge.

FIG. 27 is a diagram of a side view cross section of a strap looping through two slots in the top surface of the laptop shelf back plate.

FIG. 29 is a diagram of an exercise machine laptop shelf comprising a back plate and a tray connected together and resting on the control console of an exercise machine and attached to the exercise machine with a hook.

FIG. 30 is a diagram of an exercise machine laptop shelf comprising a tray that is attached to the magazine rack of an exercise machine console by two clamps.

FIG. 31 is a diagram of an exercise machine laptop shelf comprising a back plate and a tray connected together and held in place against the front face of the exercise machine control console by resting in the notch formed by the control console, the top horizontal surface of the magazine rack and the front vertical lip of the magazine rack.

FIG. 32 is a diagram of a side view of an exercise machine laptop shelf comprising a back plate and a tray connected together and attached to the control console front face and magazine rack using Velcro sections.

FIG. 33 is a diagram of the side view of an exercise machine laptop shelf comprising a tray permanently attached to the control console of an exercise machine.

FIG. 34B is a diagram of a side view of a laptop shelf comprising a tray that is attached to the control console of an exercise machine using a clamp.

FIG. 37A is a diagram of the side view of a laptop shelf comprising a tray made up of telescopically folding sections that is attached to the exercise machine control console and is pulled out of the control console body in its deployed position.

FIG. 38A is a diagram of the side view of a laptop shelf comprising a tray made up of two folding sections that is attached to the exercise machine control console and is unfolded and pulled out of the control console body in its deployed position.

FIG. 38B is a diagram of the side view of a laptop shelf comprising a tray made up of two folding sections that is attached to the exercise machine control console and is folded and pushed into the control console body in its storage position.

FIG. 39A is a diagram of the side view of a laptop shelf comprising a tray that is made up of two folding sections attached to the exercise machine control console by a hinge and folded down into its deployed position.

FIG. 48 is a diagram of a laptop shelf tray with straps that are connected to the rear corner areas of the tray.

DESCRIPTION OF THE PREFERRED EMBODIMENTS

Figure 4B:
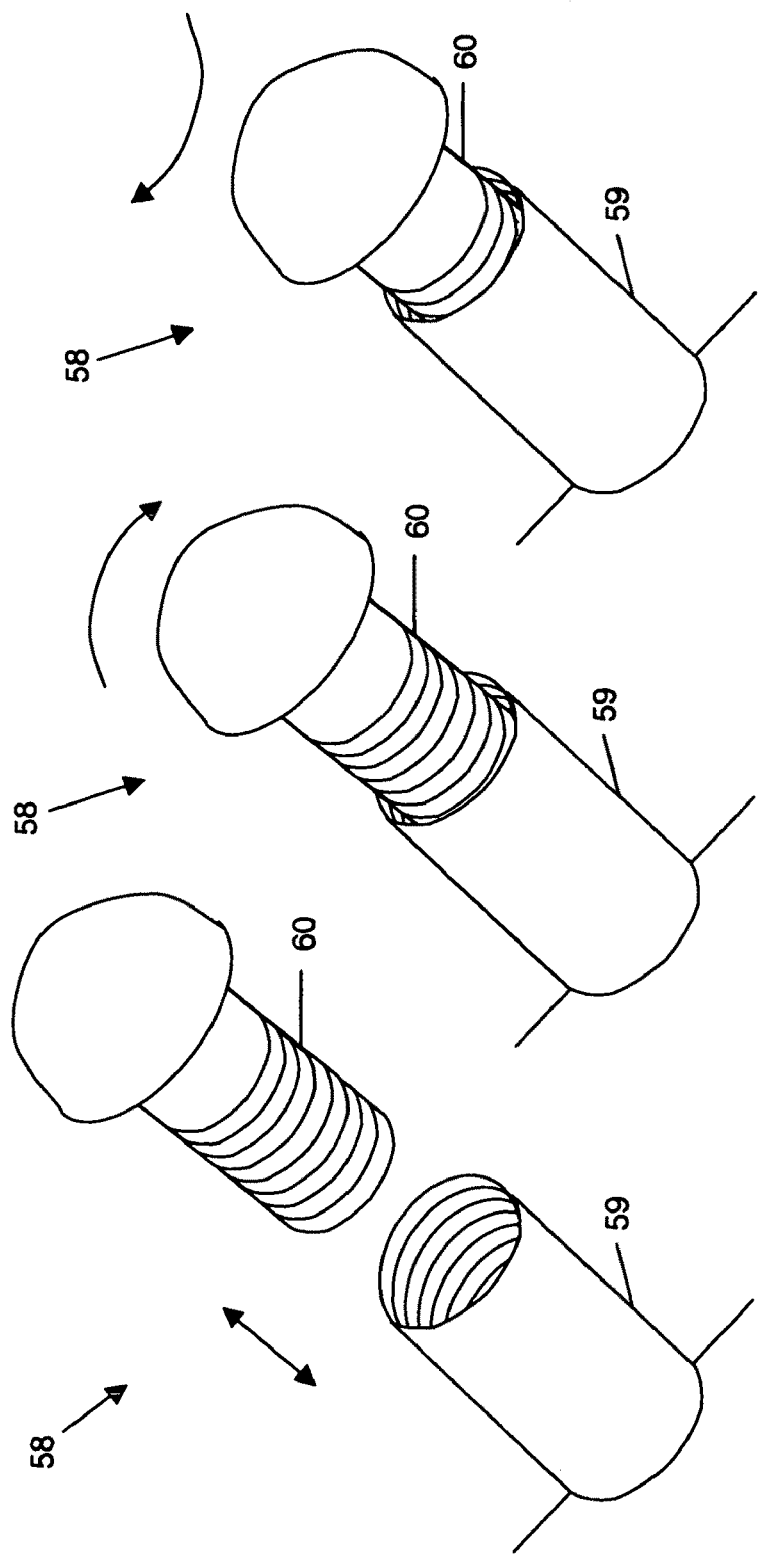
FIG. 4B is a series of three diagrams that represent the functionality of the adjustable stop.

The current invention allows a person to use a computer while engaging in exercise using an exercise machine such as a treadmill, a stationary bicycle, an elliptical trainer, a stair master, or other type of exercise equipment. The invention generally relates to a shelf that is a part of or attaches to the exercise equipment upon which a computer may be placed and positioned so that the user can view content on the computer's screen while engaging with the exercise equipment.

Because laptop computers are small, self contained and compact, using a laptop computer in conjunction with the invention exemplifies many of the benefits of the invention in that it allows the exerciser to easily place the laptop on the invention, to manipulate the laptop computer using the laptop's easily accessible keyboard and mouse, and to view content on the laptop's monitor while they exercise. For this reason, this specification will focus primarily on describing the invention with use in conjunction with a laptop computer and will refer to the invention as a laptop shelf. However, it will be apparent to those skilled in the art to which the invention pertains that the scope of the invention is not limited for use with only a laptop computer, and that the invention may be used with any type of electronic equipment that provides content to be viewed by the exerciser while engaging with the stationary exercise machine. Examples of such electronic equipment include DVD players, PDAs, Pocket PCs, smart phones, etc. Furthermore, the invention may be used to support equipment other than electronic devices.

In addition, while this specification focuses primarily on attaching the invention to the control consoles of various exercise equipment, it will be apparent to those skilled in the art to which the invention pertains that the invention could also be attached to other components of the exercise equipment such as the frame or neck. The invention may also be used with apparatus other than exercise equipment.

FIG. 1 depicts the side view of a laptop shelf 1 preferably comprising a back plate 3 and a tray 4 that are connected together and affixed to the control console 5 of a stationary exercise machine 6. In this embodiment, the laptop shelf 1 is not necessarily part of the original design of the exercise machine 6 and is designed so that it can be attached to and removed from the control console 5 of an exercise machine 6.

The back plate 3 may be affixed to the exercise machine control console 5 such that it rests on the front face 7 of the exercise machine control console 5. The back of the tray 4 has a mount or mounting location 8 that is connected to the back plate 3. The mount or mounting location generally refers to the coupling, connection or other engagement between the back plate 3 and tray 4. As described herein, the mount or mounting location 8 may comprise various configurations in which to couple, connect or otherwise engage the back plate 3 to the tray 4.

While the mounting location 8 of the tray 4 is shown to connect to the back plate 3 at a position towards the bottom of the back plate 3, the mounting location 8 of the tray 4 may connect to the back plate 3 anywhere on the back plate 3 that provides adequate stability.

The back plate 3 and tray 4 may be formed as one contiguous piece, such as by molding. Alternatively, these components may be attached by suitable fasteners.

The front face 7 of the control console 5 is depicted as being smooth with the back plate 3 resting against its smooth surface. However, the control console 5 may include other components that protrude from its front face 7 such as buttons or lips. In this case, portions of the back plate 3 may also rest on these components.

The mounting location 8 of the laptop shelf tray 4 is connected to the back plate 3 so that the tray 4 extends away from the exercise machine's control console's front face 7 towards the person 9 exercising on the exercise machine 6. Also, the tray 4 is attached to the back plate 3 at an angle A with respect to the back plate 3 that results in the tray 4 being generally horizontal with respect to the ground. This allows a laptop computer 10 to be placed on the tray 4 in a position that results in the body of the laptop computer 10 to also be generally horizontal with respect to the ground for best use of its keyboard 11 and viewing of its screen 12. In this scenario, the laptop shelf 1 may be designed for a particular exercise machine 6 that has a control console 5 at a particular angle with respect to the ground such that the angle A is chosen to result in a generally horizontal tray 4. Because the tray 4 is securely connected to the back plate 3 and the back plate 3 is securely affixed to the exercise machine control console 5, the laptop computer 10 is held securely in place and can be used by the person 9 exercising on the stationary exercise machine 6.

FIG. 2A depicts the side view of a laptop shelf 21 preferably comprising a back plate 22 and a tray 23 that are connected together and affixed to the control console 24 of a stationary exercise machine 25. In this embodiment, the laptop shelf 21 is not necessarily part of the original design of the exercise machine 25 and is designed so that it can be attached to and removed from the control console 24 of an exercise machine 25. This embodiment may provide the same functionality as the embodiment depicted in FIG. 1 but with the added functionality that the mounting location 23a of the tray 23 is attached to the back plate 22 using a hinge mechanism 26 so that the tray 23 may be rotated upward into an upper position 27 for when in storage and downward into a generally horizontal position 28 for when deployed. Hinge mechanism 26 may comprise an actual hinge, a flexible piece of material or other suitable hinging means.

When the tray 23 is rotated downward into a lower or generally horizontal position 28, it will engage at least one stop 29 that will hold the tray 23 in a generally horizontal position 28. This stop 29 is shown in FIG. 2A to be part of the back plate 22 but it could also be a part of the tray 23, a part of the hinge mechanism 26 or a separate part that is not necessarily a part of back plate 22, the tray 23 or the hinge mechanism 26 but may be connected to the back plate 22, the tray 23 or the hinge mechanism 26. The stop 29 is designed so that when the tray 23 engages the stop 29, the tray 23 is held at a generally horizontal position 28. The stop 29 is preferably strong enough to hold the tray 23 at the generally horizontal position 28 even when the weight of a laptop computer is placed on the tray 23. While FIG. 2A depicts one stop 29, more than one stop 29 may be used to provide the strength necessary to hold the tray 23 in a generally horizontal position 28 when the weight of the laptop is placed on the tray 23.

As depicted in FIG. 2B, when the tray 23 is rotated upward into an upper position 27, it may become more parallel with the back plate 22 such that it is out of the way for when not in use with holding a laptop. The user simply pushes the tray 23 upward and the hinge mechanism 26 allows the tray 23 to fold upward towards the back plate 22 into an upper position 27. It is not necessary that the tray 23 end up in a position that is fully parallel with the back plate 22, but it is desirable that the tray 23 be able to fold up to an upper position 27 that is generally out of the way for when not in use with holding a laptop. The tray 23 or the back plate 22 may also have a latching mechanism 30 that hooks and holds the back plate 22 and the tray 23 together in a locked upper position 27 when the tray 23 is folded up against the back plate 22. This latching mechanism 30 will prevent the tray 23 from falling down for when not in use. When the tray 23 is folded up, the tray 23 could also be held in place against the back plate 22 by friction in the hinge mechanism 26 such that the force of gravity is not sufficient to pull the tray 23 back down, but instead, the tray 23 must be pulled down with added force supplied by the user to deploy the tray 23 into a lower or generally horizontal position 28.

FIG. 3 depicts the side view of a laptop shelf 36 that may comprise a back plate 37 and a tray 38 that are connected together and affixed to the control console 39 of a stationary exercise machine 40. In this embodiment, the laptop shelf 36 is not necessarily part of the original design of the exercise machine 40 and is designed so that it can be attached to and removed from the control console 39 of an exercise machine 40. This embodiment may provide the same functionality as the embodiment depicted in FIG. 1 but with the added functionality that the angle B of the laptop body 41 with respect to the ground 47 is adjustable depending upon the placement position of the laptop body 41 on the laptop shelf 36. In this case, the angle B of the laptop body 41 with respect to the ground 47 is not strictly dependent on the angle C of the exercise machine control console 39 or the laptop shelf back plate 37 with respect to ground 47.

The reason this is desirable is that control consoles and other components of different exercise machines are designed to be at different angles with respect to the ground. Each exercise machine model may be slightly different. It is desirable that the body of the laptop computer be generally horizontal with respect to the ground, regardless of the angle of the exercise machine control console, for best viewing and stability when the laptop shelf is attached to an exercise machine control console and the laptop is placed on the shelf. When the laptop shelf is attached to an exercise machine control console, which may be at an arbitrary angle with respect to the ground, the angle of the tray attached to the back plate and extending towards the user may or may not be at a generally horizontal position with respect to the ground. Therefore, in order for the laptop computer to be in a generally horizontal position when placed upon the tray, the angle of the laptop computer with respect to the back plate is preferably adjustable in order for the laptop to be set to a generally horizontal position. The fact that the angle of the laptop with respect to the back plate is adjustable allows the laptop shelf to be used with a variety of different exercise machine control consoles, frames or other components at different angles, and still have the ability to accommodate a the laptop in a generally horizontal position.

FIG. 3 depicts the side view of a laptop shelf 36 comprising a back plate 37 and a tray 38 connected together and affixed to the control console 39 of an exercise machine 40. In this embodiment, the mounting location of the laptop shelf 36 includes a series of support steps 42 located generally at the junction 43 between the tray 38 and the back plate 37 with the series of support steps 42 beginning near the rear of the tray 38 before the back plate 37 and extending upwards and towards the back plate 37 until the support steps 42 intersect the back plate 37 at a position 48 above the plane of the tray 38. These support steps 42 are preferably wide enough and deep enough to securely hold the back portion of the laptop 41 when the laptop is placed on a particular support step 44. With the laptop placed on a particular support step 44, the back of the laptop 41 is held by the support step 44 and the front of the laptop 41 extends forward and intersects the tray 38 of the laptop shelf at a position 45 towards the front of the tray as shown in FIG. 3. In this position, the back of the laptop 41 is held by the support step 44 and the front of the laptop 41 is held by the tray 38.

With the laptop shelf 36 affixed to the control console 39 of the exercise machine 40, the angle B of the laptop with respect to the ground 47 depends on the height of the particular support step 44 upon which the back portion of the laptop 41 is resting on relative to the height of the position 45 where the front of the laptop intersects the front portion of the tray 38. Each sequential support step may be slightly higher than the previous support step. When the laptop 41 is placed on a particular support step 44, the front of the laptop 41 will intersect the front portion of the tray 38 at a particular position 45 depending to the length of the laptop body 41.

The number of support steps and the height of each support step with respect to the other support steps is preferably chosen to allow the laptop 41 to be placed at a number of different angles depending on which support step is employed. Having a sufficient number of different support steps and therefore different angles to which the laptop 41 may be adjusted will help ensure that the laptop 41 may be set at a generally horizontal angle B with respect to the ground 47 regardless of the angle C of the exercise machine control console 39 with respect to the ground 47.

In addition, the length of the tray 38 is preferably designed such that it is long enough to ensure that when a laptop 41 is placed on any of the support steps 42 that the there is a forward portion of the tray 38 that will exist under the front of the laptop 41 in order to support the front end of the laptop 41 resulting in the laptop 41 being held in a generally horizontal angle B with respect to the ground 47. It should be noted that the laptop 41 may not be held in an exactly horizontal position when used with each and every exercise control console available, but it is preferred that there will be at least one support step upon which the laptop may be placed that will result in the laptop being held in a generally horizontal angle B so that the laptop is usable and viewable by the person using the stationary exercise machine 40.

Also, the top surfaces 46 of the different support steps 42 need not be parallel with one another. In fact, it may be optimal to design the angles of the top surfaces 46 of the different support steps 42 to coincide with the resulting angle of the laptop body 41 that is formed with the laptop's back portion resting on the particular support step 44 and the front of the laptop 41 intersecting the tray 38 at a particular position 45 towards the front of the tray 38. If the resulting angle of the top surface of the particular support step 44 is similar to the angle of the laptop body 41 when the laptop 41 is resting on the particular support step 44, the surface area of the back portion of the laptop body that comes into contact with the top surface 46 of the support step 44 will be maximized thus providing optimal support to the laptop body 41. Thus, with the back plate 39 attached to an exercise machine control console 39 or other component of the exercise machine 40 at a particular angle C, the laptop can be set to be in a horizontal or nearly horizontal angle B with respect to the ground 47 by choosing the appropriate support step 44 on the laptop shelf tray 38 to rest the back of the laptop 41 on. Resting on the appropriate support step 44, the laptop 41 extends forward and intersects the tray 38 at a position 45 towards the front of the tray 38 and is held in a generally horizontal angle B with respect to the ground 47.

In another embodiment where the angle of the laptop is adjustable with respect to the back plate, the back plate is affixed to the control console or other component of the exercise machine, and the tray is attached to the back plate in such a way that the angle of the tray with respect to the back plate is adjustable. Because the angle of the tray itself with respect to the back plate is adjustable, and the laptop rests fully on the tray, the angle of the laptop body is therefore also adjustable. By adjusting the angle of the tray with respect to the back plate, the laptop may be set to a generally horizontal position regardless of the angle of the back plate.

FIG. 4A depicts the side view of a laptop shelf 51 wherein a back plate 52 and a tray 53 may be connected together and affixed to the control console 54 of a stationary exercise machine 55. In this embodiment, the laptop shelf 51 is not necessarily part of the original design of the exercise machine 55 and is designed so that it can be attached to and removed from the control console 54 of an exercise machine 55. This embodiment may have the same functionality as the embodiment depicted in FIG. 2 with the tray 53 attached to the back plate 52 using a hinge mechanism 56 as the mount so that the tray 53 may be rotated upward when in storage, and downward until it engages a stop 57 when deployed. However, this embodiment has the added functionality that the angle D of the tray 53, with respect to the back plate 52, when engaging a stop 57 in the down and deployed position is adjustable by an adjustable stop 57. That is, the stop 57 may be adjusted to hold the laptop shelf tray 53 at different angles D with respect to the back plate 54.

When the tray 53 is rotated downward, it will engage at least one stop 57 that will hold the tray 53 in a generally horizontal position. FIG. 4A depicts the stop 57 as being adjustable in its height so that it may hold the tray 53 at different angles D with respect to the back plate 54. FIG. 4B depicts the stop 58 comprising two pieces that screw into each other. The base 59 of the stop 58 may be a female receptacle threaded like a nut. The body 60 of the stop 58 may be a male stud threaded like a screw. In this case, the male stop body 60 may be inserted into the female stop base 59 and the length of the entire stop 58 may be adjusted by rotating the stop body 60 clockwise into or counter clockwise out of the stop base 59. By doing so, the length of the stop 57 in FIG. 4A may be adjusted to hold the laptop shelf's tray 53 at different angles D with respect to the back plate 52. The amount of adjustability provided may be altered according to the pitch of the threads. While FIG. 4B depicts the stop as being adjustable by employing this screw and nut design, it may also be adjustable by other means such as notches.

The adjustable stop 57 in FIG. 4A is shown to be part of the back plate 52 but it could also be a part of the tray 53, a part of the hinge mechanism 56 or a separate part that is not necessarily a part of any of these but may be connected to the back plate 52, the tray 53 or the hinge mechanism 56. The stop 57 may be designed so that when the tray 53 engages with the stop 57, the tray 53 is held at a generally horizontal position. The stop 57 is preferably strong enough to hold the tray 53 at the position it is adjusted to even when the weight of the laptop is placed on the tray 53. More than one adjustable stop 57 may be necessary to provide the strength necessary to hold the tray 53 horizontal when the weight of the laptop is placed on the tray 53.

FIG. 5 depicts a laptop shelf 66 that may comprise a back plate 67 and a tray 68 that are connected together and affixed to the control console 69 of a stationary exercise machine 70. In this embodiment, the laptop shelf 66 is not necessarily part of the original design of the exercise machine 70 and is designed so that it can be attached to and removed from the control console 69 of an exercise machine 70. This embodiment may have the same functionality as the embodiment depicted in FIG. 1 but with the added functionality that the tray 68 may be attached to and removed from the back plate 67, and that the angle E of the tray 68 with respect to the back plate 67 when the tray 68 is attached to the back plate 67 may be adjusted.

The design components of the laptop shelf 66 that allow the tray 68 to be attached to the back plate 67 in such a way that the angle E of the tray 68 is adjustable with respect to the back plate 67 are now described.

FIG. 6 depicts the front view of the back plate 75 with an opening 76 configured to receive a mounting location of the tray. In this specification, the opening 76 in the back plate 75 is also referred to as a cutout hole. This opening or cutout hole 76 comprises a top edge 77, a left side edge 78, a right side edge 79 and a lower edge 80. FIG. 6 depicts the cutout hole 76 to be rectangular in shape but it may also be other shapes.

FIG. 7 depicts the side view of the back plate 85 with an opening or cutout hole 86 in the back plate face 87 configured to receive a mounting location of the tray with the opening or cutout hole 86 being made up by a top edge 88 in the face 87, two side edges 89 in the face 87 and a lower edge 90 in the face 87.

FIG. 7 depicts the opening or cutout hole 86 to be comprising edges of the back plate face 87, but could also be designed to be comprising edges in the inner body of the back plate 85. That is, the top edge 88, two sides 89 and the bottom edge 90 that make up the opening or cutout hole 86 do not necessarily have to be flush with the back plate face 87, but could exist in the inner portion of the back plate body 85. In addition, FIG. 7 depicts the opening or cutout hole 86 extending from the front of the back plate face 87 all the way through to the back side 91 of the back plate 85. However, this is not necessarily required, and the cutout hole 86 could extend from the front of the back plate face 87 to an inner point within the body of the back plate 85.

This opening or cutout hole 76 of FIGS. 6 and 86 of FIG. 7 is designed to accommodate a mounting location of the tray that may comprise the back portion of the tray that may be inserted into the cutout hole 76,86 to attach the tray to the back plate 77,85.

FIG. 8A depicts the side view of a tray 95 with a mount or mounting location 96a comprising a back portion 96 of the tray 95 designed to fit into the cutout hole 86 in the back plate 85 depicted in FIG. 7.

FIG. 9 depicts the top view of the tray 110 with a mount or mounting location 111a comprising a back portion 111 of the tray 110 designed to fit into the cutout hole 76 of the back plate 77 depicted in FIG. 6 and the cutout hole 86 in the back plate 85 depicted in FIG. 7.

FIG. 10 depicts the back view of the tray 120 with a mount or mounting location 121a comprising a back portion 121 of the tray 120 designed to fit into the cutout hole 76 in the back plate 76 depicted in FIG. 6. The back portion 121 of the tray 120 as depicted in FIG. 10 that fits into the cutout hole 76 in the back plate 75 depicted in FIG. 6 is designed to have a similar shaped cross section as the cutout hole 76—in this case rectangular—with cross section width dimensions that are slightly smaller than the corresponding back plate cutout hole width dimensions so that this portion of the tray may fit into the cutout hole. That is, the width dimension W1 of the back portion 121 of the tray 120 in FIG. 10 that fits into the cutout hole 76 of the back plate 77 depicted in FIG. 6 is slightly smaller than the width dimension W2 in FIG. 6 of the cutout hole 76 in the back plate 75.

Referring now back to FIG. 8A, this figure depicts the tray 95 having a mounting location 96a comprising the back portion 96 of the tray 95 that fits into the cutout hole 86 in the back plate 85 depicted in FIG. 7 as having an upward pointing lip 94 positioned on the top back edge of the tray 95. FIG. 10 depicts the upward pointing lip 122 extending the entire width W1 of the back portion 121 of the tray 120 that fits into the cutout hole 76 in the back plate 75 as shown in FIG. 6. While the upward pointing lip 122 is shown in FIG. 10 to extend the entire width dimension W1 of the back portion 121 of the tray 120, this is not absolutely necessary. In fact, the upward pointing lip 122 may only extend a portion of this width W1, or may consist of several upward pointing lips that are side-by-side on the top back edge of back portion 121 of the tray 120.

In addition, FIG. 8A depicts the mounting location 96a of the tray 95 comprising a back portion 96 of the tray 95 that fits into the cutout hole 86 in the back plate 85 depicted in FIG. 7 as having a plurality of downward pointing teeth 97-100 positioned on the bottom of the back portion 96 of the tray 95 that fits into the cutout hole 86 in the back plate 85 in FIG. 7. As will be described in later sections, each tooth in the plurality of teeth 97-100 is in effect a unique mounting location of the tray 95. Thus, in this configuration, the tray 95 has multiple mounting locations.

Figure 8B:
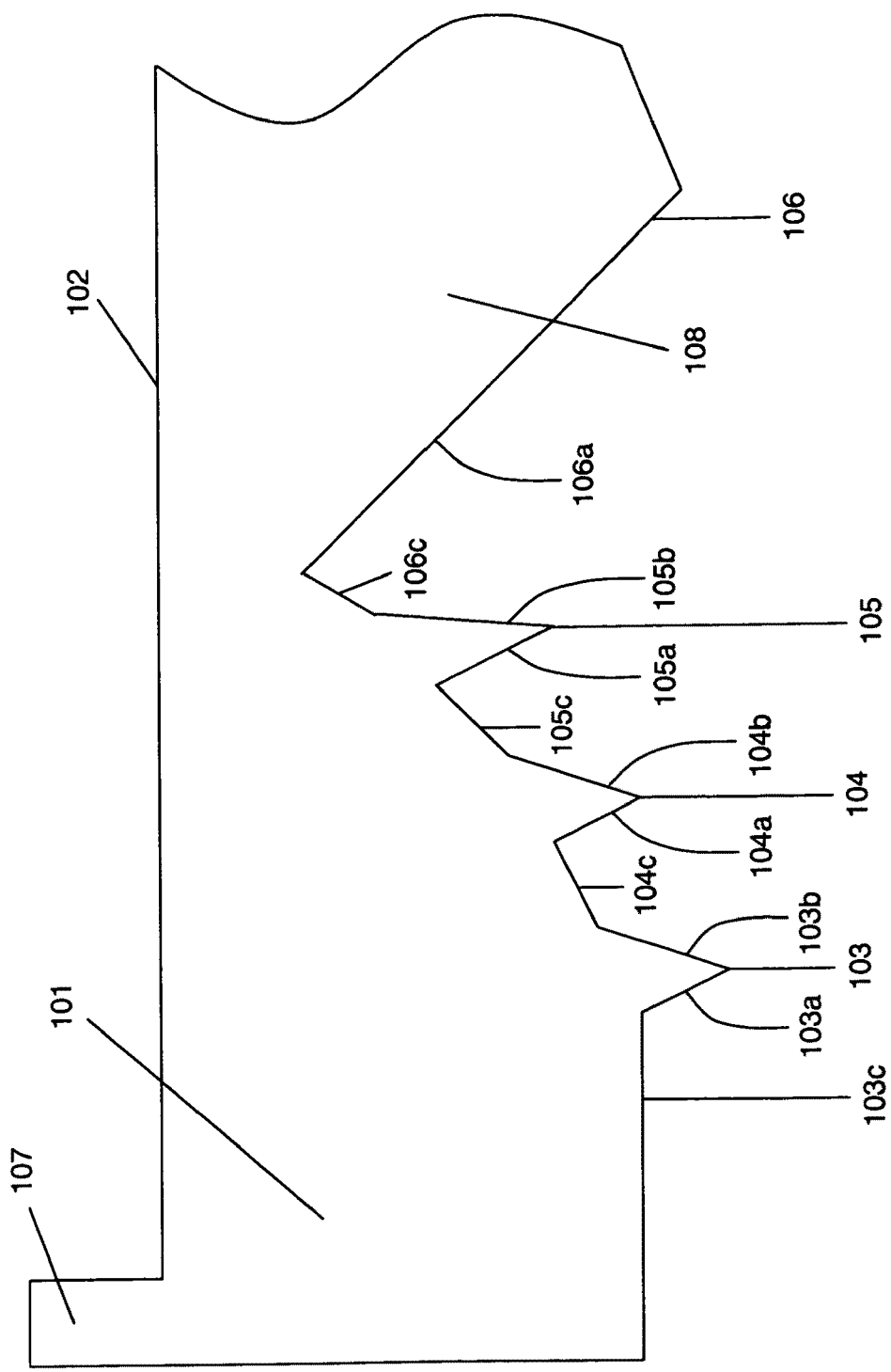
FIG. 8B is a diagram of a close up view of the side cross-section of the back portion of an exercise machine laptop shelf tray containing an upward pointing lip and a plurality of downward pointing teeth.

FIG. 8B depicts a close up side view of the mounting location of the tray 102 comprising a back portion 101 of the tray 102. The downward pointing teeth 103-106 each have back surface 103a-106a and a front surface 103b-106b. Additionally, the downward pointing teeth are in effect separated from each other by notches or upper notch surfaces 104c-106c respectively. For instance, the back surface 103b of downward pointing tooth 103 is separated from the front surface 104a of downward pointing tooth 104 by the notch or upper notch surface 104c. As shown, the upper notch surface 103c to the left of downward pointing tooth 103 does not separate it from another downward pointing tooth because downward pointing tooth 103 is the first downward pointing tooth from the left. This upper notch surface 103c is also referenced as a notch.

As shown, the downward pointing tooth 106 in FIG. 8B may not identically resemble the other downward pointing teeth in that it does not have a front edge. As shown, because downward pointing tooth 106 is the last tooth from the left in the plurality of teeth, and since the front edge of the tooth is not necessary to engage with the bottom edge of the back plate's cutout hole, the front edge of downward pointing tooth 106 has been incorporated into the body 108 of the tray 102.

Each downward pointing tooth 103-106 and each notch or upper notch surface 103c-106c in FIG. 8B preferably has an incrementally different horizontal and vertical position with respect to the upward pointing lip 107 of the back portion 101 of the tray 102 such that each downward pointing tooth and notch combination may define a unique mounting location. One or more of these teeth may extend below the bottom plane of the tray's main body while others may not.

Figure 8C:
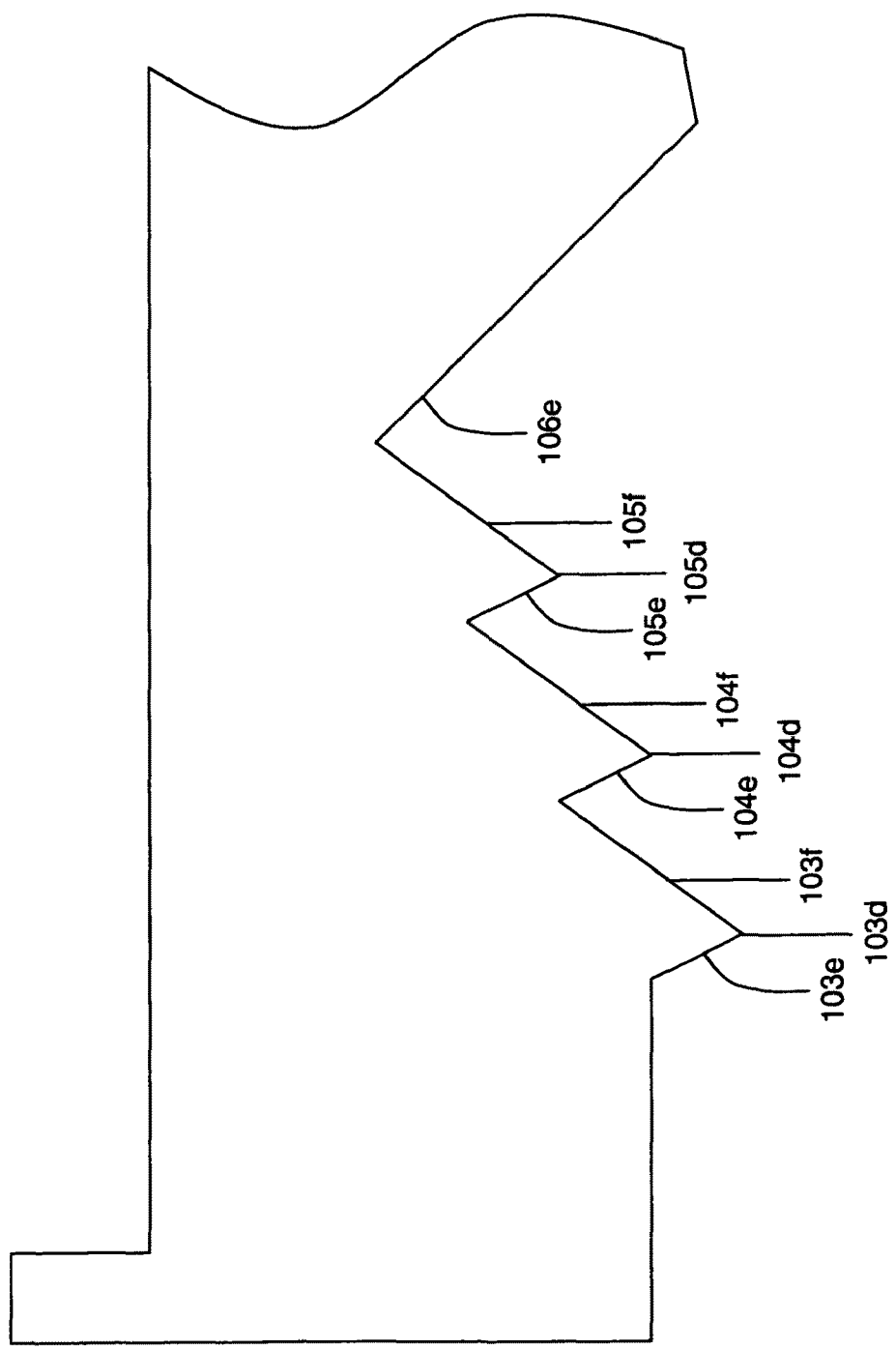
FIG. 8C is a diagram of a close up view of the side cross-section of the back portion of an exercise machine laptop shelf tray containing an upward pointing lip and a plurality of downward pointing teeth where the front surfaces of the teeth and the upper notch surfaces between the teeth are combined.

While FIG. 8B depicts the downward pointing teeth 103-105 front surfaces 103b-105b as being clearly distinct from the notches or upper notch surfaces 104c-106c, these surfaces may be configured in other manners. FIG. 8C depicts a close up side view of the back portion of the tray with the downward pointing teeth 103d-105d front surfaces 103f-105f extending continually and all the way to the beginning of the adjacent teeth back surfaces 104e-106e. In this case, the teeth are not generally separated by notches or upper notch surfaces independent of the front surfaces 103f-105f of the downward pointing teeth 103d-105d, and the notices or upper notch surfaces are integrated into the front surfaces 103f-105f of the downward pointing teeth 103d-105d. For example, front surface 103f of downward pointing tooth 103d extends upward and to the right continually and all the way to the beginning of the back surface 104e of downward pointing tooth 104d without a clearly defined upper notch surface separating the front surface 103f of downward pointing tooth 103d and the back surface 104e of downward pointing tooth 104d.

The integrated front edge of the tooth and upper notch surface combinations 103f-105f of this design as depicted in FIG. 8C will operate similar to the independent and non-integrated front edges 103b-105b of the teeth 103-105 and upper notch surfaces 104c-106c design depicted in FIG. 8B. As described later, the integrated front edges of the teeth and upper notch surface combination 103f-105f preferably engages with the top surface of the bottom edge of the cutout hole in the back plate similar to how the upper notch surfaces 104c 106c engage with the bottom edge of the cutout hole in the back plate as described in a section below.

While the teeth 112-115 and upper notch surfaces 112a-115a are shown in FIG. 9 to extend the entire width W3 of the back portion 111 of the tray 110, this is not absolutely necessary. The teeth 112-115 and the upper notch surfaces 112a-115a may only extend a portion of the width W3, or may consist of several sections of teeth and upper notch surfaces that are side-by-side on the bottom of the back portion 111 of the tray 110.

The height dimension of the mounting location or portion of the tray that fits into the back plate's cutout hole will now be discussed.

In FIG. 8A, excluding the dimension of the upward pointing lip 94 on the upper back edge of the back portion 96 of the tray 95, the resulting height dimension H1 of the back portion 96 of the tray 95 is preferably less than the height dimension H2 of the cutout hole 86 in the back plate 85 depicted in FIG. 7. As shown, this height dimension H1 of the back portion 96 of the tray 95 also includes the dimension of any of the downward pointing teeth that extend below the lower plane of the tray's main body such as tooth 97.

However, including the dimension of the upward pointing lip 94 attached to the back upper edge of the back portion 96 of the tray 95 in FIG. 8A, the full or overall height dimension H3 of the back portion 96 (including the upward pointing lip 94 and downward tooth 97 extending below the tray's main body) of the tray 95 is larger than the height dimension H2 of the cutout hole 86 in the back plate 85 in FIG. 7.

As stated before, the width dimension W1 of the back portion 121 of the tray 120 in FIG. 10 is preferably less than the width dimension W2 of the cutout hole 76 in the back plate 75 in FIG. 6.

The procedure to insert the mounting location 96a comprising a back portion 96 of the tray 95 in FIG. 8A into the opening or cutout hole 86 in the back plate 85 in FIG. 7 in order to attach the tray 95 to the back plate 85 in such a way that the angle of the tray 95 with respect to the back plate 85 is adjustable is now described.

Figure 11A:
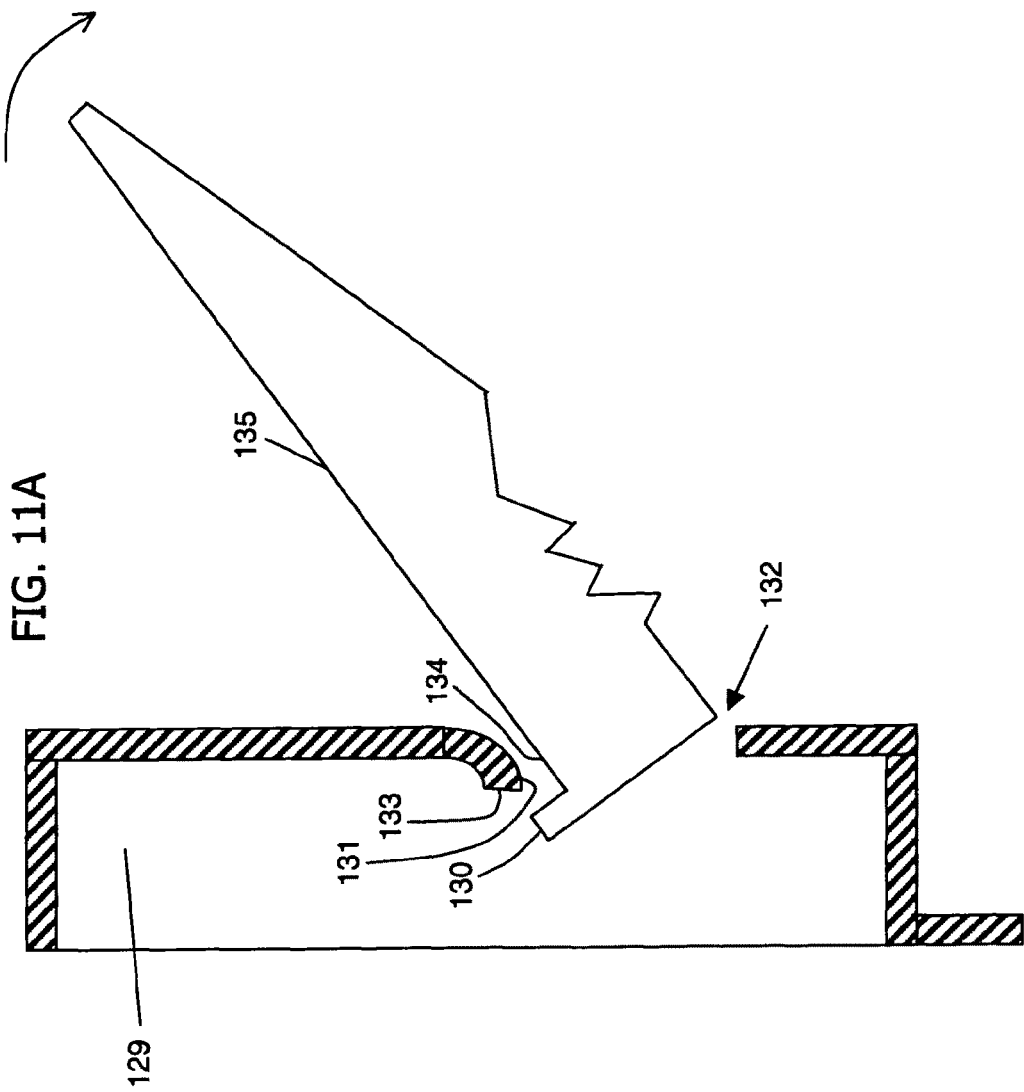
FIG. 11A is a diagram of a side view of the upward pointing lip on the back portion of a laptop shelf tray being inserted into the cutout hole in the back plate of the laptop shelf.

Because the full height dimension H3 of the back portion 96 of the tray 95 (including the upward pointing lip) is larger than the height dimension H2 of the opening or cutout hole 86 in the back plate 85, to insert the tray 95 into the cutout hole 86 in the back plate 85, the upward pointing lip 94 is preferably first inserted into the opening or cutout hole 86 in the area underneath the top edge 88 of the cutout hole 86. FIG. 11A depicts the side view of the upward pointing lip 130 on the back portion 134 of the tray 135 inserted into the opening or cutout hole 132 of the back plate 129 and positioned behind the top edge 131 of the cutout hole 132 and engaging the back surface 133 of the top edge 131 of the cutout hole 132 in the back plate 129.

The tray 135 can then pivot down with respect to the back plate 129 around the pivot point created by the junction of the upward pointing lip 130 on the back portion 134 of the tray 135 and the back surface 133 of the top edge 131 of cutout hole 132 in the back plate 129 to a position shown in FIG. 11B. The top edge 131 of the cutout hole 132 in the back plate 129 may be curved backward along its width as shown in FIG. 11A to add mechanical strength to this pivot point. However, this is not necessary.

In FIG. 11B, the tray 136 can then be pushed into the body 137 of the back plate 138 to a position shown in FIG. 12. In FIG. 12, the upward pointing lip 145 of the back portion 150 of the tray 151 may no longer make contact with the back surface 146 of the top edge 147 of the cutout hole 148 of the back plate 149.

To lock the tray 151 into the back plate 149 at a particular angle F with respect to the back plate 149, the tray 151 is next positioned until one of the downward pointing teeth and notches or upper notch surface combinations (such as the downward pointing tooth 153 and notch 156 combination in FIG. 12) on the bottom of the back portion 150 of the tray 151 is positioned above the bottom edge 152 of the cutout hole 148 in the back plate 149. FIG. 12 depicts the downward pointing tooth 153 and the notch 156 as being positioned above the bottom edge 152 of the cutout hole 148 in the back plate 149.

Once the desired downward pointing tooth 153 and the notch 156 on the bottom of the back portion 150 the tray 151 is positioned above the lower edge 152 of the cutout hole 148 of the back plate 149, the tray 151 may be lowered vertically until the notch 156 engages the top surface 157 of the lower edge 152 of the cutout hole 148, and the back surface 158 of the downward pointing tooth 153 engages with the front surface 154 of the lower edge 152 of the cutout hole 148. The tray 151 may then be slightly rotated downward further until the upward pointing lip 145 comes into contact and engages with the back surface 146 of the top edge 147 of the cutout hole 148 in the back plate 149. This results in the tray and back plate configuration shown in FIG. 13.

FIG. 13 depicts the side view of the back surface 162 of the top edge 163 of the cutout hole 165 in the back plate 161 engaging with the upward pointing lip 164 on the back portion 166 of the tray 160. In addition, FIG. 13 depicts the front surface 168 of the lower edge 170 of the cutout hole 165 engaging with the back surface 167 of the downward pointing tooth 169. As well, the top surface 171 of the lower edge 170 of the cutout hole 165 engages with the notch 172 immediately to the left of the downward pointing tooth 169. In this position, the tray 160 preferably may no longer rotate forward or move downward, and is therefore locked within the back plate 161 at a particular angle G.

The upward pointing lip 164, the downward pointing tooth 169 and the notch 172 on the back portion 166 of the tray 160 are preferably strong enough that when the tray 160 is in this locked position within the back plate 161 as shown in FIG. 13, that the upward pointing lip 164, the downward pointing tooth 169 and the upper notch surface 172 can continue to hold the tray 160 in this locked position within the back plate 161 and to withstand the weight of the laptop when a laptop is placed on the tray 160. In addition, the upper edge 163 and the lower edge 170 of the cutout hole 165 are preferably strong enough to hold the tray 160 in this locked position within the back plate 161 and to withstand the weight of a laptop when the laptop is placed on the tray 160.

The back plate 161 and tray 160 are preferably made of suitably strong material to adequately support the laptop or other device being supported. Example materials include, but are not limited to, polycarbonate and ABS. Another example material is wood. In a preferred embodiment, the back plate 161 and tray 160, as well as their components described above, may be formed by a plastic molding process. The back plate 161 and tray 160 may be formed of transparent material, or tinted or colored materials.

To change the angle G of the tray 160 with respect to the back plate 161 in FIG. 13, the tray is preferably first simultaneously lifted vertically and rotated slightly counter clockwise to disengage the back surface 167 of the downward pointing tooth 169 in the back portion 166 of the tray 160 from the front surface 168 of the lower edge 170 of the cutout hole 165 in the back plate 161. This motion also preferably disengages the notch 172 in the back portion 166 of the tray 160 from the top surface 171 of the lower edge 170 of the cutout hole 165 in the back plate 161. This motion also preferably disengages the upward pointing lip 164 on the back portion 166 of the tray 160 from the back surface 162 of the top edge 163 of the cutout hole 165 in the back plate 161. FIG. 12 generally depicts the resulting position of the tray 151 with respect to the back plate 149 after the above-described procedure.

In FIG. 12, the depth of the back portion 150 of the tray 151 in the cutout hole 148 in the back plate 149 is next adjusted by pushing the tray 151 deeper into or pulling it further out of the cutout hole 148 of the back plate 149. By doing so, a different downward pointing tooth and a different notch or upper notch surface (such as downward pointing tooth 155 and notch or upper notch surface 159 in FIG. 12) on the bottom of the back portion 150 of the tray 151 may be positioned above the lower edge 152 of the cutout hole 148 in the back plate 149. This different downward pointing tooth 155 and different notch or upper notch surface 159 have different horizontal and vertical positions with respect to the upward pointing lip 145 on the back portion 150 of the tray 151 as compared to the previous downward pointing tooth 153 and the previous notch or upper notch surface 156. This new downward pointing tooth 155 and notch 159 combination is therefore a different and unique mounting location than the mounting location formed by the prior downward pointing tooth 153 and notch 156 combination.

The tray 151 is preferably next lowered vertically until the back surface 159a of the newly chosen downward pointing tooth 155 engages with the front surface 154 of the bottom edge 152 of the cutout hole 148 in the back plate 149, the newly chosen notch or upper notch surface 159 engages with the top surface 157 of the bottom edge 152 of the cutout hole 148 in the back plate 149. The tray is preferably next rotated downward so that the upward pointing lip 145 on the back portion 150 of the tray 151 re-engages with the back surface 146 of the top edge 147 of the cutout hole 148 in the back plate 149. In this position, the tray once again preferably locks into position and cannot rotate or move downward.

FIG. 14 depicts the resulting position. The back surface 192 of the downward pointing tooth 187 is engaged with the front surface 191 of the lower edge 190 of the cutout hole 186 in the back plate 181. The upper notch surface 188 engages with the top surface 189 of the lower edge 190 of the cutout hole 186 in the back plate 181. The upward pointing lip 182 on the back portion 185 of the tray 180 engages with the back surface 184 of the upper edge 183 of the cutout hole 186 in the back plate 181.

Holding all dimensions of all components of the trays 160 and 180 and the back plates 161 and 181 in FIG. 13 and FIG. 14 identical respectively, because the downward pointing tooth 187 and notch 188 are at different horizontal and vertical positions with respect to the upward pointing lip 182 in FIG. 14 as compared to the horizontal and vertical positions of the downward pointing tooth 169 and the notch 172 with respect to the upward pointing lip 164 in FIG. 13, the tray 180 is held at a different angle I with respect to the back plate 181 in FIG. 14 as compared to the angle G of the tray 160 with respect to the back plate 161 in FIG. 13.

The above procedure may be repeated while utilizing different downward pointing teeth and different notches on the back portion of the tray in order to set the tray at different angles with respect to the back plate.

While the above-described procedure for inserting the laptop shelf tray into the laptop shelf back plate and adjusting the angle of the tray with respect to the back plate is somewhat detailed, variations of this procedure may also be possible and may result in equivalent outcomes. That is, the tray need not be coupled to the back plate exactly in the manner described above. Indeed, it is preferred that the back plate and tray comprise durable material so that these items may rub against each other without damaging en route to the tray being positioned or repositioned with respect to the back plate.

Each tooth in the plurality of downward pointing teeth on the bottom of the back portion of the tray that fits into the cutout hole in the back plate may be designed to have incrementally different horizontal and vertical positions with respect to the upward pointing lip on the top back portion of the tray, thus giving a specific range of angles that the tray can be set to with respect to the back plate.

FIG. 13 depicts the tray 160 being held at an angle G with respect to the back plate 161 while employing the furthest to the left downward pointing tooth 169 and furthest to the left notch or upper notch surface 172. In this design, the angle G may be approximately 105 degrees.

FIG. 14 depicts the tray 180 being held at an angle I with respect to the back plate 181 while employing the second from the left downward pointing tooth 187 and second from the left notch or upper notch surface 188. In this design, the angle I may be approximately 115 degrees.

FIG. 15 depicts the tray 200 being held at an angle J with respect to the back plate 201 while employing the third from the left downward pointing tooth 202 and third from the left notch or upper notch surface 203. In this design, the angle J may be approximately 125 degrees.

Figure 16:
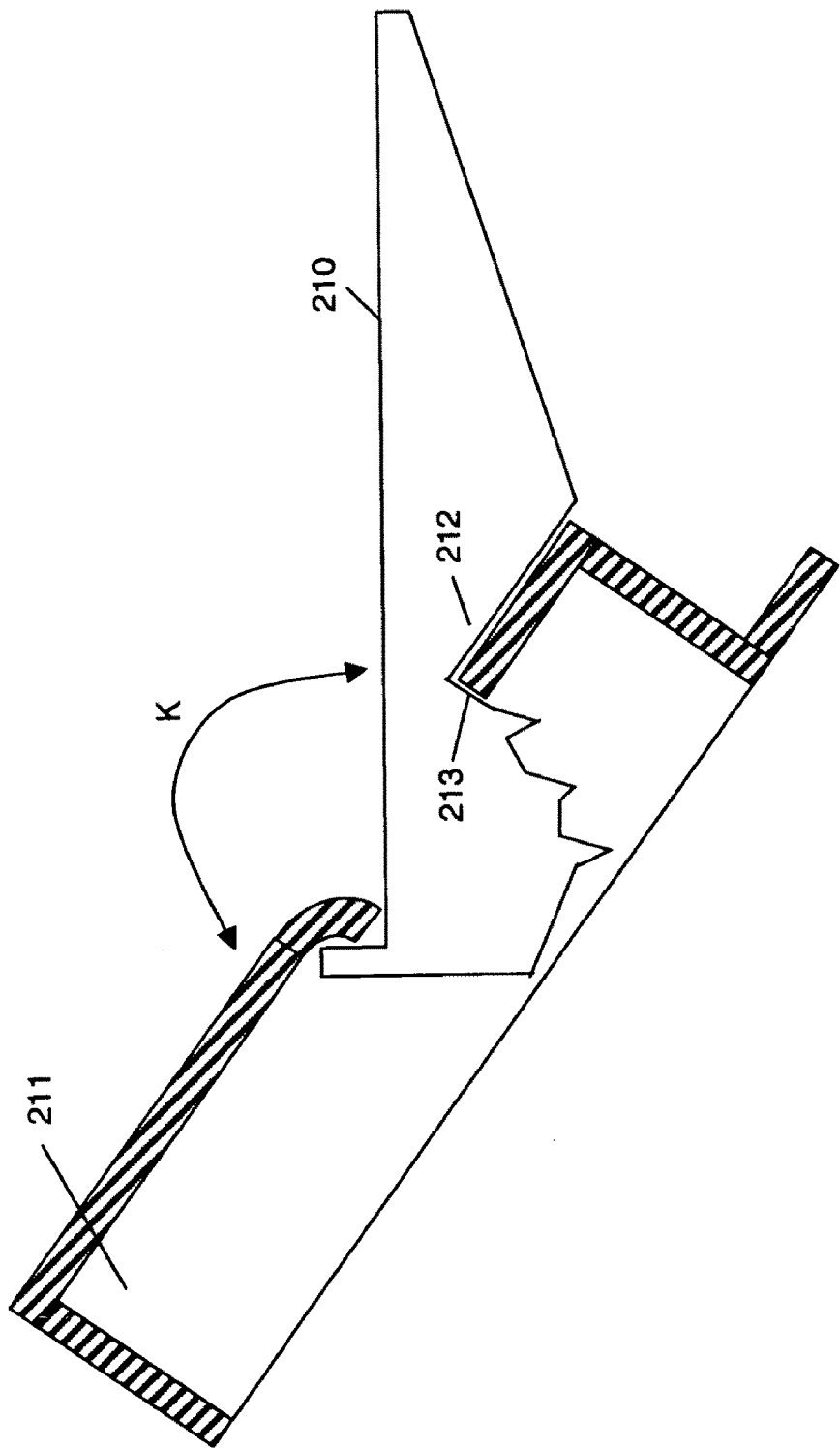
FIG. 16 is a diagram of a close up side view cross section of the back portion of the exercise machine laptop shelf tray inserted and locked into another position within the cutout hole of the back plate of the laptop shelf.

FIG. 16 depicts the tray 210 being held at an angle K with respect to the back plate 211 while employing the fourth from the left downward pointing tooth 212 and fourth from the left notch or upper notch surface 213. In this design, the angle K may be approximately 135 degrees.

One skilled in the art will appreciate that these angles are examples only and that the tray and back plate may be configured to provide other angles of adjustment.

The tray may be removed entirely from the back plate for when not in use by following a procedure that is generally the reverse of the described procedure to insert the tray into the back plate.

The back plate may be left in place affixed to the exercise machine console or other component while the tray is stored. The back plate may be designed to be small enough to not get in the way of the exerciser so that leaving it in place may be more convenient than removing it entirely. This way, when the exerciser wants to again use the tray to hold a laptop for viewing, he or she needs only to reattach the tray into the back plate and adjust the tray's angle to be generally horizontal by choosing the appropriate downward pointing tooth and upper notch surface on the bottom back portion of the tray to engage with the bottom edge of the back plate's cutout hole. Because the back plate was left in place affixed to the exercise machine, the exerciser does not need to reconnect the back plate to the exercise machine.

The back plate may comprise a transparent material to allow the user to view the exercise equipment console while the back plate is attached.

There are several ways that the laptop shelf's back plate may be attached to the exercise machine's control console or other component. These methods of attachment will now be discussed.

Figure 17:
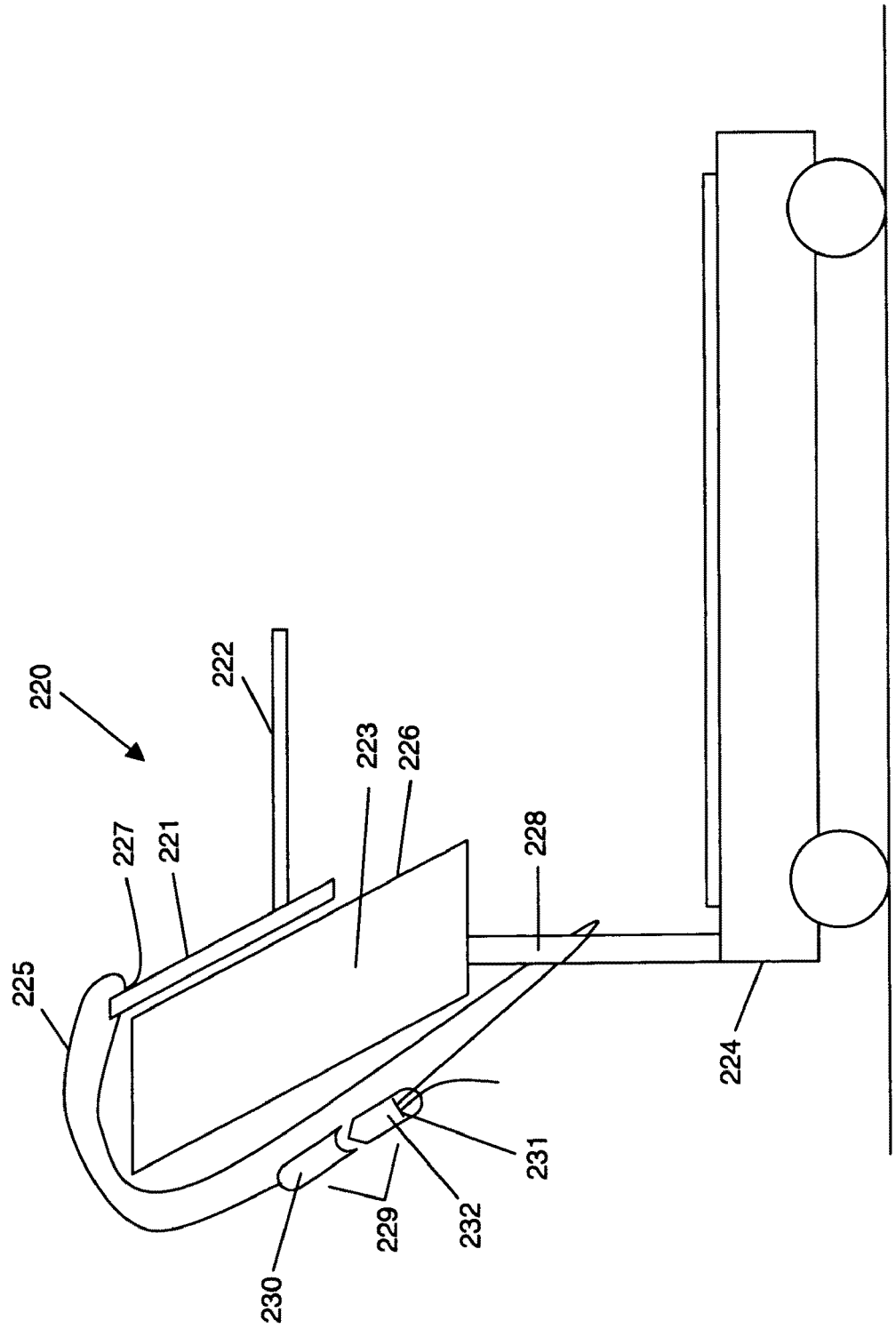
FIG. 17 is a diagram of a side view of an exercise machine laptop shelf comprising a back plate and a tray connected together and resting on the control console of an exercise machine and attached to the exercise machine using a strap with a snap-in buckle.

FIG. 17 depicts a side view of a laptop shelf 220 comprising a back plate 221 and a tray 222 connected together with the back plate 221 affixed to the control console 223 of the exercise machine 224 using a strap 225. The back plate 221 rests flush against the front surface 226 of the control console 223 and is affixed to the control console 223 using one 225 strap. While only one strap 225 is shown, multiple straps may be used. As shown, the strap loops through slots 227 in the top of the back plate 221, extends over the top and down the back of the control console 223, loops around a structural component of the exercise machine 224 (in this case the neck 228 holding the control console 223), extends back up towards the top of the console 223 and connects back to the other end of the itself using a snap-in buckle 229. While FIG. 17 depicts the back plate 221 to be affixed to the control console 223 of the exercise machine 224, it may also be attached to any other component of the exercise machine 224 that allows the back plate 221 to be secure and that allows the tray 222 that is connected to the back plate 221 to be in a position allowing the laptop to be placed on the tray 222 in view of the exerciser for viewing and use. The slots 227 in the back plate 221 through which the strap 225 is looped will be described in a later section.

The snap-in buckle 229 used with the strap 225 in FIG. 17 allows the back plate 221 to be easily attached to and removed from the control console 223 of the exercise machine 224. To secure the back plate 221 to the control console 223, the back plate 221 is placed on the front face 226 of the control console 223 and the strap 225 is looped through the slot 227 in the top of the back plate 221. Both ends of the strap 225 are then positioned to hang over the top and down the back of the control console 223. One end of the strap 225 is then looped around the neck 228 of the exercise machine 224 supporting the control console 223 and then connected to the other end of the strap 225 utilizing the snap-in buckle 229. While one end of the strap 225 is fixedly attached to one side of the buckle 229 (in this case the female side 230), the other end of the strap 225 is looped through slots 231 on the other side of the buckle 229 (in this case the male side 232) so that the position of the male side 232 of the buckle 239 on the strap 225 may be adjustable. The slots 231 in this part of the snap-in buckle 229 are designed to lock the position of the buckle 229 on the strap 225 once the strap 225 is pulled tight. In the case of FIG. 17, with the male side 232 and female side 230 of the buckle 229 snapped together, the end of the strap 225 that is looped through the male side 232 of the buckle 229 may be pulled down to tighten the loop of the strap 225 around the control console 223 and the supporting neck 228 of the exercise machine 224. Once the loop of the strap 225 is tightened, the slots 231 in the male side 232 of the buckle 229 lock the male side 232 of the buckle 229 to the strap 225 so that the tightened loop of the strap 225 is held secure. It should be noted that FIG. 17 does not depict the strap 225 as being properly tightened to securely hold the back plate 221 to the front face 226 of the control console 223 of the exercise machine 224 but is instead meant to illustrate the various components discussed.

Figure 18:
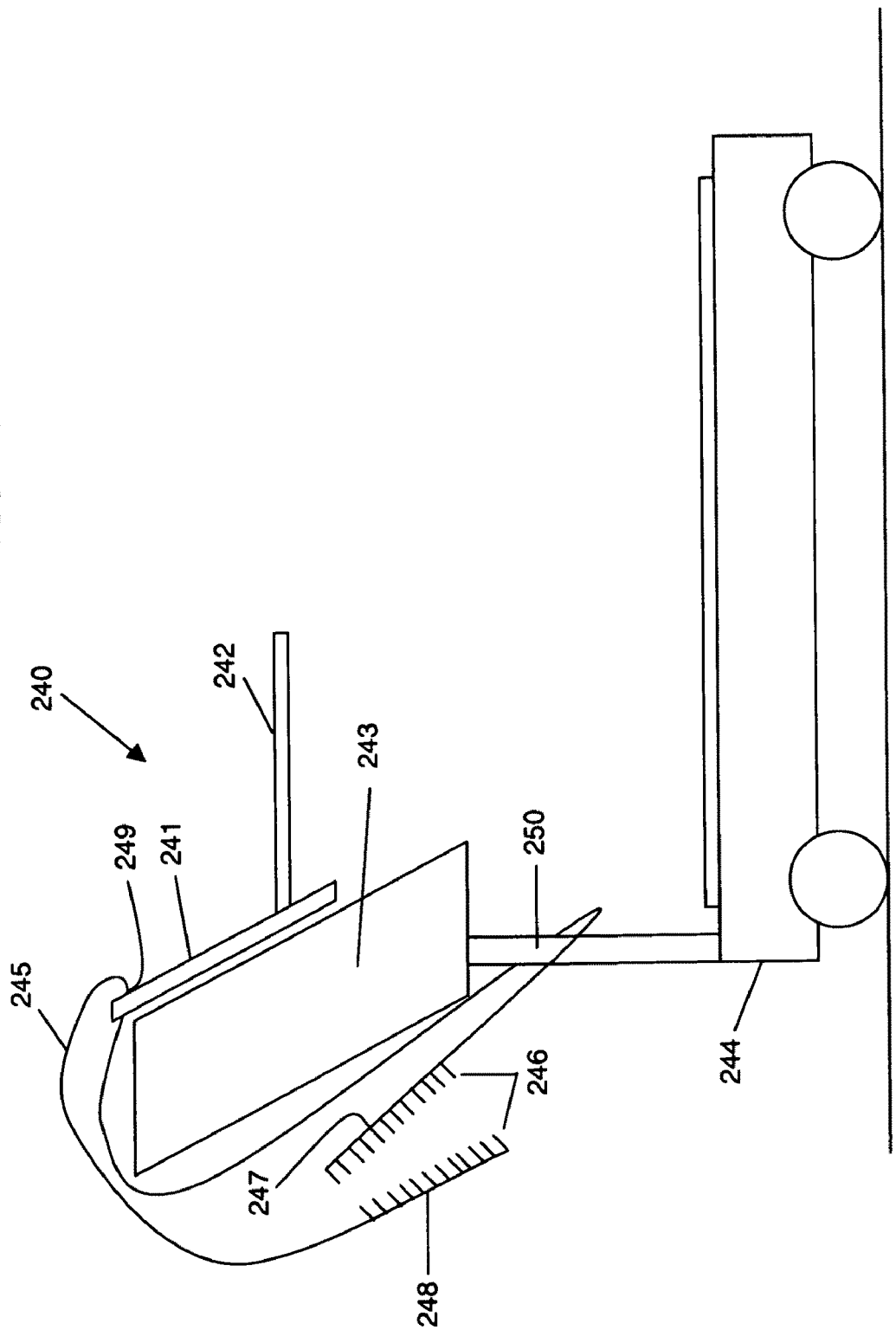
FIG. 18 is a diagram of a side view of an exercise machine laptop shelf comprising a back plate and a tray connected together and resting on the control console of an exercise machine and attached to the exercise machine using a strap with Velcro sections.

FIG. 18 also depicts a side view of a laptop shelf 240 comprising a back plate 241 and a tray 242 connected together with the back plate 241 affixed to the control console 243 of the exercise machine 244 using a strap 245. However, the strap 245 in FIG. 18 uses Velcro strips 246 in lieu of the snap-in buckles in order to attach the two ends of the strap 245 together. In this case, a male section 247 of Velcro is attached to one end of the strap and a female section 248 of Velcro is attached to the other. The strap 245 loops through slots 249 in the top of the back plate 241, extends over the top and down the back of the control console 243, loops around a structural component of the exercise machine 244 (in this case the neck 250 holding the control console 243), extends back up towards the top of the control console 243 and is connected to the other end of the itself when the male section 247 and the female section 248 of the Velcro 246 are pressed together.

Figure 19:
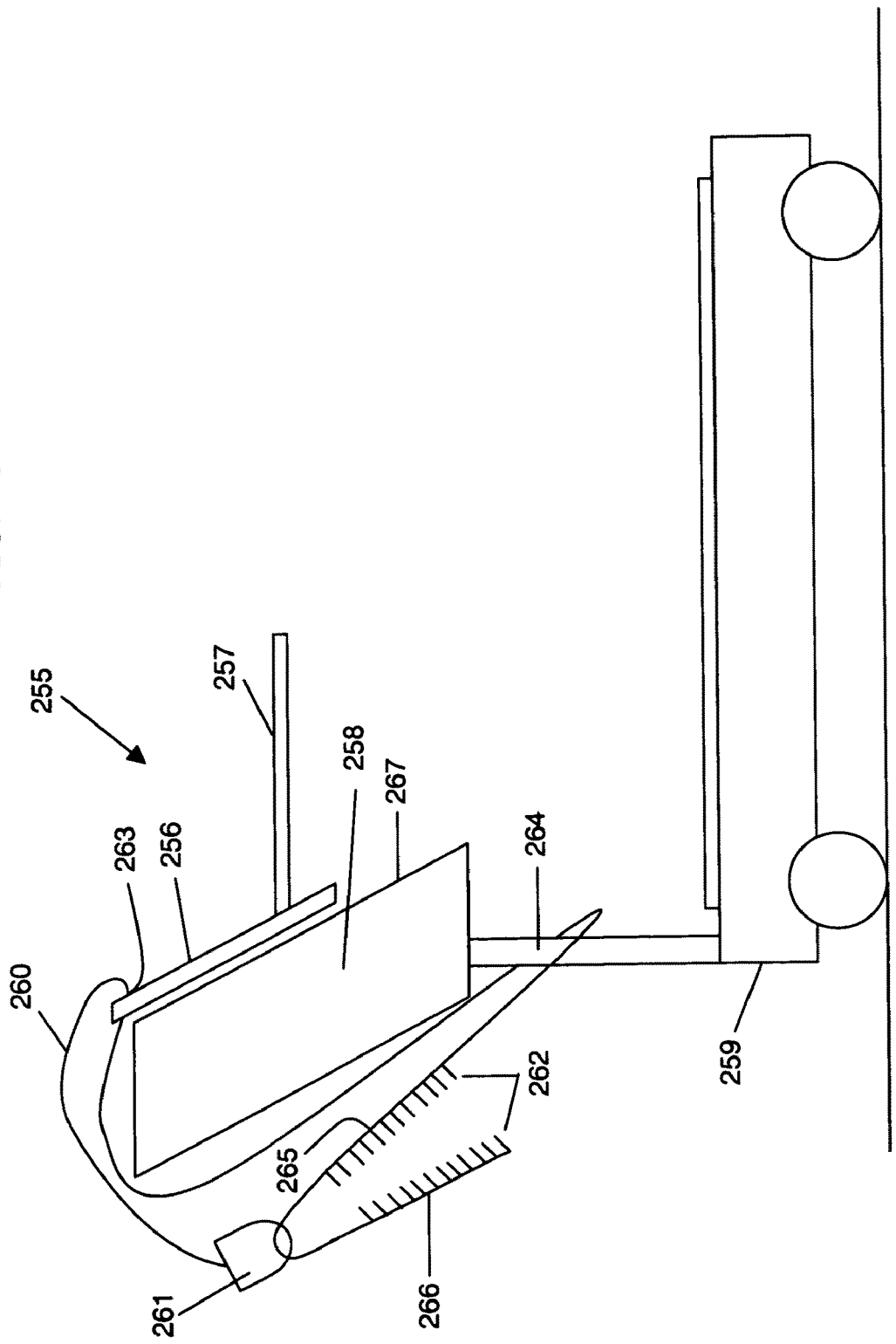
FIG. 19 is a diagram of a side view of an exercise machine laptop shelf comprising a back plate and a tray connected together and resting on the control console of an exercise machine and attached to the exercise machine using a strap with Velcro sections and a loop.

FIG. 19 also depicts a side view of a laptop shelf 255 comprising a back plate 256 and a tray 257 connected together with the back plate 256 affixed to the control console 258 of the exercise machine 259 using a strap 260. However, the strap 260 in FIG. 19 uses a loop 261 attached to one end of the strap 260 as well as Velcro sections 262 in order to tighten and attach the two ends of the strap 260 together. The strap 260 loops through slots 263 in the top of the back plate 256, extends over the top and down the back of the control console 258, loops around a structural component of the exercise machine 259 (in this case the neck 264 holding the control console 258), extends back up towards the top of the control console 258. One end of the strap 260 contains a loop 262 attached to it, while the other end has a male Velcro section 265 and a female Velcro section 266 attached to its surface. To attach the strap ends together tightly, the end of the strap without the loop is slipped through the loop 261 that is attached to the other end of the strap and is then pulled down upon itself so that the male Velcro section 265 and female Velcro sections 266 engage with each other to hold the strap tight and the back plate in place. The male Velcro section 265 and the female Velcro section 266 are designed to be long enough and in the proper position on the strap 260 so that a portion of each section is able to engage with a portion of the other section when the strap is pulled tight through the loop 261 and the back plate 256 is held flush against the front face 267 of the control console 258 of the exercise machine 259.

Figure 20A:
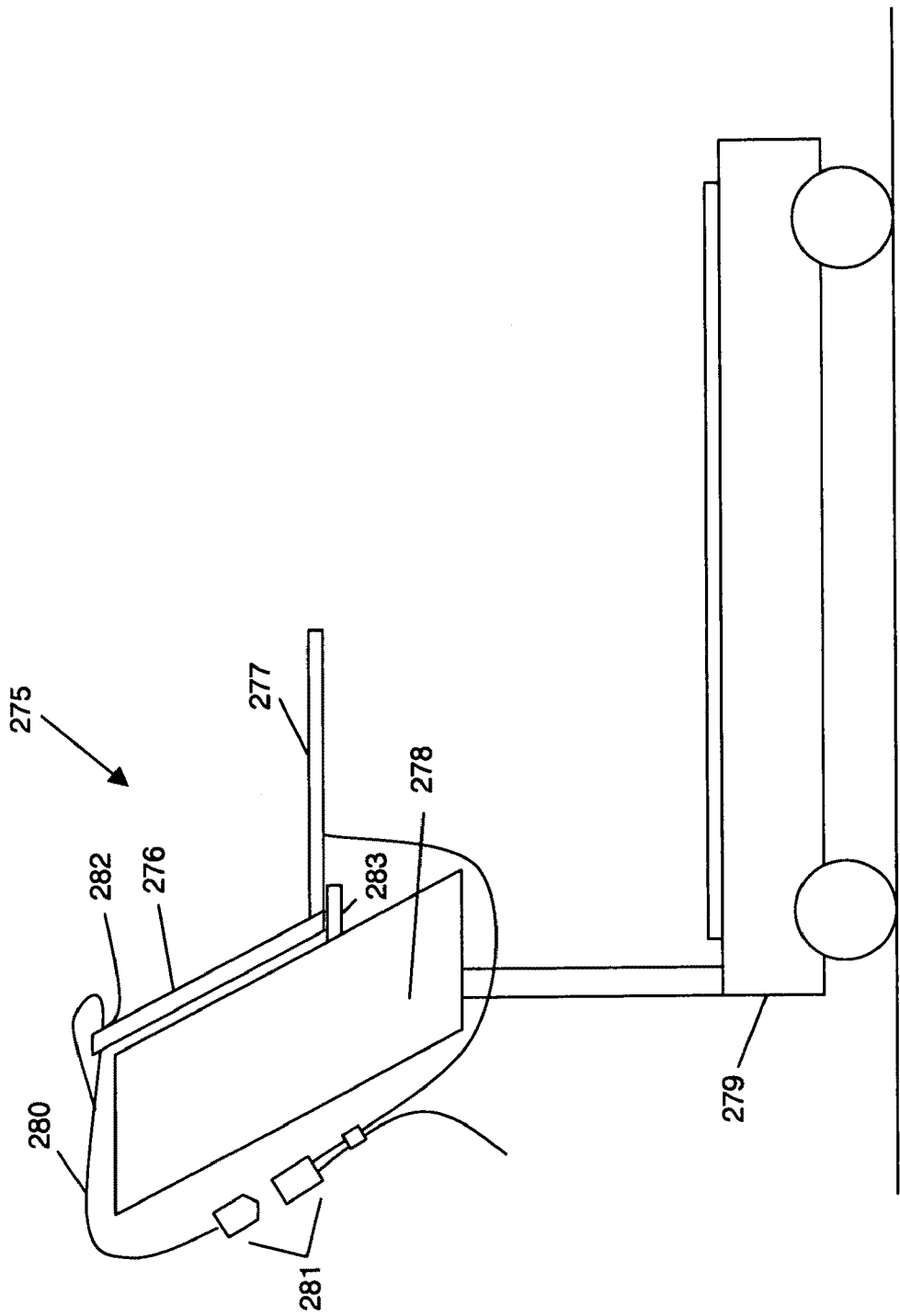
FIG. 20A is a diagram of a side view of an exercise machine laptop shelf comprising a back plate and a tray connected together and resting on the control console of an exercise machine and attached to the exercise machine using a strap with a snap-in buckle that extends underneath the control console to the bottom of the tray.

FIG. 20A also depicts a side view of a laptop shelf 275 comprising a back plate 276 and a tray 277 connected together with the back plate 276 affixed to the control console 278 of the exercise machine 279 using a strap 280. The strap 280 in FIG. 20A includes a snap-in buckle 281 with the same functionality as the snap-in buckle 229 as depicted in FIG. 17. However, in this case the strap 280 loops through slots 282 in the top of the back plate 276 and extends from the top of the back plate 276, over the top and around the back of the control console 278, underneath the control console 278 and attaches to the bottom of the tray 277. While FIG. 20A shows the laptop shelf resting on the magazine rack 283 of the control console 278, other configurations may be used. Also, if the magazine rack 278 does not exist on control console 278, the bottom of strap 280 could just as well be attached to the bottom portion of the back plate 276 instead of to the bottom portion of the tray 277.

It should be noted that some magazine racks located on control consoles of exercise machines contain a front upward pointing lip as depicted in FIG. 20B. FIG. 20B depicts a side view of a laptop shelf 275a comprising a back plate 276a and a tray 277a connected together and resting on the front face 284 of the control console 278a of an exercise machine 279a. The bottom 285 of the back plate 276a is also resting on the top surface 283b of the magazine rack 283a connected to the front face 284 of the control console 278a. The magazine rack 283a consists of a generally horizontal surface 283b and an upward pointing lip 283c at the front end of the magazine rack 283a. In order for the bottom 285 of the back plate 276a to fit into the magazine rack 283a and rest on the top horizontal surface 283b of the magazine rack 283a, the bottom 285 of the back plate 276a that fits into the magazine rack 283a preferably has a thickness that is less than the dimension of the top surface 283b of the magazine rack 283a from the front face 284 of the control console 278a to the upward pointing lip 283c of the magazine rack 283a as shown. In addition, the tray 277a is preferably connected to the back plate 276a at a distance above the bottom 285 of the back plate 276a that rests inside the magazine rack 283a so that the bottom of the tray 277a does not intersect with the upward pointing lip 283c at the front edge of the magazine rack 283a as shown.

FIG. 21 also depicts a side view of a laptop shelf 290 comprising a back plate 291 and a tray 292 connected together with the back plate 291 affixed to the control console 293 of the exercise machine 294 using a strap 295. However, FIG. 21 depicts the strap 295 as connected to and extending from the side 296 of the back plate 291 and around the back of the control console 293 and connected to the other side of the back plate 291 in order to secure the back plate 291 to the control console 293 of the exercise machine 294. While a snap-on buckle similar to the snap-in buckle 229 of FIG. 17 is not depicted in FIG. 21, a snap-in buckle may also be employed in the embodiment depicted in FIG. 21 in order to easily attach and detach the back plate 291 and to tighten the length of strap 195 around the control console 293 to securely hold the back plate 291 firmly against the face 297 of the control console 293 of the exercise machine 294.

In this case, if the strap 295 does not extend over the top of the control console 294 or other component that would lend vertical support, the laptop shelf 290 may be placed on the magazine rack 298 if the magazine rack 298 exists as part of the control console 293. Placing the laptop shelf 290 on the magazine rack 298 of the control console 293 provides vertical support while the strap 295 extending around the sides of the control console 293 provide lateral support such that the laptop shelf 290 is held securely in position.

FIG. 21 also depicts a lower support beam 299 that extends from the bottom of the tray 292 of the laptop shelf 290 to a lower position on the face 297 of the control console 293 of the exercise machine 294 in order to provide added vertical support to the tray 292 to help the tray 292 stay in a secure and generally horizontal position when the weight of the laptop 300 is placed on the tray 292. While this lower support beam 299 may help support the tray 292, it may not be required in all cases.

FIG. 22 also depicts a side view of a laptop shelf 305 comprising a back plate 306 and a tray 307 connected together with the back plate 306 affixed to the control console 308 of the exercise machine 309 using a strap 310 with a hook 311 attached to the strap 310. The strap 310 is connected to and extends from the top of the back plate 306 over the top of the control console 308 and the hook 311 attaches to the upper back edge 312 of the control console 308. While FIG. 22 depicts the hook 311 attaching to the upper back edge 312 of the control console 308 of the exercise machine 309, the hook 311 could just as well attach to any other convenient component of the control console 308 or exercise machine 309 such as a cross bar of the frame.

Similar to the strap 225 looping through slots 231 in the male part 232 of the snap-in buckle 229 of FIG. 17, the strap 310 may be looped through a slot 313 in the hook 311 in FIG. 22 so that the position of the hook 311 on the strap 310 may be adjustable. The slot 313 in the hook 311 is designed to lock the position of the hook 311 on the strap 310 once the strap 310 is pulled tight. Given this, the strap 310 is attached to the top of the back plate 306 and may be looped through the slots 313 in the hook 311. The length of the strap 310 from the top of the back plate 306 to the hook 311 can then be adjusted so that the hook 311 is able to engage with the back edge 312 of the control console 308 of the exercise machine 309 with the strap 310 being taught in order to hold the back plate 306 in place against the front face 314 of the control console 308 of the exercise machine 309.

The hook 311 may be made of ridged material and may also have a portion of hook 311 that is flexible so that the shape of the hook 311 may be adjusted to properly and securely hook onto a component of the exercise machine 309. The hook 311 must be made of a strong enough material so that it is able to remain hooked to a component of the exercise machine 309 and hold the back plate 306 securely in place when the weight of the laptop is applied to the tray 307 of the laptop shelf 305. While only one strap 310 with one hook 311 is depicted in FIG. 22, multiple straps with multiple hooks may be employed.

FIG. 23 depicts a side view of a laptop shelf 320 comprising a back plate 321 and a tray 322 connected together with the back plate 321 affixed to the control console 323 of the exercise machine 324 using a strap 325. The purpose of this figure is to illustrate the preferred position of the back plate 321 when it is affixed to the control console 323 of the exercise machine 324. FIG. 23 depicts the strap 325 tightened and holding the back plate 321 of the laptop shelf 320 flush against the front face 326 of control console 323, with the top surface 327 of the back plate 321 positioned to be close to the same top level as the top surface 328 of the control console 323 of the exercise machine 324.

Figure 24A:
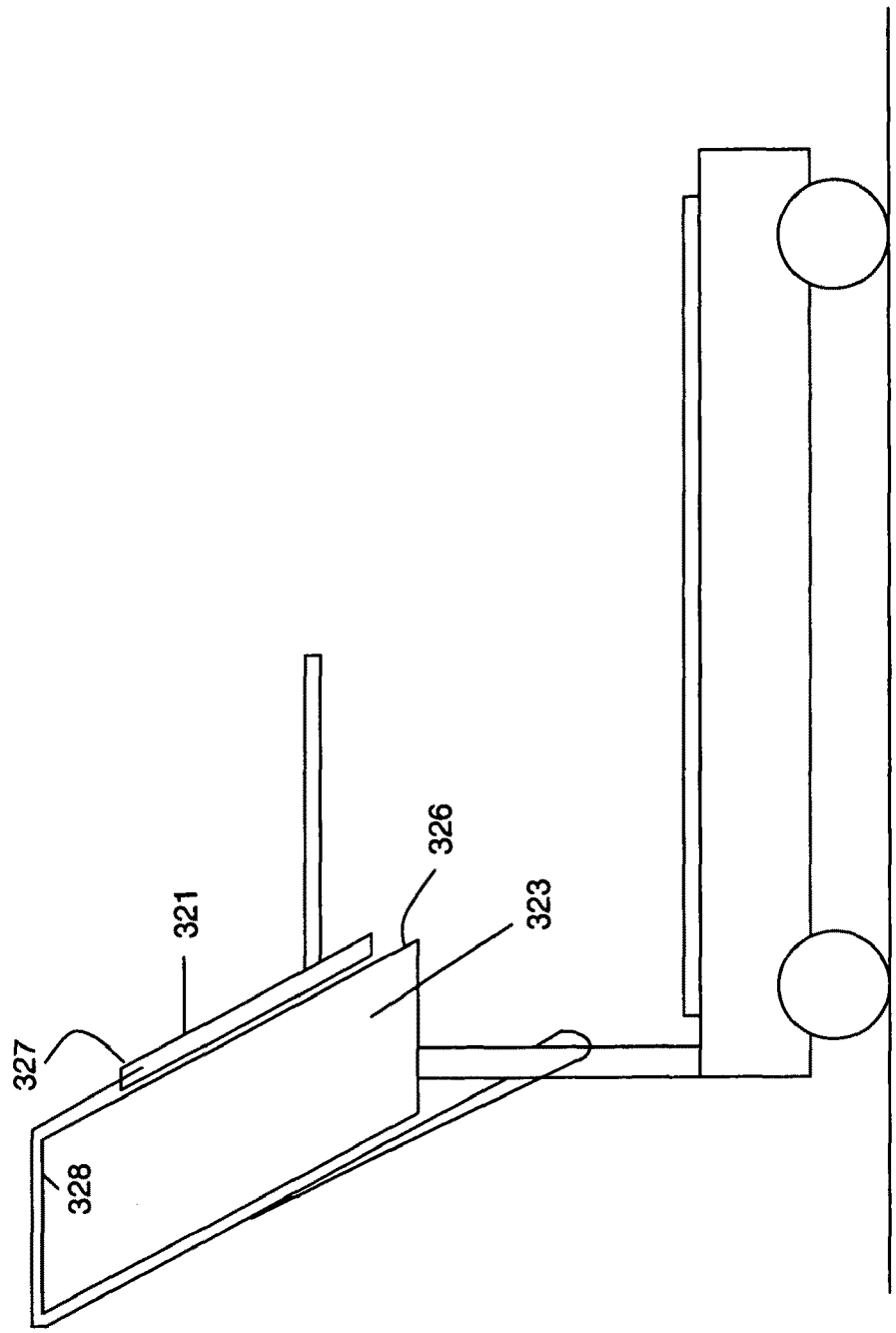
FIG. 24A is a diagram of a side view of an exercise machine laptop shelf comprising a back plate and a tray attached to the control console of an exercise machine in the improper vertical position.
Figure 24B:
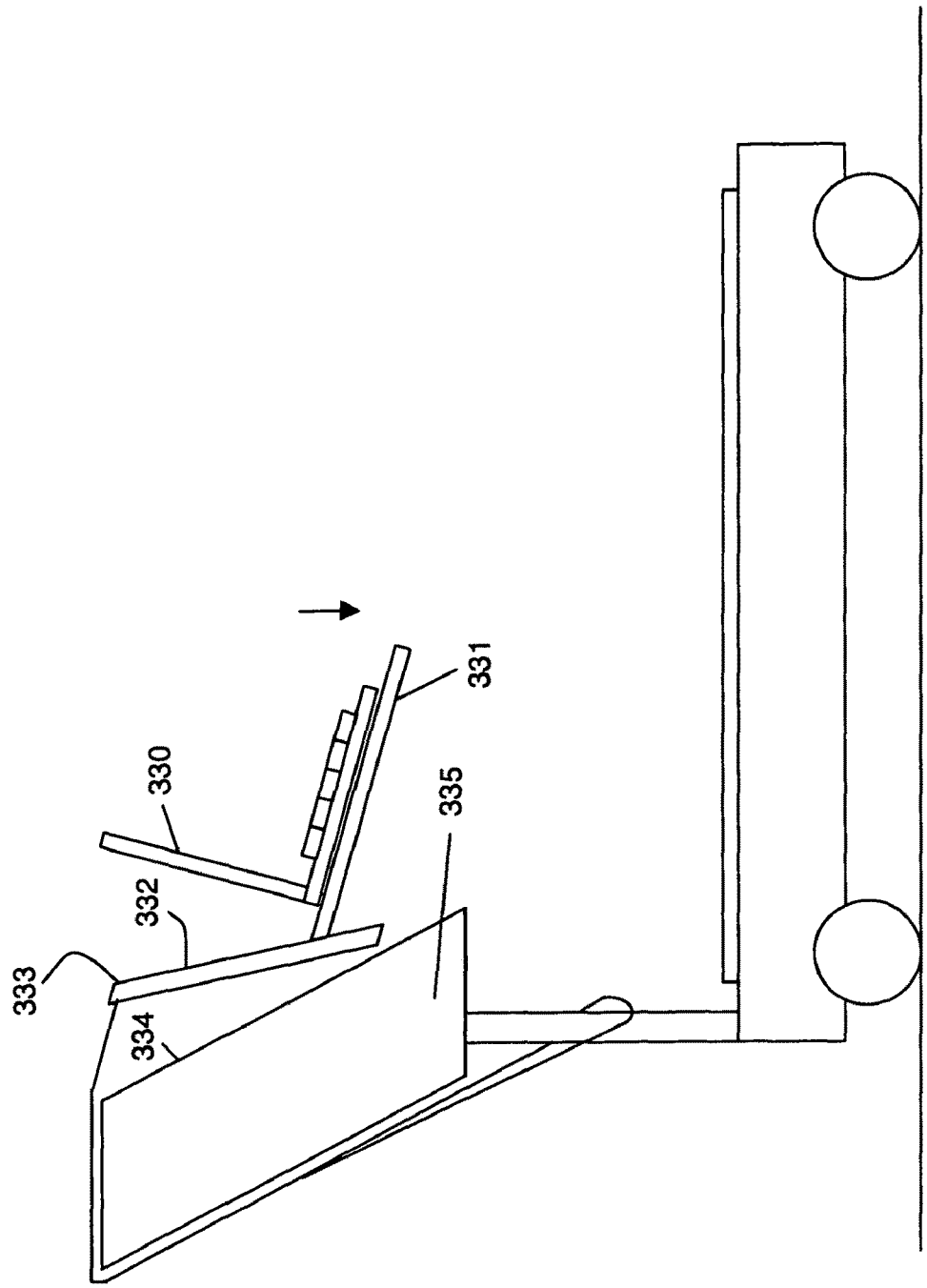
FIG. 24B is a diagram of a side view of an exercise machine laptop shelf comprising a back plate and a tray attached to the control console of an exercise machine in the improper vertical position with a laptop computer resting on the tray.

This is preferred for the following reason. If the top surface 327 of the back plate 321 in FIG. 24A is not generally level with the top surface 328 of the control console 323, but instead hangs below the top surface 328 of the control console 323 while resting on the front face 326 of the control console 323 as depicted in FIG. 24A, the weight of the laptop 330 when placed on the tray 331 connected to the back plate 332 in FIG. 24B may cause the top of the back surface 333 of the back plate 332 to separate from the flush position against the front face 334 of the control console 335 as depicted in FIG. 24B. In this scenario, the tray 331 holding the laptop 330 may not be held securely.

The straps discussed with relation to FIGS. 17, 18, 19, 20, 21, 22, 23, 24A and 24B may be made of nylon or other strong yet flexible material. The straps may also be made of an elastic material so that they may be stretched over the exercise machine console or other component in order to attach the laptop shelf back plate to the exercise machine. The elastic straps may or may not require snap-in buckles or Velcro.

The slots in the back plate through which the straps may be looped in order to attach it to the exercise machine will now be discussed.

FIG. 25A depicts the front view of the laptop shelf back plate 340 with top slots 341a, 341b, 341c located along the upper edge 345 of the back plate 340, left side slots 342a, 342b, 342c located along the left side edge 346 of the back plate 340, right side slots 343a, 343b, 343c located along the right side edge 347 of the back plate 340, and bottom slots 344a, 344b, 344c located along the bottom edge 348 of the back plate 340. These slots have width and height dimensions adequate to allow the straps discussed in relation to FIGS. 17, 18, 19, 20, 21, 22, 23, 24A and 24B to slip through the slots.

Straps discussed above in relation to FIGS. 17, 18, 19, 20, 22, 23, 24A and 24B are preferably used with the top slots 341a, 341b, 341c located along the upper edge 345 of the back plate 340 in FIG. 25A. In addition, one or more straps may be used for best support depending on the shape and type of control console on the exercise machine to which the back plate 25 will be attached.

For instance, FIG. 25B depicts a front view of a back plate 347a attached to an exercise machine control console 349 using two straps 350a and 350b. Strap 350a is looped through top slot 341aa and strap 350b is looped through top slot 341cc. By using two straps 350a and 350b instead of one strap (which could be looped through top slot 341bb for instance), the back plate has lateral support due to the two straps 350a and 350b. The two straps 350a and 350b prevent the back plate 347a from swinging side-to-side as may occur if only one strap were to be used in conjunction with one top slot 341bb.

FIG. 26 depicts a side view of a similar back plate 355 showing a top slot 356 located towards the upper edge 357 of the back plate 355 and passing from the front face 358 of the back plate 355 through the body 359 of the back plate 355 to the back face 360 of the back plate 355. This slot 356 is representative of the slots 341a, 341b, 341c located along the upper edge 345 of the back plate 340 depicted in FIG. 25.

FIG. 26 also depicts a strap 361 that has one end extending through the slot 356, passing from the front face 358 of the back plate 355 through the body 359 of the back plate 355 and out the back face 360 of the back plate 355. The other end of the strap 361 extends over the top edge 357 of the back plate 355 towards the back of the back plate 355. This configuration allows the strap 361 and the back plate 355 to be utilized in a fashion as described in FIGS. 17, 18, 19, 20, 21, 22, 23, 24A and 24B. In the case of FIG. 21 where the strap 295 extends from the side 296 of the back plate 290, the strap 361 in FIG. 26 would slip through the slot 362 located towards the side 363 of the back plate 355 instead of the slot 356 located towards the top edge 357 of the back plate 355.

In another embodiment of the back plate slots, FIG. 27 depicts the side view of a laptop shelf back plate 372 with slots 370a, 370b in the top surface 371 of the back plate 372. The back plate 372 is hollow, being made up of a front face 373, a top surface 371, a bottom surface 375 and two side surfaces 374, but no back surface. It is therefore generally a hollow cavity from the back. The slots 370a, 370b are located on the top surface 371 of the back plate 372 and pass through the top surface 371 of the back plate 372 to the inside of the hollow back cavity 376 of the back plate 372. Because there is no back wall of the back plate 372, these slots 370a, 370b are accessible from the top surface 371 and from the hollow back cavity 376.

FIG. 27 also depicts a side view of a strap 377 passing from the top surface 371 of the back plate 372 through the slot 370a into the inside of the hollow back cavity 376 of the back plate 372. The strap then passes from the inside of the hollow back cavity 376 of the back plate 372 through the slot 370b back up to the top surface 371 of the back plate 372. This configuration allows the strap 377 and the back plate 372 to be utilized in a fashion as described in FIGS. 17, 18, 19, 20, 21, 22, 23, 24A and 24B. In the case of FIG. 21 where the strap 295 extends from the side 296 of the back plate 290, the strap 377 in FIG. 27 would slip through slots 378, 379 located in the side surface 374 of the back plate 372 instead of the slots 370a, 370b located in the top surface 371 of the back plate 372.

While FIG. 27 depicts both side-by-side slots 370a, 370b being used, only one slot may also be used instead. For example, if only one slot 370a is used, then the strap 377 passes from the top surface 371 of the back plate 372 through the slot 370a into the inside of the hollow back cavity 376 of the back plate 372. The strap can then extend out of the back of the back plate 372 instead of passing back up through the second slot 370b.

Referring briefly back to FIG. 26, it should be noted that while the laptop shelf back plate 355 depicted in FIG. 26 has a back face 360, it may also not have a back face 360 and instead may be a hollow back cavity from the back similar to hollow back cavity 376 in the back plate 372 depicted in FIG. 27. If the back plate 355 depicted in FIG. 26 does not have back face 360, then the slot 356 may simply extend through the front face 358 of the back plate 355 into the hollow back cavity.

Figure 28:
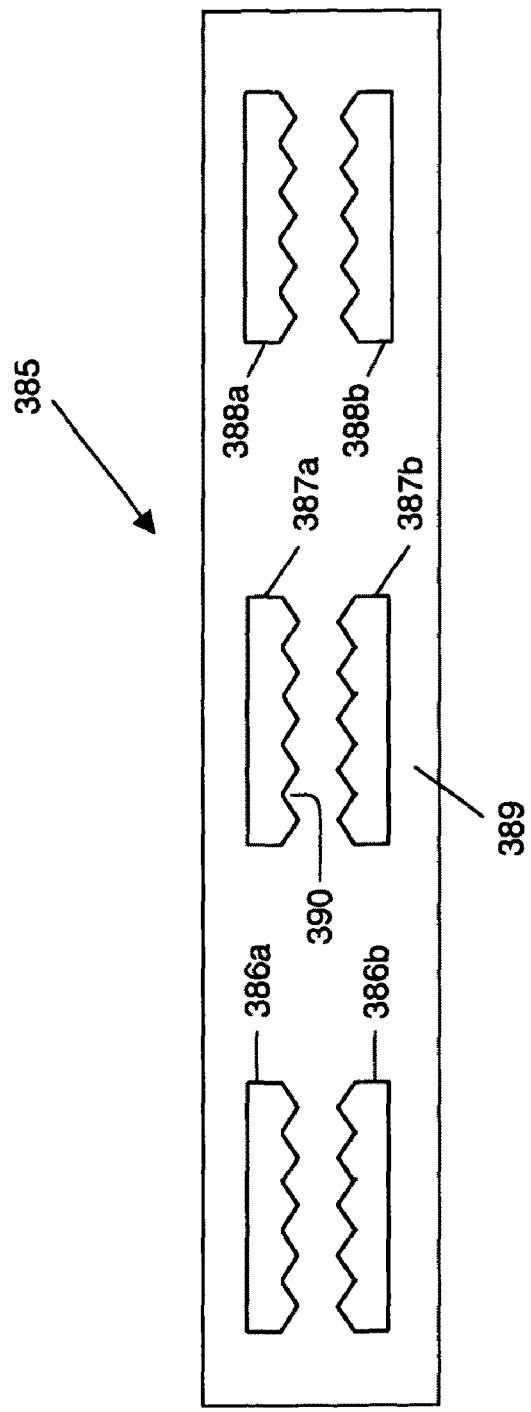
FIG. 28 is a diagram of a generally top view of the laptop shelf back plate showing the slots in the back plate's top surface.

FIG. 28 depicts a generally top view of a similar laptop shelf back plate 385 with slots 386a, 386b, 387a, 387b, 388a, 388b in the top surface 389 of the back plate 385. While FIG. 28 depicts the slots 386a, 386b, 387a, 387b, 388a, 388b as being configured in sets of two slots with each slot in the set of two being side-by-side and parallel with each other—for instance, slot 386a and slot 386b are side-by-side and parallel to each other—other configurations are also possible.

FIG. 28 depicts the slots 386a, 386b, 387a, 387b, 388a, 388b in the top surface 389 of the back plate 385 as having teeth 390 on the inner sides of the slots as shown. These teeth 390 are designed to grip onto the strap as it is looped through the slots 386a, 386b, 387a, 387b, 388a, 388b in order to better hold the strap from slipping once the laptop shelf back plate 385 is attached to the exercise machine control console or other component. While the teeth 390 are shown in FIG. 28, they are not required.

While FIGS. 17, 18, 19, 20, 21, 22, 26 and 27 depict the straps as being attached to the back plate using slots in the back plate, the straps may also be attached to the back plate by other means such as hooks, screws, bolts, loops attached to the back plates, or other means. While the preferred embodiments of FIGS. 17, 18, 19, 20, 21, 22, 26 and 27 are shown to utilize slots to attach the straps to the back plates, the embodiments are not limited to how the straps are attached to the back plate.

FIG. 29 depicts a side view of a laptop shelf 395 comprising a back plate 396 and a tray 397 connected together with the back plate 396 affixed to the control console 398 of the exercise machine 399 using a hook 400. In this embodiment, the back plate 396 is secured to the control console 398 by a hook 400 that extends from the top of the back plate 401 over the top surface 402 of the control console 398 and then hooks to the upper back edge 403 of the control console 398. While FIG. 29 depicts the hook 400 hooking to the top back edge 403 of the control console 398, it may instead hook to some other portion of the control console 398 or to another component of the exercise machine 399 such as a cross bar. The hook 400 may be made of ridged material and may also have a portion of the hook that is flexible in length and location so that the hook may be positioned and adjusted to be in such a location and position so that it may properly and securely hook onto a component of the exercise machine 399. Once the hook 400 is adjusted and positioned to be in the proper location and position, the hook will hold the back plate 396 securely in place flush against the front face 404 of the control console 398 or other component of the exercise machine 399 such that the tray 397 that is connected to the back plate 396 is held securely in place by the back plate 396. The hook 400 is preferably made of a strong enough material so that it is able to remain hooked to the control console 398 or other component of the exercise machine 399 and hold the back plate 396 securely in place when the weight of the laptop 405 is applied to the tray 397 of the laptop shelf 395. While only one hook 400 is depicted in FIG. 29, multiple hooks may be employed.

FIG. 30 depicts a side view of a laptop shelf 410 comprising a tray 409 attached to magazine rack 411 on the control console 412 of an exercise machine 413 using a generally vertical clamp 414 and a generally horizontal clamp 415. This embodiment may not require a back plate as part of the laptop shelf 410 as depicted in previous embodiments. The magazine rack 411 depicted in FIG. 30 is made up of a horizontal portion 416 extending out from the front face 417 of the control console 412 and a vertical lip 418 at the front edge of the horizontal surface 416. This vertical lip 418 is typically intended to better secure a magazine or book when placed on the magazine rack 411. The vertical clamp 414 is designed to attach to the horizontal portion 416 of the magazine rack 411, and the horizontal clamp 415 is designed to attach to the vertical lip 418 of the magazine rack 411 in order to secure the tray 409 onto the control console 412 of the exercise machine 413.

The vertical clamp 414 is placed around the horizontal portion 416 of the magazine rack 411 such that the vertical clamp 414 engages the top surface 419 of the horizontal portion 416 of the magazine rack 411 and bottom horizontal surface 420 of the horizontal portion 416 of the magazine rack 411 and is thereupon tightened. The horizontal clamp 415 is placed around the vertical lip 418 of the magazine rack 411 such that the horizontal clamp 415 engages the inner surface 421 of the vertical lip 418 and outer surface 422 of the vertical lip 418 of the magazine rack 411 and is thereupon tightened.

If the magazine rack 411 does not include a front vertical lip 418, the horizontal clamp 415 need not engage the magazine rack 411. By tightening the vertical clamp 414 around the horizontal portion 416 of the magazine rack 411 and the horizontal clamp 415 around the vertical lip 418 of the magazine rack 411, the tray 409 is held in securely in place on the control console 412 of the exercise machine 413. This design may also contain a lower support beam 423 that extends from the bottom of the tray 409 downward and backward to engage with the lower part of the front face 417 of the control console 412 of the exercise machine 413 in order to add support to hold the tray 409 generally horizontal when the weight of a laptop is placed on the tray 409.

FIG. 31 depicts a side view of a laptop shelf 430 comprising a back plate 431 and a tray 432 connected together and resting on the top surface 434 of the magazine rack 425 on the control console 433 of an exercise machine 426, and being held in place against the control console 433 by fitting into the notch formed by the front face 436 of the control console 433, the top horizontal surface 434 of the magazine rack 435 and the inner vertical surface 437 of the front vertical lip 438 of the magazine rack 435. The back plate 431 rests on the front face 436 of the control console 433 with the bottom 440 of the back plate 433 resting against the top horizontal surface 434 of the magazine rack 435 on the control console 433. The front surface 439 of the bottom 440 of the back plate 431 is designed to engage with the inner vertical surface 437 of the vertical lip 438 of the magazine rack 435. The bottom 440 of the back plate 431 is therefore held in place in the notch formed by the front face 436 of the control console 433, the top horizontal surface 434 of the magazine rack 435 and the inner vertical surface 437 of the front vertical lip 438 of the magazine rack 435.

The back portion 441 of the tray 432 may also be slanted upward such that its back surface 442 engages with the front vertical surface 443 of the vertical lip 438 of the magazine rack 435. This allows the vertical lip 438 of the magazine rack 435 to lend further support to the tray 432 as it is attached to the magazine rack 435 of the control console 433. This design may also contain a lower support beam 444 that extends from the bottom of the tray 432 downward and backward to engage with the lower part of the front face 436 of the control console 433 of the exercise machine 426 in order to add support to hold the tray 432 generally horizontal when the weight of a laptop is placed on the tray 432.

FIG. 32 depicts a side view of a laptop shelf 450 comprising a back plate 451 and a tray 452 connected together with the back plate 451 affixed to the control console 453 of the exercise machine 454 using Velcro. A male (or female) section of Velcro 455 is affixed to the front face 456 of the control console 453, and a female (or male) section of Velcro 457 is affixed to the back surface 458 of the back plate 451. This way, when the back plate 451 is pressed against the front face 456 of the control console 453, the male section of Velcro 455 on the front face 456 of the control console 453 engages with the female section of Velcro 457 on the back surface 458 of the back plate 451, and the back plate 451 is secured in place against the front face 456 of the control console 453.

In addition, if the control console 453 has a magazine rack 459 as shown in FIG. 32, a male (or female) section of Velcro 460 may also be affixed to the bottom surface 463 of the back plate 451 and the bottom surface 461 of the tray 452, and a female (or male) section of Velcro 462 may also be affixed to the top surface 463 of the magazine rack 459. This way, when the bottom surface 464 of the back plate 451 and the bottom surface 461 of the tray 452 is pressed against the top surface 463 of the magazine rack 459, the male section of Velcro 460 on the bottom surface 463 of the back plate 451 and on the bottom surface 461 of the tray 452 engages with the female section of Velcro 462 on the top surface 463 of the magazine rack 459, and the back plate 451 and the tray 452 are held securely in place. This design may also contain a lower support beam 464 that extends from the bottom of the tray 452 downward and backward to engage with the lower part of the front face 456 of the control console 453 of the exercise machine 454 in order to add support to hold the tray 452 generally horizontal when the weight of a laptop is placed on the tray 452.

In the next several embodiments, the exercise machine laptop shelf may be part of the original design of the exercise machine.

FIG. 33 depicts a side view of a preferred system 470 comprising a tray 471 extending out from a control console 472 of an exercise machine 473. The tray 471 extends from the control console 472 towards the user 474 of the exercise machine 473 and is generally horizontal such that a laptop computer 475 may be placed on the tray 471 to be used and viewed by the user 474 of the exercise machine 473. The tray 471 is attached to or is a part of the control console 472 in such a way that it is strong enough to withstand the weight of the laptop 475 when the laptop 475 is placed on the tray 471.

While the tray 471 in FIG. 33 is depicted to extend from the front face 476 of the control console 472 of the exercise machine 473, the tray 471 may instead be attached to or be a part of a different component of the exercise machine 473 (such as its neck 477) and may extend form this different component of the exercise machine 473 in such a way that a laptop 475 when placed on the tray 471 may be viewed and used by the user 474 of the exercise machine 473.

Figure 34A:
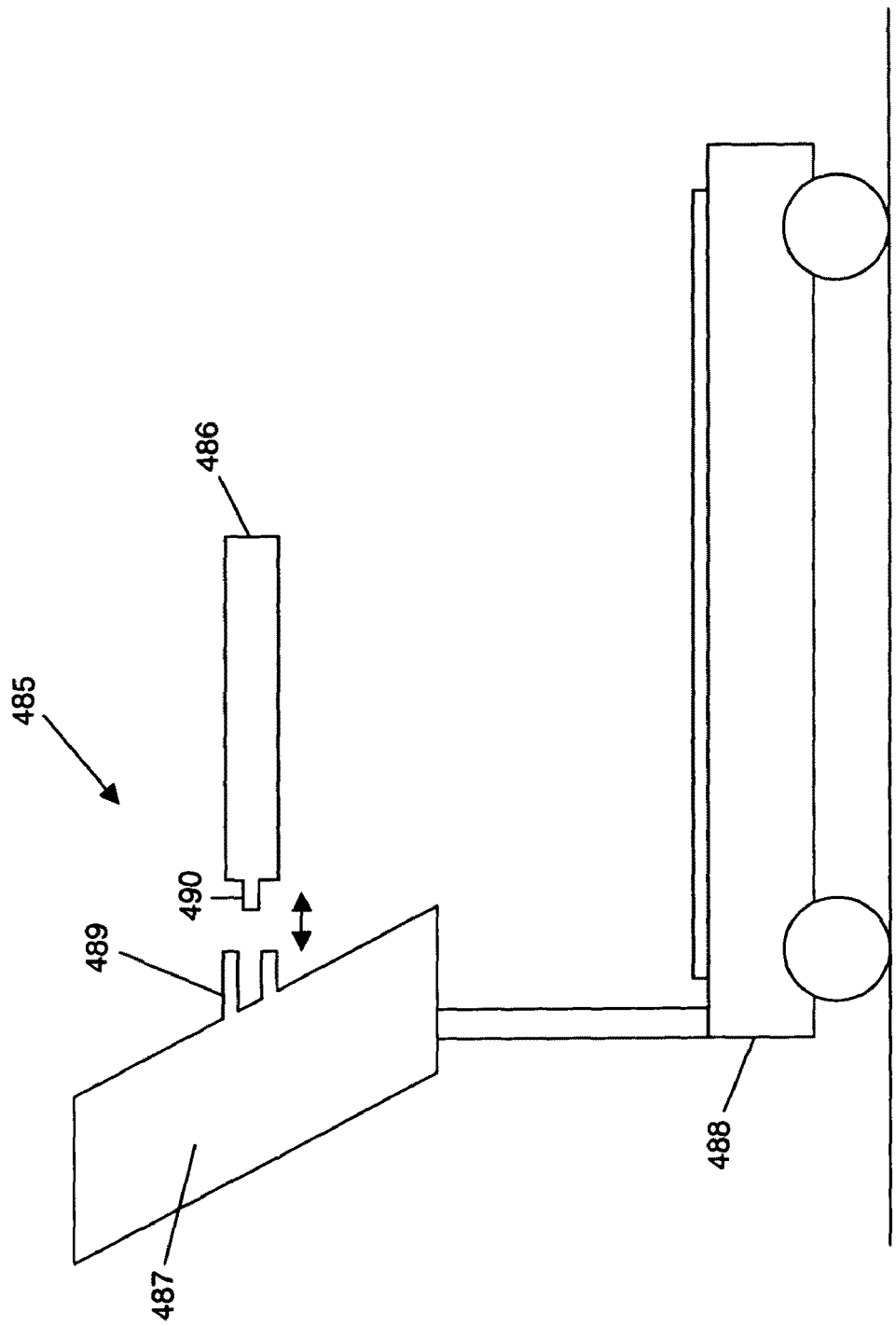
FIG. 34A is a diagram of the side view of a laptop shelf comprising a tray that may be attached to the control console of an exercise machine but that is detached.

FIG. 34A depicts a side view of an exercise machine laptop shelf 485 comprising a tray 486 that may be attached to and removed from the control console 487 of an exercise machine 488. The control console 487 contains a female receptacle 489 into which the male portion 490 of the tray 486 may be inserted. When the male portion 490 of the tray 486 is inserted into the female receptacle 489 on the control console 487, the tray 486 is held in place in a generally horizontal position so that a laptop may be placed on the tray 486 for viewing and use.

FIG. 34B depicts the male portion 491 of the tray 492 inserted into the female receptacle 493 on the control console 494 of the exercise machine 495. The male portion 491 of the tray 492 may be locked inside the female receptacle 493 on the control console 494 of the exercise machine 495 using a pin or a clamp, friction or other means. It is preferred that the locking mechanism that locks the male portion 491 of the tray 492 into the female receptacle 493 of the control console 494 be easily locked and unlocked so that the tray 492 may be easily locked into place inside the female receptacle 493 for when in use and then unlocked and removed from the female receptacle 493 for when not in use.

While FIGS. 34A and 34B depict the female receptacle 489, 493 being a part of the control console 487, 494, it may instead be a part of a different component of the exercise machine 488, 495 that allows the tray 486, 492 to be inserted into the female receptacle 489, 493 and held in place for the use of a laptop computer. In this embodiment, the laptop shelf 485 may be part of the original design of the exercise machine 488.

Figure 35A:
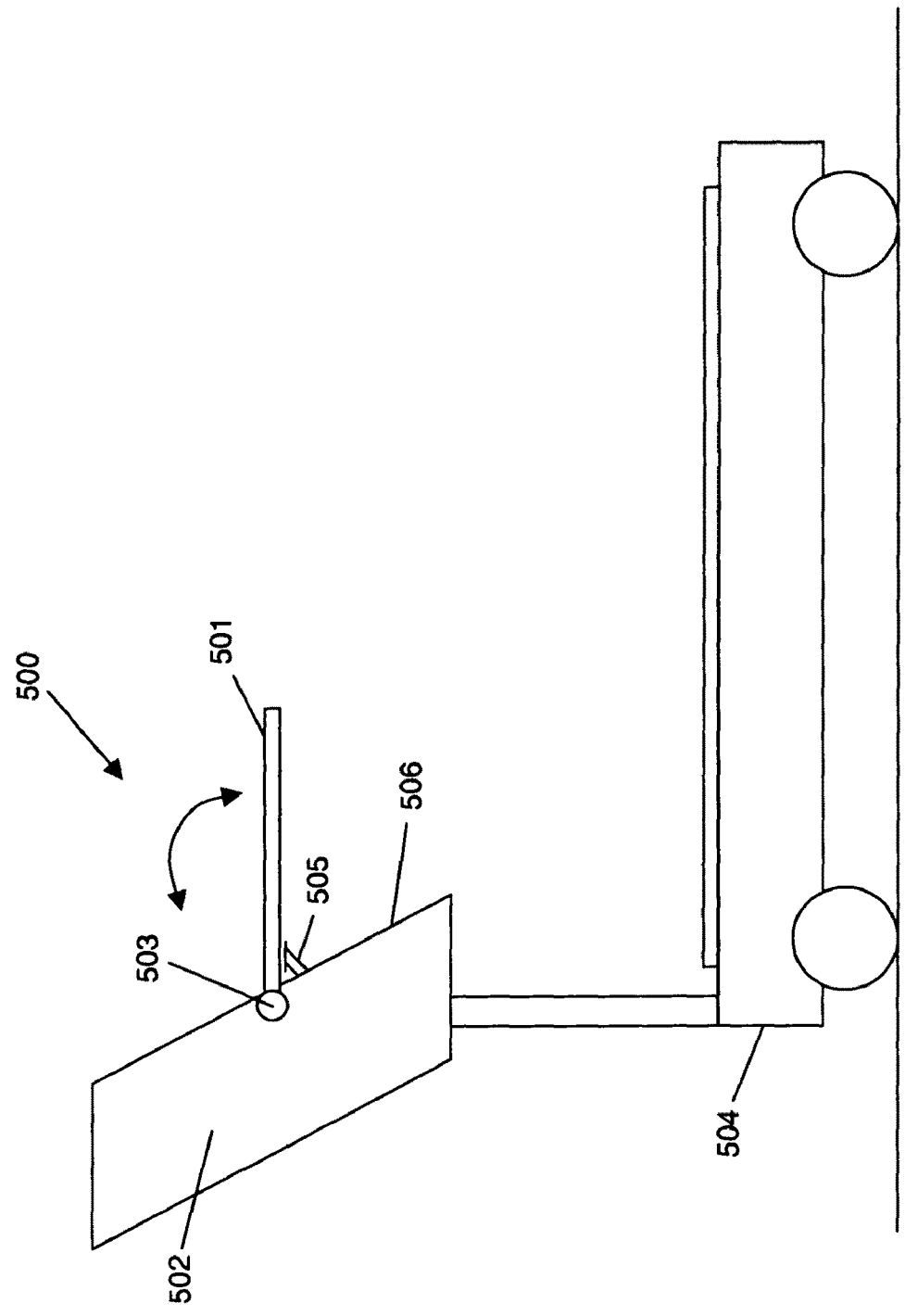
FIG. 35A is a diagram of the side view of a laptop shelf comprising a tray that is attached to the exercise machine control console by a hinge and folded down into its deployed position.

FIG. 35A depicts the side view of an exercise machine laptop shelf 500 comprising a tray that is attached to the control console 502 of an exercise machine 504 by a hinge mechanism 503 so that the tray 501 may be rotated upward and out of the way for when in storage and downward into a generally stable horizontal position for when deployed for use.

When the tray 501 is rotated downward as depicted in FIG. 35A, it will engage at least one stop 505 that will hold the tray 501 in a generally horizontal position. This stop 505 is shown in FIG. 35A to be part of the front face 506 of the control console 502 but it could instead be a part of the tray 501, a part of the hinge mechanism 503 or a separate part that is not necessarily a part of any of these but may be connected to the front face 506 of the control console 502, the tray 501 or the hinge mechanism 503. The stop 505 may be designed so that when the tray 501 engages with the stop 505, the tray 501 is held at a generally horizontal position. The stop 505 is preferably strong enough to hold the tray 501 in a generally horizontal position even when the weight of the laptop is placed on the tray 501. More than one stop 505 may be necessary to provide the strength necessary to hold the tray 501 generally horizontal when the weight of the laptop is placed on the tray 501.

Figure 35B:
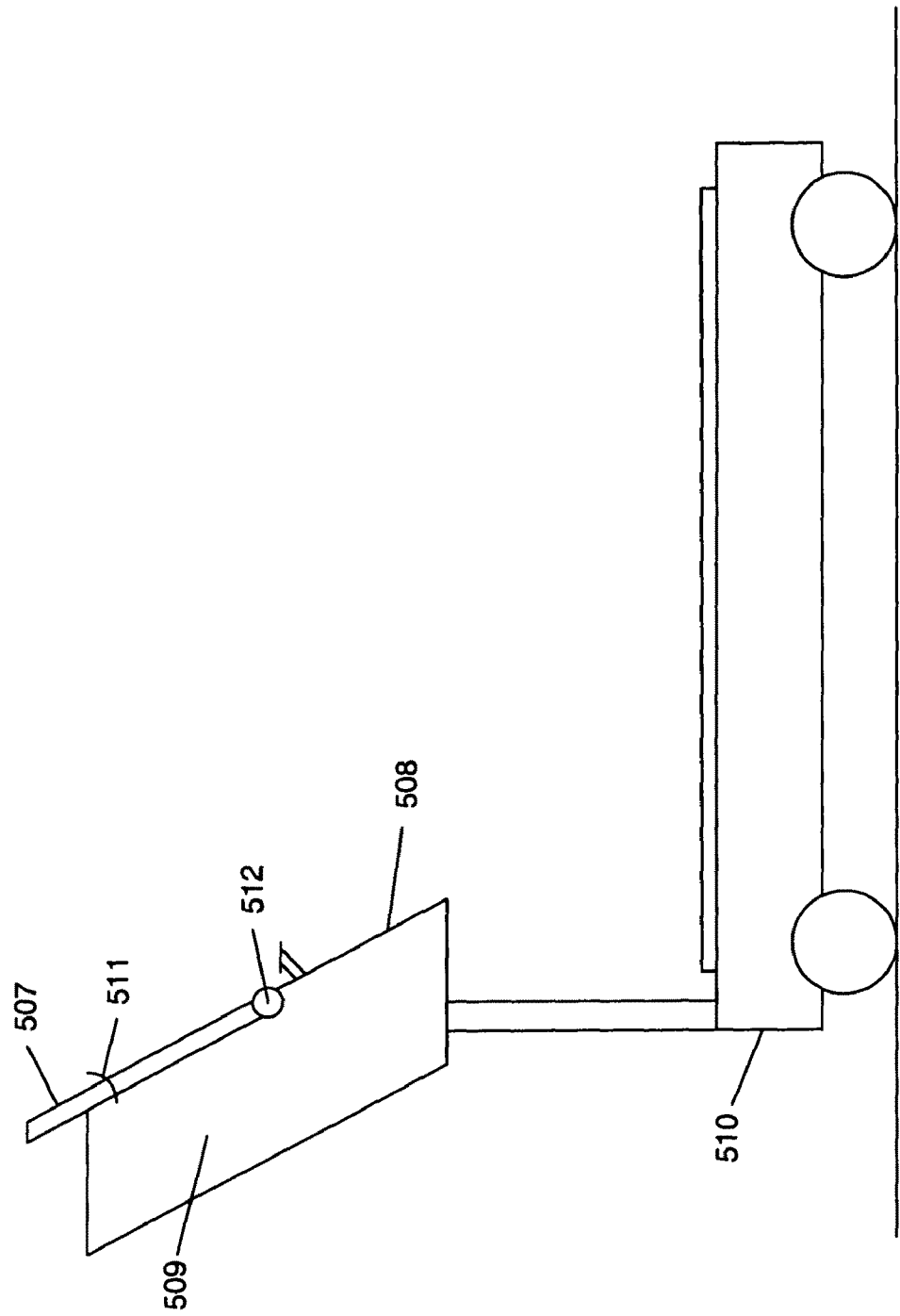
FIG. 35B is a diagram of the side view of a laptop shelf comprising a tray that is attached to the exercise machine control console by a hinge and folded up into its storage position.

When the tray 507 is rotated upward as depicted in FIG. 35B, it may become more parallel with the front face 508 of the control console 509 of the exercise machine 510 such that it is out of the way for when not in use with holding a laptop. The user simply pushes the tray 507 upward and the hinge mechanism 512 allows the tray 507 to fold upward towards the face 508 of the control console 509. It is not necessary that the tray 507 end up in a position that is fully parallel with the front face 508 of the control console 509, but it is desirable that the tray 507 be able to fold up to a position that is generally out of the way for when not in use with holding a laptop.

The tray 507 or the control console 509 of the exercise machine 510 may also have a latching mechanism 511 that hooks and holds the tray 507 to the front face 508 of the control console 509 in a locked position when the tray 507 is folded up against the front face 508 of the control console 509. This latching mechanism 511 will prevent the tray 507 from falling down for when not in use. When the tray 507 is folded up, the tray 507 could also be held in place by friction in the hinge mechanism 512 such that the force of gravity is not sufficient to pull the tray 507 back down, but instead, the tray 507 must be pulled down with added force supplied by the user. When the tray 507 is folded up for storage, it may also be designed to fit into the contour of the front face 508 of the control console 509 so that it is more completely stored and out of the way. While FIGS. 35A and 35B depict the tray 501, 507 as being attached to or a part of the control console 502, 509, it may instead be a part of a different component of the exercise machine 504, 510 that allows the tray 501, 507 to be rotated upward into a storage position and downward into generally horizontal deployed position for the use of a laptop computer.

Figure 36A:
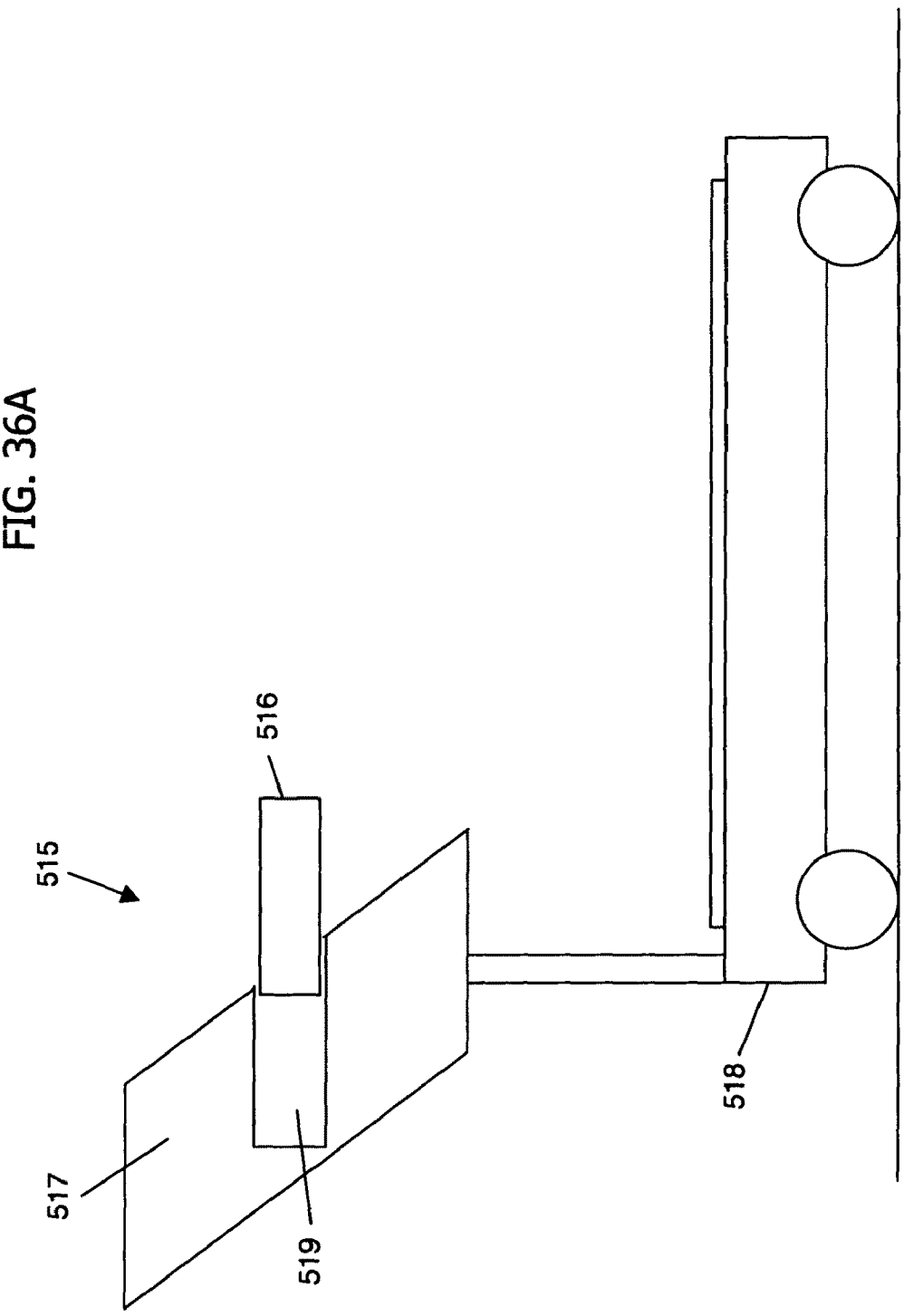
FIG. 36A is a diagram of the side view of a laptop shelf comprising a tray that is attached to the exercise machine control console and is pulled out of the control console body in its deployed position.

FIG. 36A depicts a side view of an exercise machine laptop shelf 515 comprising a tray 516 that is attached to the control console 517 of an exercise machine 518 such that the tray 516 may slide into a female receptacle 519 within the body of the control console 517 for when not in use and may be pulled out of the female receptacle 519 within the body of the control console 517 so that when it is pulled out and deployed it extends towards the user in a sturdy and generally horizontal position in order to hold a laptop for viewing and use.

Figure 36B:
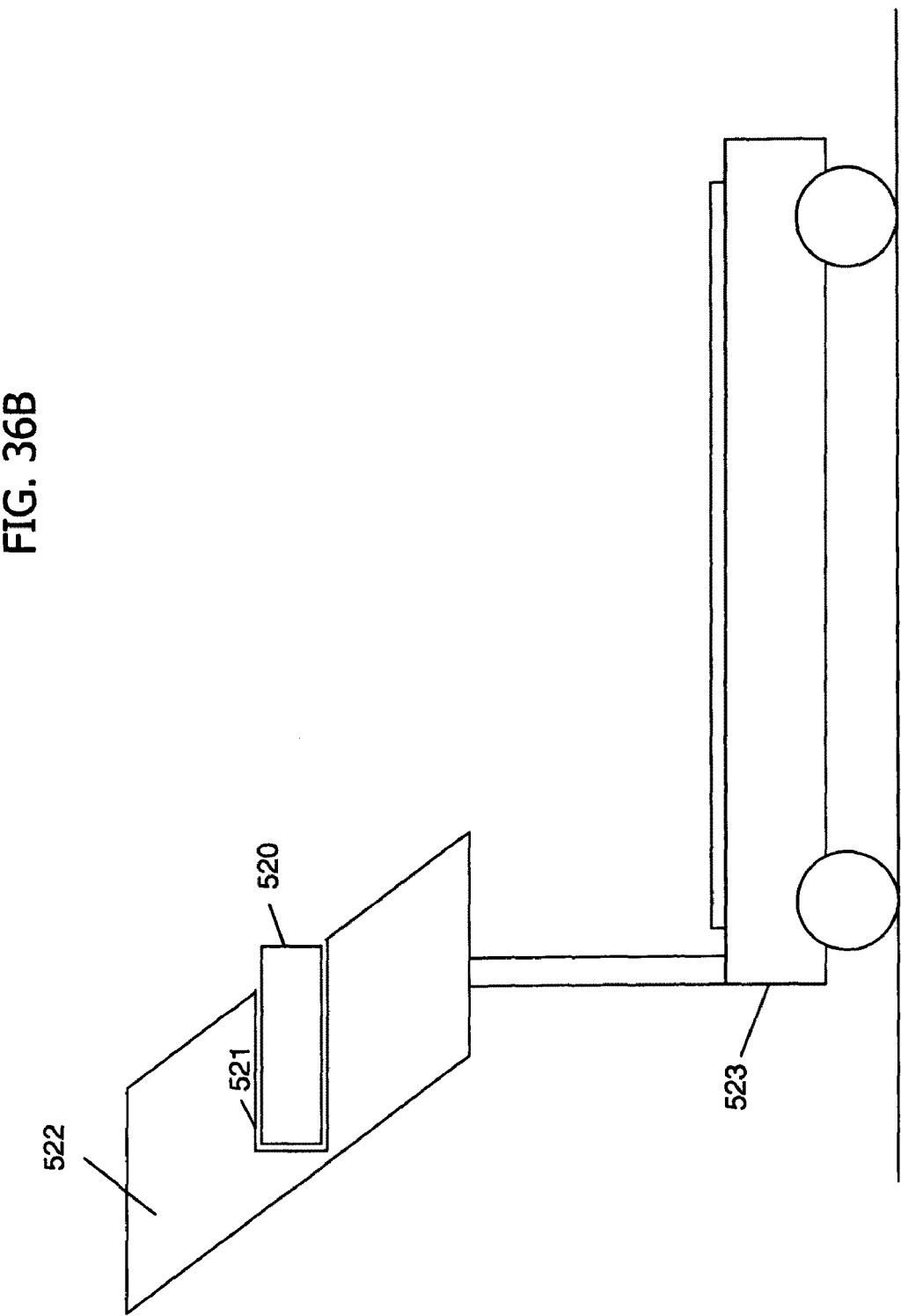
FIG. 36B is a diagram of the side view of a laptop shelf comprising a tray that is attached to the exercise machine control console and is pushed into the control console body in its storage position.

FIG. 36A depicts the tray as extending outside the female receptacle 519 of the control console 517 of the exercise machine 518 for when deployed for use while FIG. 36B depicts the tray 520 pushed into the female receptacle 521 within the body of the control console 522 of the exercise machine 523 for when in storage and not in use. While FIGS. 36A and 36B depict the female receptacle 519, 521 as being a part of the control console 517, 522, the female receptacle 519, 521 may instead be a part of another component of the exercise machine 518, 523 that allows the tray 516, 520 to slide into the female receptacle 519, 521 for when in storage and slide out of the female receptacle 519, 521 for when in use with holding a laptop for use and viewing while engaging with the exercise machine 518, 523. In this embodiment, the laptop shelf 515 may be part of the original design of the exercise machine 518.

Figure 37B:
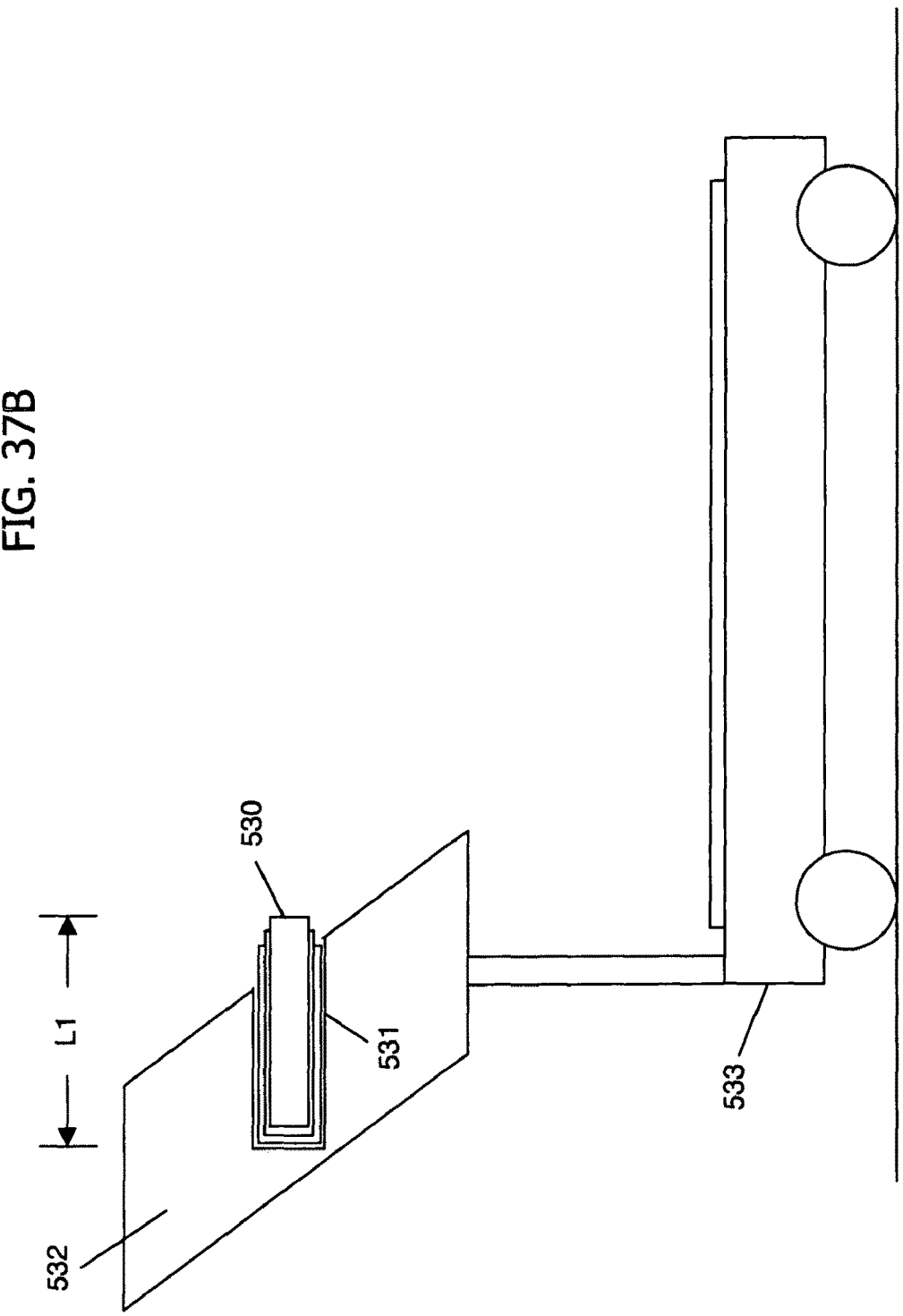
FIG. 37B is a diagram of the side view of a laptop shelf comprising a tray made up of telescopically folding sections that is attached to the exercise machine control console and is folded and pushed into the control console body in its storage position.

While the FIGS. 36A and 36B depict the entire tray fitting into the body of the exercise machine control console as one piece, FIG. 37A depicts a side view of a laptop shelf 525 where the tray 526 folds up telescopically when it is pushed inward towards and into a female receptacle 528 within the body of the control console 527 of an exercise machine 529. FIG. 37B depicts the tray 530 folding up telescopically and pushed into the female receptacle 531 of the control console 532 of the exercise machine 533.

In this scenario, the overall length dimension of the tray 530 will decrease as it is folded telescopically to a length dimension L1 such that female receptacle 531 within the body of the of the control console 532 that receives the tray 530 need only be deep enough to receive or contain the tray 530 in its telescopically folded state with length L1 as shown in FIG. 37B. That is, the female receptacle 528 in FIG. 37A need not be the full dimension L2 of the tray 526 in its deployed and non-telescopically folded state as shown on FIG. 37A.

In addition, in FIG. 37B, if the tray 530 is able to fold up telescopically such that its dimension L1 is small enough to be non-intrusive to the control console 532, the tray 530 in its telescopically folded state may remain outside the body of the control console 532. In this case, the embodiment may not require a female receptacle 531 within the body of the control console 532 to receive the tray 530.

While FIGS. 37A and 37B depict the female receptacle 528, 531 as being a part of the control console 527, 532, the female receptacle 528, 531 may instead be a part of another component of the exercise machine 529, 533 that allows the tray 526, 530 to slide into the female receptacle 528, 531 for when in storage and slide out of the female receptacle 528, 531 for when in use with holding a laptop for use and viewing while engaging with the exercise machine 529, 533. In this embodiment, the laptop shelf 525 may be part of the original design of the exercise machine 529.

FIG. 38A depicts a side view of an exercise machine laptop shelf 524 comprising a tray 542 made up of two sections 543, 544 that are connected together by a hinge mechanism 534 so that sections 543 and 544 may be folded upon each other to reduce the overall length dimension of the tray from L3 in FIG. 38A to L4 in FIG. 38B. Similar to the embodiment described in relation to FIGS. 37A and 37B where the tray folds up telescopically, folding sections 543 and 544 of the tray 542 onto each other preferably allows the depth dimension D1 of the female receptacle 535 within the body of the control console 536 that receives the tray 542 to be smaller, i.e., to about the smaller folded dimension L2 of the tray 538 depicted in FIG. 38B.

In addition, if the tray 538 is able to fold up into a small enough dimension L4 so that it is non-intrusive to the control console 539 of exercise machine 540 when it is folded up, the folded up tray 538 may remain outside the body of control console 539 and may not require a female receptacle 541 to receive the folded tray 538.

While the tray 542 of FIG. 38A is shown to be made up of two sections 543, 544, the tray 542 may be made up of more than two sections. Also, while FIGS. 38A and 38B depict the female receptacle 535, 541 as being a part of the control console 536, 539, the female receptacle 535, 541 may instead be a part of another component of the exercise machine 537, 540 that allows the tray 542, 538 to slide into the female receptacle 535, 541 for when in storage and slide out of the female receptacle 535, 541 for when in use with holding a laptop for use and viewing while engaging with the exercise machine 537, 540. In this embodiment, the laptop shelf 524 may be part of the original design of the exercise machine 537.

Figure 39B:
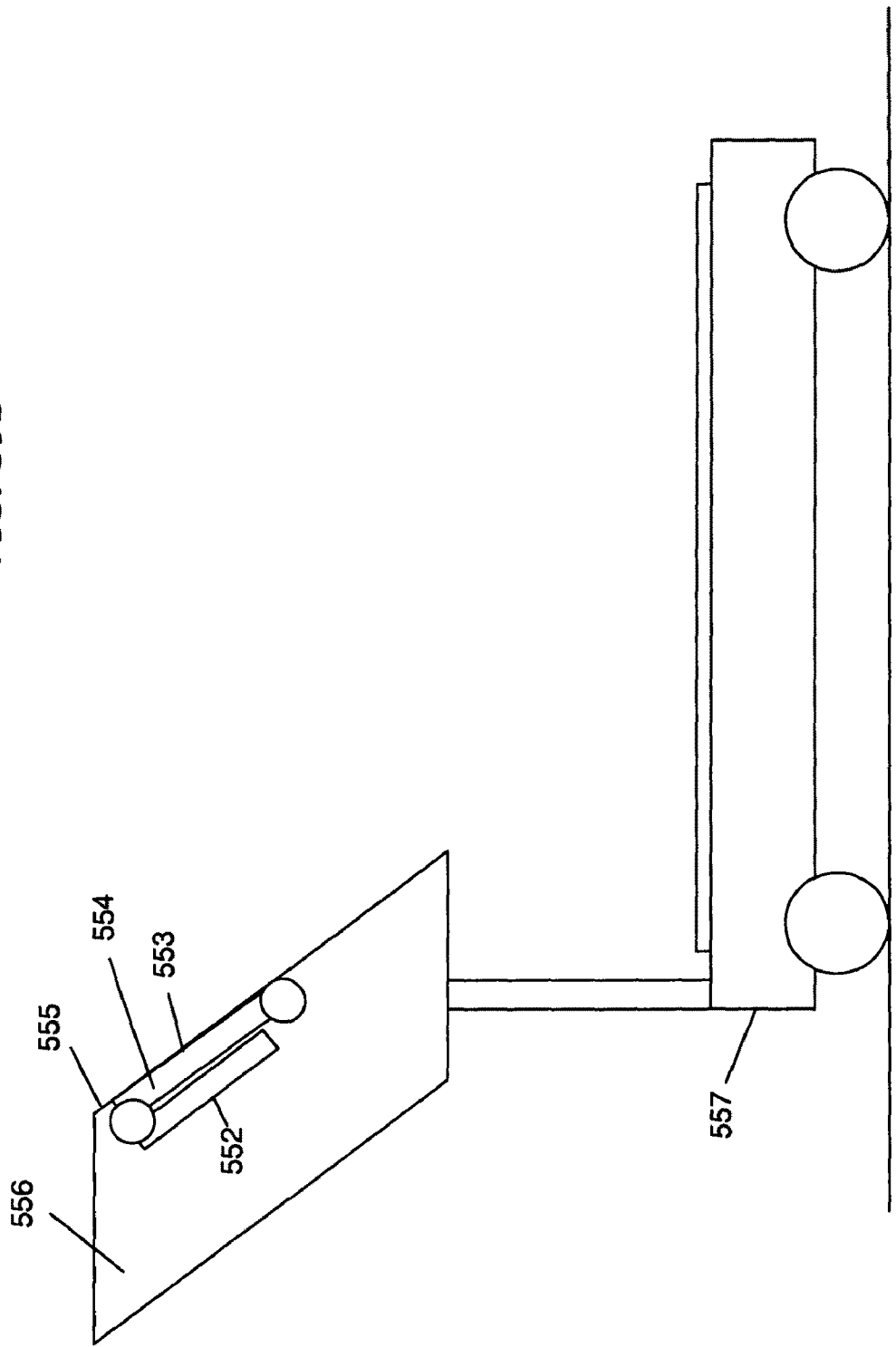
FIG. 39B is a diagram of the side view of a laptop shelf comprising a tray that is made up of two folding sections attached to the exercise machine control console by a hinge and folded up into its storage position.

In addition, the foldable tray 531, 542 of FIGS. 38A and 38B could be connected to the control console 545 of an exercise machine 546 using a hinge mechanism 547 as depicted in FIG. 39A. In this case the two sections 549 and 550 of foldable tray 548 can be folded onto each other, and the tray 548 may then be rotated upward into a generally parallel position with regards to the front face 551 of the control console 545 for storage when not in use. FIG. 39B depicts the tray sections 552 and 553 folded upon each other and folded tray 554 rotated upward into a position that is generally parallel with the front face 555 of the control console 556 of the exercise machine 557. While the tray 548 of FIG. 39A is shown to be made up of two sections 549, 550, the tray 548 may also be made up of more than two sections. Also, while FIGS. 39A and 39B depict the foldable tray 548, 554 as being connect to the control console 545, 556, it may instead be connected to a different component of the exercise machine 546, 557 that allows the tray to be rotated upward and out of the way for when not in use and pulled outward and deployed in a stable and generally horizontal position for the use with a laptop computer.

Figure 40:
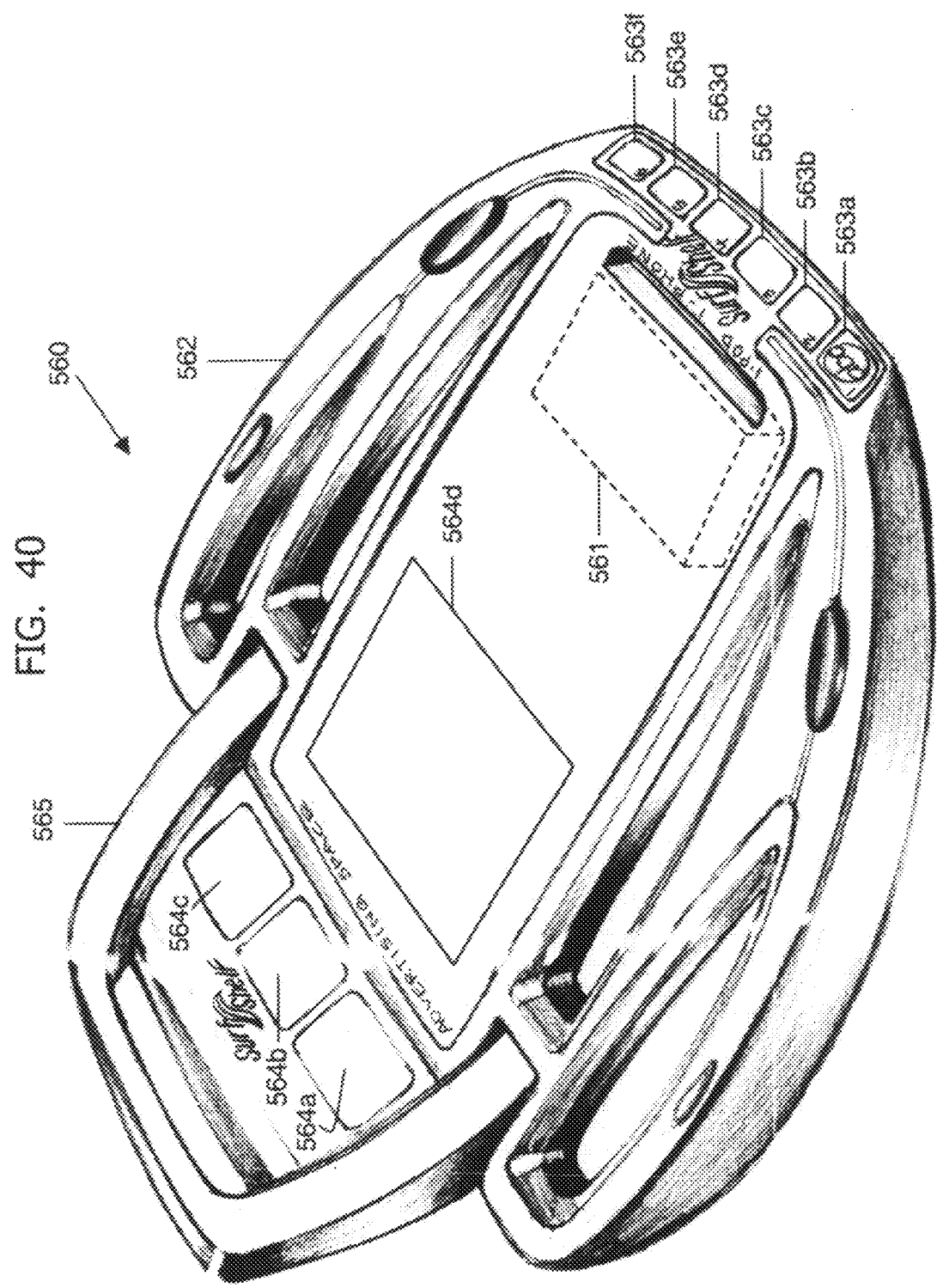
FIG. 40 is a diagram of an exercise machine laptop shelf containing electronic circuitry, front buttons and LCD displays.

FIG. 40 depicts a laptop shelf 560 that contains electronic circuitry 561 that may be programmed to control particular functions of the user's laptop when the user's laptop is used in conjunction with the laptop shelf 560. Specifically, the electronic circuitry 561 may be programmed to control which website content the user's laptop Internet browser loads for the user to view. The electronic circuitry 561 in FIG. 40 is shown to be located inside a small box on the underneath side of the tray 562.

The laptop shelf 561 may include buttons 563a, 563b, 563c, 563d, 563e, 563f on the front of the tray 562 for the user to access, that when pushed, control the electronic circuitry 561 within the laptop shelf 560 to in turn control the laptop's Internet browser to go to a particular Internet web address and load particular content. For instance, the far left button 563a on the front of the tray 562 may be programmed to bring up a particular show on the www.abc.com website that the user may wish to visit during a workout. The button's face may be labeled with a name that corresponds to the website that it is programmed to load, such as "abc" on button 563a in FIG. 40. Instead of having to use the laptop's mouse and keyboard to control the laptop's Internet browser to bring up this particular website during a workout (which would necessitate pausing the workout), the user simply pushes the button 563a on the front of the tray 562 that is programmed for that particular website, in this case the far left button 563a. To this end, the buttons 563 are preferably sufficiently large so that they may be readily pushed while the user continues to exercise. The button 563a is programmed to control the electronic circuitry 561 to in-turn direct the laptop's Internet browser to bring up the particular website content, in this case www.abc.com.

For the electronic circuitry 561 to control the laptop's Internet browser, an appropriate link to the laptop may be used such as a control cable, e.g., a USB cable, a wireless technology, e.g., Bluetooth, or by some other means.

The buttons 563a-563f may be programmed in such a way that the user cannot change them, or may be programmed in such a way that they can be changed. If they are the type that cannot be changed by the user, then the electronic circuitry 561 that controls the buttons 563a-563f may be programmed during the manufacturing process to direct the laptop's Internet browser to load particular web content. This may be the case when a sponsoring website pays the manufacturer of the laptop shelf 560 to specifically hardwire their web address into the electronic circuitry 561 that controls particular button 563a-563f on the tray of the laptop shelf 560. This way, the user of the laptop shelf 560 may be more inclined to visit these specific web addresses while they are exercising rather than a different website because of the ease of using the buttons 563a-563f on the laptop shelf 560 as compared to using the laptop keyboard and mouse.

If the electronic circuitry 561 in the laptop shelf 560 is of the type that can be programmed by the user so that particular buttons 563a-563f will load Internet content of the user's choice, the laptop shelf buttons 563a-563f and the electronic circuitry 561 may be programmed using a software program that runs on the user's laptop. With the laptop linked to the electronic circuitry 561 within the laptop shelf 560 using a control cable, a wireless technology or other means, the user launches the software program on the laptop that will program the buttons 563a-563f.

Figure 41:
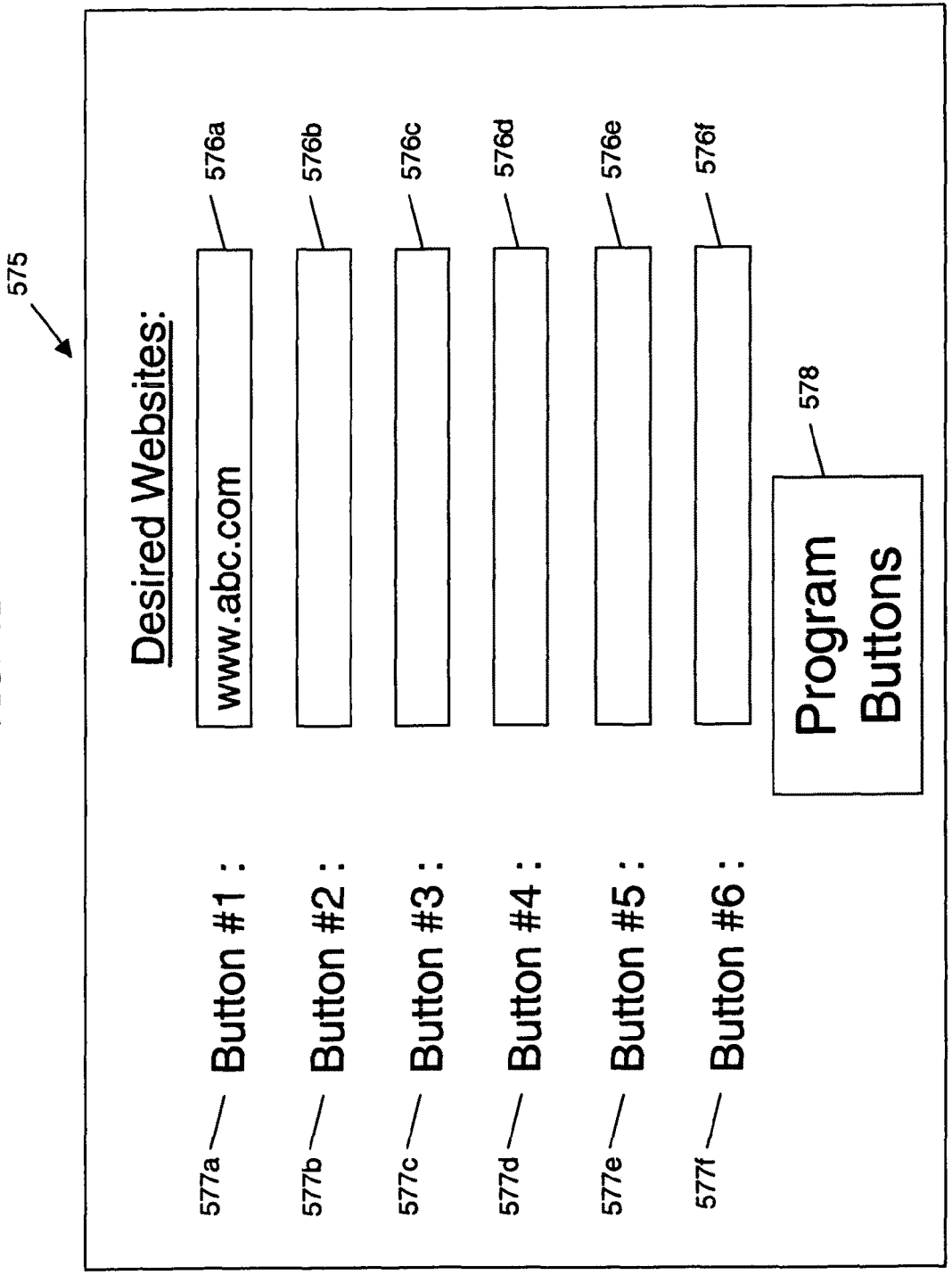
FIG. 41 is a diagram of a software program user interface used to program the buttons on the front of the laptop shelf tray.

The software program may utilize user interfaces that allow the user to enter the desired website addresses into the software program to be programmed into the electronic circuitry 561 within the laptop shelf 560. FIG. 41 depicts an example of a software program user interface 575 that may be used to program the laptop shelf buttons 563a-563f on the laptop shelf 560 in FIG. 40.

With the laptop linked to the electronic circuitry 561 within the laptop shelf 560 in FIG. 40 and the software programming running on the laptop, the user may use the laptop's keyboard to enter within the user interface 575 the desired web addresses they wish to visit during their workout into the "Desired Websites" text input fields 576a, 576b, 576c, 576d, 576e, 576f next to the corresponding button number labels "Button #1" 577a, "Button #2" 577b, "Button #3" 577c, "Button #4" 577d, "Button #5" 577e, "Button #6" 577f they wish to program. In this scenario, "Button #1" 577a in the user interface 575 in FIG. 41 corresponds to button 563a on the laptop shelf 560 in FIG. 40, "Button #2" 577b in the user interface 575 in FIG. 41 corresponds to button 563b on the laptop shelf 560 in FIG. 40, "Button #3" 577c in the user interface 575 in FIG. 41 corresponds to button 563c on the laptop shelf 560 in FIG. 40, "Button #4" 577d in the user interface 575 in FIG. 41 corresponds to button 563d on the laptop shelf 560 in FIG. 40, "Button #5" 577e in the user interface 575 in FIG. 41 corresponds to button 563e on the laptop shelf 560 in FIG. 40, and "Button #6" 577f in the user interface 575 in FIG. 41 corresponds to button 563f on the laptop shelf 560 in FIG. 40.

The user may then click the "PROGRAM BUTTONS" button 578 on the software user interface 575. Clicking the "PROGRAM BUTTONS" button 578 causes the software program to download the website addresses entered into the "Desired Websites" text input fields 576a-576f to the electronic circuitry 561 in the laptop shelf 560 in FIG. 40 such that when the buttons 563a-563f on the laptop shelf 560 in FIG. 40 are pushed, the electronic circuitry 561 directs the laptop's Internet browser to the corresponding websites entered into the "Desired Websites" input fields 576a-576f within the user interface 575 for each button 563a-563f. Once the electronic circuitry 561 within the laptop shelf 560 and buttons 563a-563f on the laptop shelf 560 are programmed, the user can begin their workout and simply push the buttons 563a-563f during the workout to redirect their Internet browser to the corresponding programmed website addresses.

An example of this scenario is as follows. With the laptop running the software program with user interface 575 linked to the laptop shelf 560 depicted in FIG. 40, the user enters the website address "www.abc.com" into the "Desired Websites"

text input field 576a next to the "Button #1" text label 577a in the software program user interface 575 as shown in FIG. 41. If the user were to then press the "Program Buttons" button 578 within the user interface 575, the electronic circuitry 561 and the button 563a of the laptop shelf 560 depicted in FIG. 40 would be programmed by the software program running the user interface 575 in FIG. 41 to "www.abc.com. Therefore, if the user were to then push button 563a on the laptop shelf 560, the electronic circuitry 561 within the laptop shelf 560 would direct the laptop's Internet browser to load the www.abc.com website. While six buttons 563a-563f on the laptop shelf 560 are depicted, more or fewer buttons may be used.

FIG. 40 also depicts the laptop shelf 560 containing electronic circuitry 561 that controls liquid crystal displays (LCD) 564a, 564b, 564c, 564d on the laptop shelf 560 that are able to display different types of content such as advertising. The electronic circuitry 561 in FIG. 40 is shown to be located inside a small box on the underneath side of the tray 562 of the laptop shelf 560. The LCD displays 564a, 564b, 564c are located on the back plate 656 and the LCD display 564d is located on the tray 562 to be easily viewed by the user. While this embodiment describes the displays as liquid crystal displays (LCD), the displays may be other types of displays such as plasma displays, light emitting diode displays or other types of displays.

The LCD displays 564a-564d may be controlled by the electronic circuitry 561 to display specific content. The content may be permanently programmed into the electronic circuitry 561 so that it may not be changed, or the content may be programmed into the electronic circuitry 561 in such a way that the content displayed on the LCD displays 564a-564d may be changed periodically.

If the electronic circuitry 561 in the laptop shelf 560 in FIG. 40 is of the type that allows the programmed content for the LCD displays 564a-564d to be changed, there are several ways that the electronic circuitry 561 can be programmed with new content. One way is that the content can be transferred from an outside source such as a computer, a memory stick or other source, to the electronic circuitry 561 by establishing a link between the computer, memory stick or other source and the electronic circuitry 561 using a control cable, a jack, a wireless technology or other means. In addition, if the outside source is a computer connected to the Internet, the content could be first transferred from the Internet to the computer and then to the electronic circuitry 561 in the laptop shelf 560 that controls the LCD displays 564a-564d on the laptop shelf 560.

In one scenario, the user's laptop connected to the Internet could be used as the source of the content. The user's laptop could be placed on the laptop shelf 560 and linked to the electronic circuitry 561 in the laptop shelf 560 using a control cable, a wireless technology or other means. The user's laptop could then be connected to the Internet and instructed to download the new content for the LCD displays 564a-564d. Once downloaded, the content could then be transferred from the user's laptop to the electronic circuitry 561 in the laptop shelf 560 that controls the LCD displays 564a-564d on the laptop shelf 560 so that this new content could then be displayed on the LCD displays 564a-564d.

In this scenario, the content files for the LCD displays 564a-564d could be downloaded from the Internet to the user's laptop computer memory using a website, an FTP application, email, or other file downloading methods. Once the LCD content files are stored on the user's laptop computer, a software program running on the user's laptop may be used to transfer the LCD content from the user's laptop to the electronic circuitry 561 in the laptop shelf 560 that controls the LCD displays 564a-564d on the laptop shelf 560. With the laptop linked to the laptop shelf electronic circuitry 561 using a control cable, a wireless technology or other means, the user launches the software program on the laptop that will transfer the LCD content from the laptop to the electronic circuitry 561 in the laptop shelf 560. The software program may utilize user interfaces that allow the user to define the content that gets loaded into the electronic circuitry 561 in the laptop shelf 560 for each LCD display 564a-564d on the laptop shelf 560.

Figure 42:
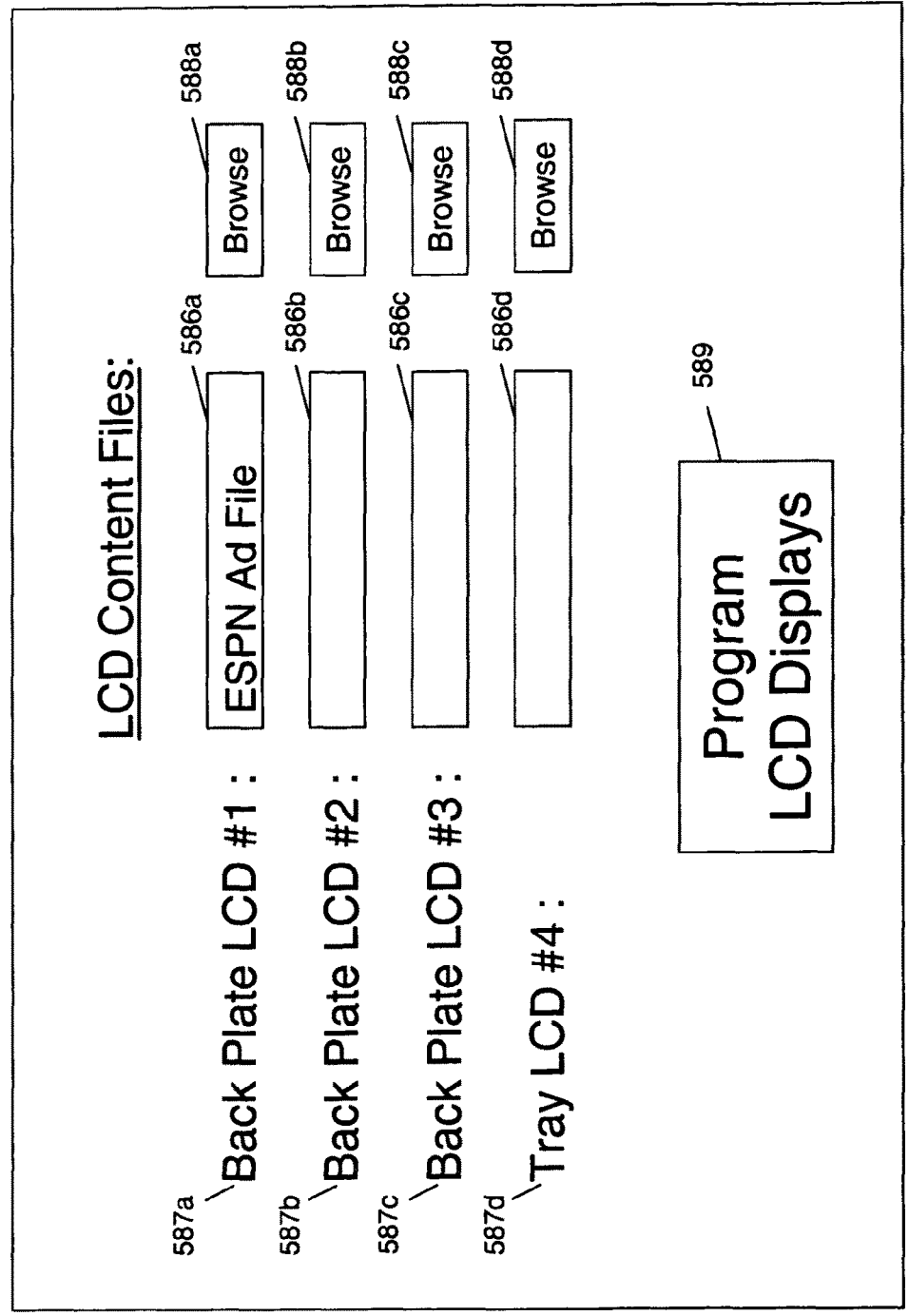
FIG. 42 is a diagram of a software program user interface used to program the LCD content on the laptop shelf back plate and tray.

FIG. 42 depicts an example of a software program user interface 585 that may be used to transfer the LCD content files to the electronic circuitry 561 in the laptop shelf 560 for each LCD display 564a-564d on the laptop shelf 560. Using the laptop's keyboard, the user enters the desired LCD content filename they wish to transfer to the electronic circuitry 561 in the laptop shelf 560 into the "LCD Content Files" text input fields 586a, 586b, 586c, 586d next to the corresponding LCD display number labels "Back Plate LCD #1" 587a, "Back Plate LCD #2" 587b, "Back Plate LCD #3" 587c, "Tray LCD #1" 587d they wish to program. Additionally, the user may click the "Browse" buttons 588a, 588b, 588c, and 588d next to the "LCD Content Files" text input fields 586a-586d to browse the various file directories that are on the user's laptop in order to locate the desired LCD content files.

Once the desired LCD content files are located, the user may choose the filenames and the filenames are then loaded into the "LCD Content Files" text input field 586a-586d for each particular LCD display label 587a-587d. In this scenario, "Back Plate LCD #1" 587a in the user interface 585 in FIG. 42 corresponds to LCD display 564a on the laptop shelf in FIG. 40, "Back Plate LCD #2" 587b in the user interface 585 in FIG. 42 corresponds to LCD display 564b on the laptop shelf in FIG. 40, "Back Plate LCD #3" 587c in the user interface 585 in FIG. 42 corresponds to LCD display 564c on the laptop shelf in FIG. 40 and "Tray LCD #4" 587d in the user interface 585 in FIG. 42 corresponds to LCD display 564d on the laptop shelf in FIG. 40.

Once all of the desired LCD content files are entered into the appropriate text input fields 586a-586d for each LCD display label 587a-587d, the user then clicks the "PROGRAM LCD DISPLAYS" button 589 on the software user interface 585. Clicking the "PROGRAM LCD DISPLAYS" button 589 causes the software program running the user interface 585 to transfer the LCD content files entered into the text input fields 586a-586d for each LCD display label 587a-587d into the electronic circuitry 561 in the laptop shelf 560 in FIG. 40 such that each LCD display 564a-564d on the laptop shelf 560 in FIG. 40 will then display the content defined in the user interface 585 in FIG. 42 for that particular LCD display.

As an example, the LCD content file entitled "ESPN Ad File" has been entered into the text input field 586a for "Back Plate LCD #1" 587a in the software program user interface 585 depicted in FIG. 42. If the laptop running the software user interface 585 in FIG. 42 were linked to the electronic circuitry 561 in the laptop shelf 560 in FIG. 40, and if the user were to then click on the "PROGRAM LCD DISPLAYS" button 589 in this user interface 585 in FIG. 42, the "ESPN Ad File" content file would be then transferred from the user's laptop to the electronic circuitry 561 in the laptop shelf 560 so that the "ESPN Ad File" content would be displayed on the LCD display 564a on the back plate 565 of the laptop shelf 560 in FIG. 40.

Figure 43:
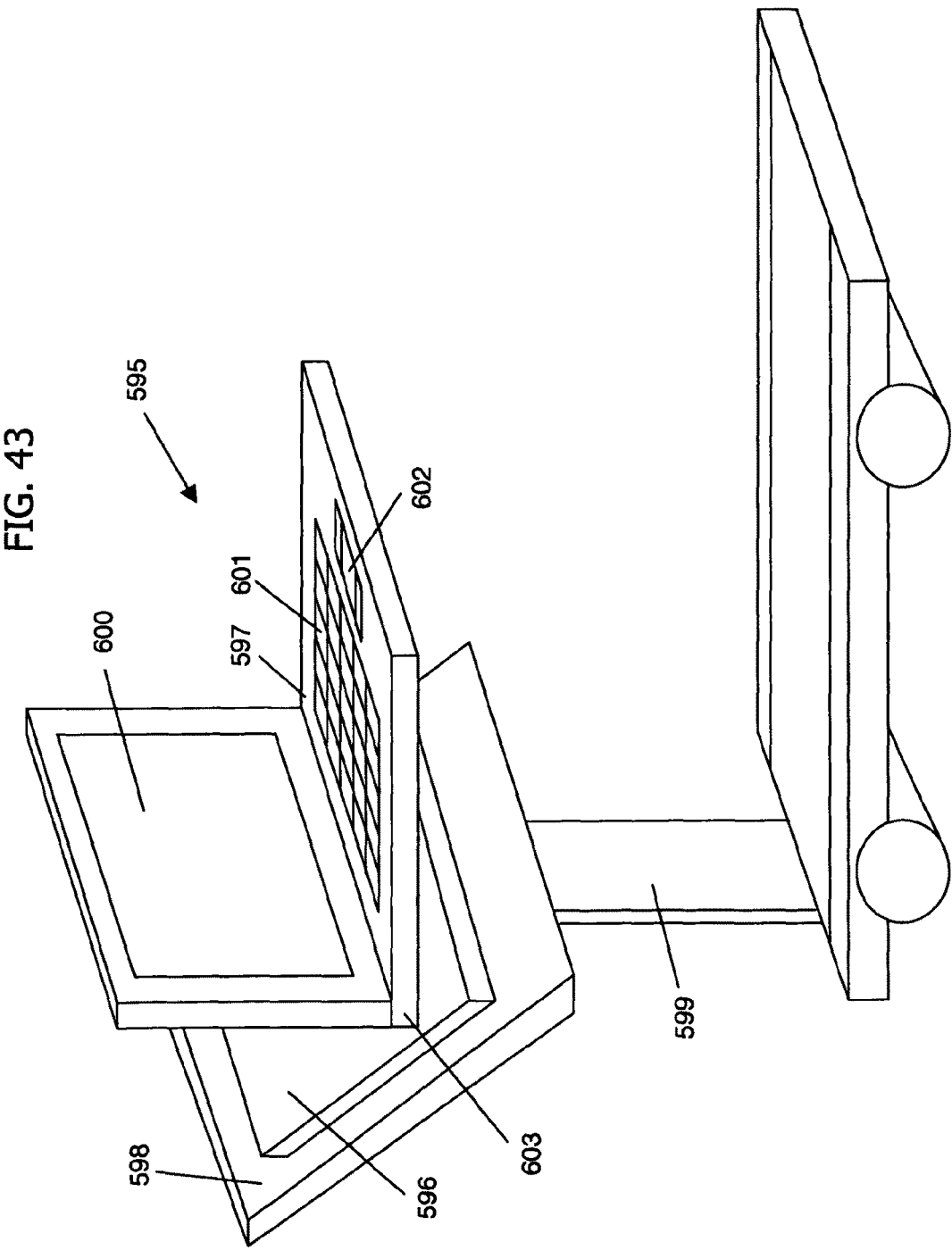
FIG. 43 is a diagram of a laptop shelf comprising a back plate and a built-in computer.

FIG. 43 depicts a laptop shelf 595 comprising a back plate 596 and a computer 597 connected together with the back plate 596 affixed to the control console 598 of an exercise machine 599. In this case, the user does not require his or her own laptop to view content while they exercise, but instead can use the computer 597 that is a integral component of the laptop shelf 595 for this purpose. The built-in computer 597 contains all the basic components of a personal computer such as a monitor 600, a keyboard 601, a mouse pad 602, and all of the electronic circuitry, hardware and software necessary to operate the computer 597, connect to the Internet and view online content.

The back plate 596 may contain slots as described above in relation to FIGS. 25, 26, 27, and 28 and may be attached to the control console 598 of the exercise machine 599 using any of the means described above in reference to FIGS. 17, 18, 19, 20, 21, 22, 23, 24A, 24B, 25, 26, 27, 28, 29, 31 and 32. The back plate 596 may also be attached to the control console 598 of the exercise machine 599 by other means such as a hook or latch on the control console 598.

While FIG. 43 depicts the back plate 596 attached to the control console 598 of the exercise machine 599, it may be instead attached to a different component of the exercise machine 599 that allows the built-in computer 597 to be a position that the user of the exercise machine 599 may easily use the computer 597 and view the monitor 600 of the computer 597 while engaging with the exercise machine 599. In this embodiment, the laptop shelf 595 may or may not be part of the original design of the exercise machine 599.

In addition, the laptop shelf 595 depicted in FIG. 43 may not require a back plate 596 if it instead attached to the control console 598 of the exercise machine 599 using means described above in relation to FIGS. 30, 34A and 34B. In these cases, the means described above in relation to FIGS. 30, 34A and 34B would be integrated directly into the back portion 603 of the computer 597 in FIG. 43 where the back portion 603 comes into contact with the control console 598 of the exercise machine 599. In this embodiment, the laptop shelf 595 may or may not be part of the original design of the exercise machine 599.

Figure 44:
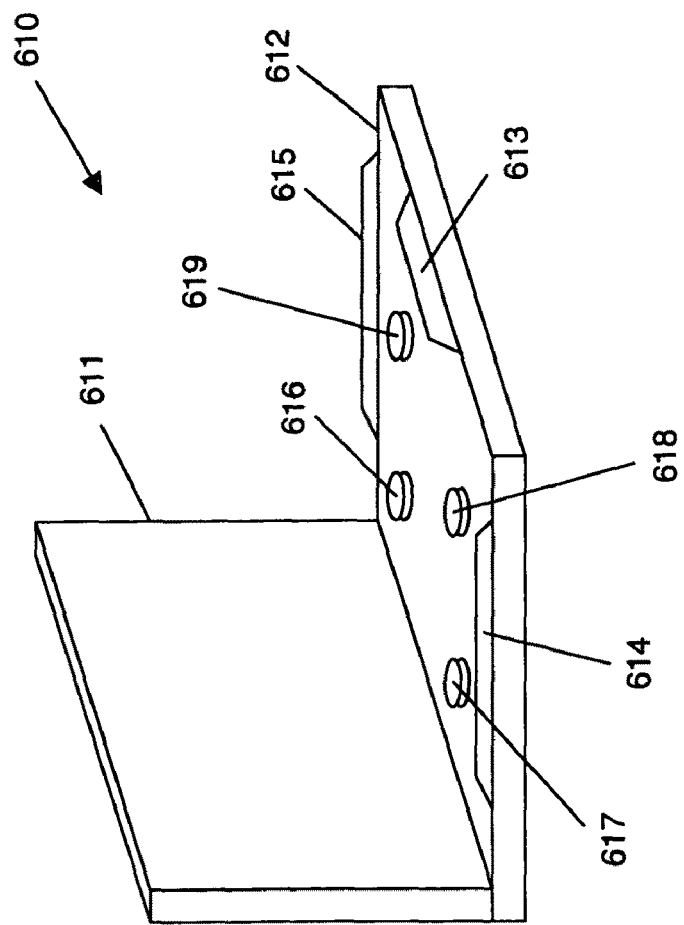
FIG. 44 is a diagram of a laptop shelf comprising a back plate and a tray with rubber pads on the top surface of the tray.

FIG. 44 depicts a laptop shelf 610 comprising a back plate 611 and a tray 612 connected together with the top surface of the tray 612 having one upward pointing lip 613 at the front edge of the tray 612, one upward pointing lip 614 at the left side edge of the tray 612 and one upward pointing lip 615 at the right side edge of the tray 612 to prevent a laptop from sliding off the tray when the laptop is placed on the top surface of the tray 612. While FIG. 44 depicts an upward pointing lip 613 at the front edge, one upward pointing lip 614 at the left side edge of the tray 612 and one upward pointing lip 615 at the right side edge of the tray 612, any combination of upward pointing lips could be employed. In addition, with this design, the width and depth of the tray 612 is preferred to be wider and deeper than the width and depth respectively of the laptop it is designed to hold. With the tray 612 having wider and deeper dimensions than the laptop, the laptop can be placed on the top surface of the tray 612 and held in the area inside the front upward pointing lip 613, the left side edge upward pointing lip 614 and the right side edge upward pointing lip 615. The front upward pointing lip 613, the left side edge upward pointing lip 614 and the right side edge upward pointing lip 615 are all designed to be tall enough in order to prevent the laptop from sliding off the top surface of the tray 612 of the laptop shelf 610.

FIG. 44 also depicts the tray 612 of the laptop shelf 610 as having rubber pads (or other pads made of a material to provide friction) 616, 617, 618, 619 on its top surface to engage with the bottom of a laptop that is placed on the top surface of the tray 612 of the laptop shelf 610 to help hold the laptop securely in place and prevent it from sliding off the tray 612. While the rubber pads 616-619 are shown to be generally circular in shape, any shape rubber pad may be used. In addition, while FIG. 44 depicts four rubber pads 616-619 located on the top surface of the tray 612 and positioned generally in the four corners of the tray 612, any number of pads may be used and may be positioned anywhere on the top surface of the tray 612.

Figure 45:
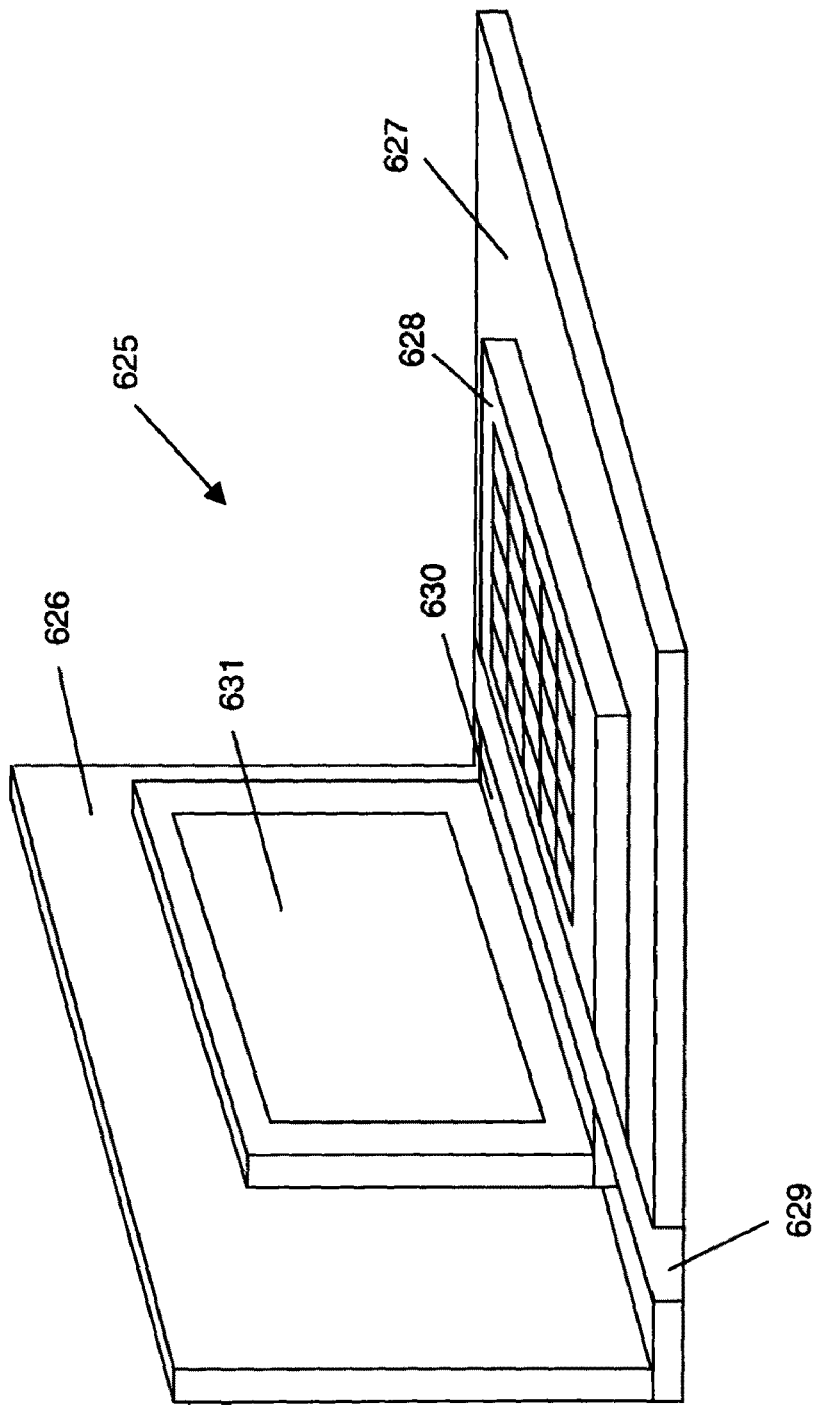
FIG. 45 is a diagram of a laptop shelf comprising a back plate and a tray with a laptop computer held in place on the top surface of the tray using a strap.

FIG. 45 depicts a laptop shelf 625 comprising a back plate 626 and a tray 627 connected together with a laptop 628 placed on the top surface of the tray 627. A strap 629 is looped around the top of the body portion 630 of the laptop 628 and around the sides and bottom of the tray 627 of the laptop shelf 625 thus holding the laptop 628 securely in place against the top surface of the tray 627. Sometimes during use of the exercise machine, the exercise machine may vibrate and cause the laptop to shift its position on the laptop shelf attached to the exercise machine. The strap 629 that is looped around the body portion 630 of the laptop 628 and the tray 627 will hold the laptop 628 securely against the top surface of the tray 627 and prevent the laptop 628 from shifting position if such vibrations occur.

The strap 629 of FIG. 45 may be made of elastic material so that the strap 629 may be expanded to slip over the body portion 630 of the laptop 628 and tray 627 combination and then allowed to contract to hold the laptop 628 securely to the tray 627. The strap 629 may be made of nylon or other flexible material and may employ Velcro as the strap in FIG. 18 depicts or a loop and Velcro as the strap in FIG. 19 depicts in order to be tightened and secured in the tightened position around the body portion 630 of the laptop 628 and the tray 627 of the laptop shelf 625. Additionally, the strap 629 made of nylon or other flexible material may instead employ a snap-in buckle as the strap in FIG. 17 depicts in order to be connected, tightened and secured around the body portion 630 of the laptop 628 and the tray 627 of the laptop shelf 625.

With the strap 629 wrapped around the body portion 630 of the laptop 628 and the tray 627 of the laptop shelf 625 as shown in FIG. 45, the generally vertical monitor 631 of the laptop 628 is in a position behind the strap 629 and in front of the back plate 626. In this position, laptop 628 is prevented from sliding forward and unless the strap 629 itself moves. The strap 629 is held in place by the friction that exists between itself and the top and side surfaces of the body portion 630 of the laptop 628, and the sides and bottom surface of the tray 627 of the laptop shelf 625 when the strap 629 is sufficiently tightened.

However, if this friction between the strap 629 and the top and side surfaces of body portion 630 the laptop 628 and the sides and bottom surface of the tray 627 of the laptop shelf 625 is not sufficient to hold the strap 629 in place when tightened, other means may be necessary to hold the strap 629 securely in place.

Figure 46:
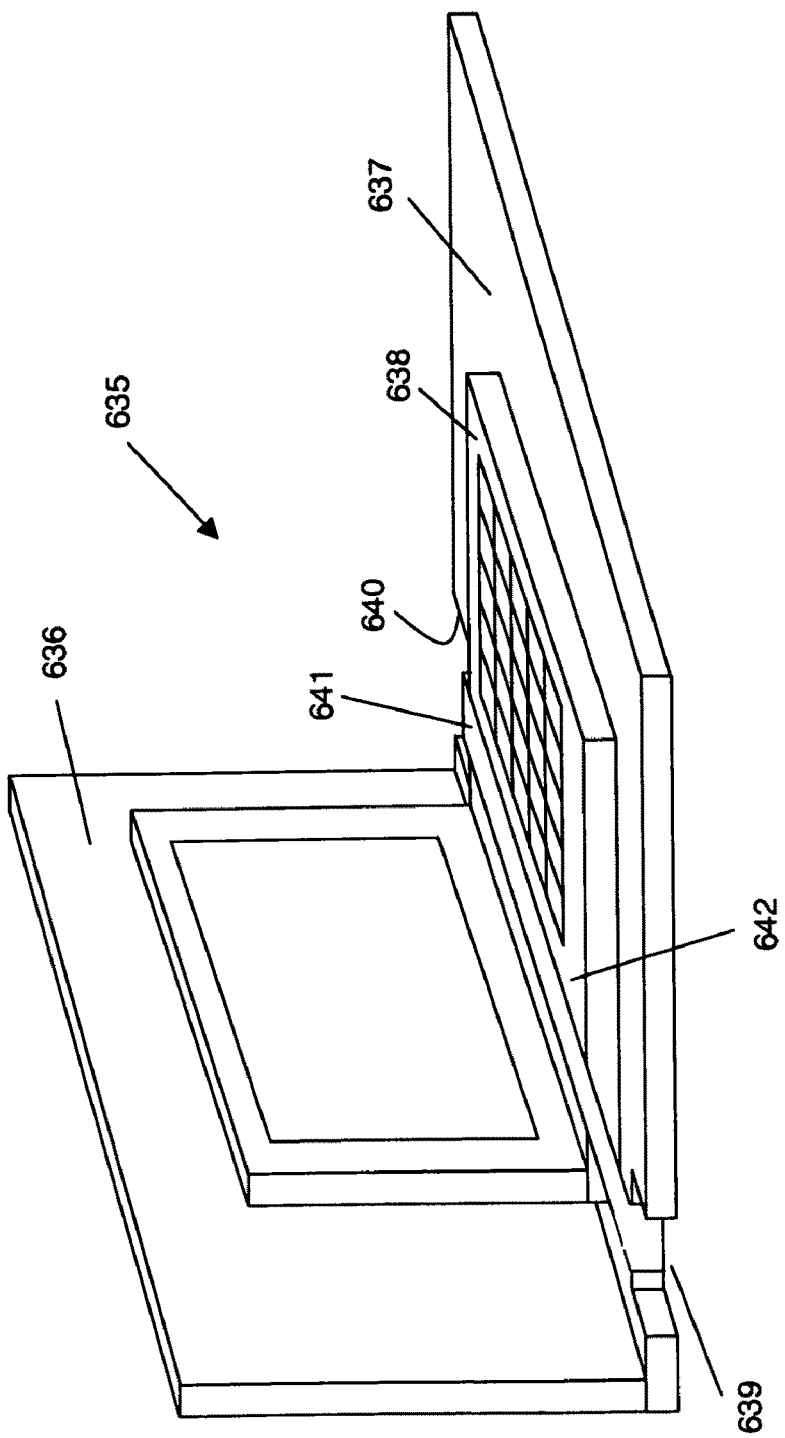
FIG. 46 is a diagram of a laptop shelf comprising a back plate and a tray with a laptop computer held in place on the top surface of the tray using a strap and with the strap held in place using notches in the tray.

FIG. 46 depicts a laptop shelf 635 comprising a back plate 636 and a tray 637 connected together with a laptop 638 placed on the top surface of the tray 637. The tray 637 of the laptop shelf 635 contains a rear left side notch 639 and a rear right side notch 640. This embodiment has all the functionality as described with the embodiment with relation to FIG. 45 but with the added functionality of the rear notches 639 and 640. A strap 641 is looped around the top of the body portion 642 of the laptop 638, through the rear left side notch 639, around bottom of the tray 637 and back up through the rear right side notch 640. The rear left side notch 639 and a rear right side notch 640 hold the strap 641 from sliding forward or backward when the strap is sufficiently tightened around the body portion 642 of the laptop 638 and the tray 637 of the laptop shelf 635. This in turn secures the laptop 638 onto the top surface of the tray 637 of the laptop shelf 635. This design benefits from the fact that the strap 641 used to secure the laptop 638 in place on the top surface of the tray 637 is not permanently connected to the laptop shelf 635 and may be removed when it is not required.

Figure 47:
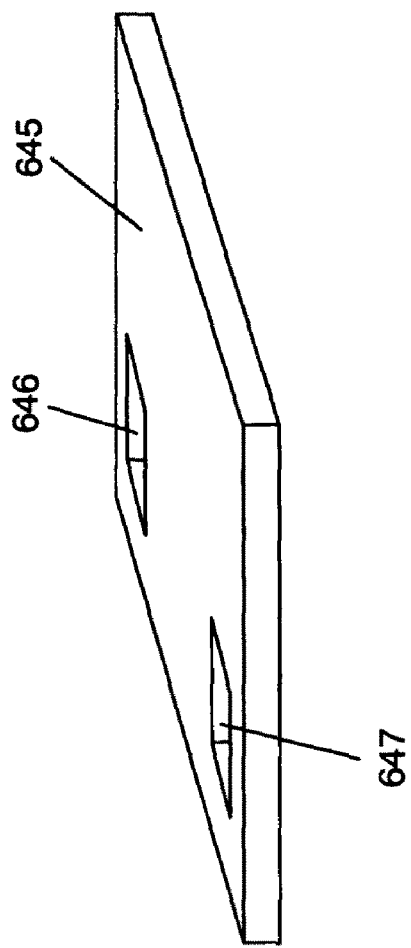
FIG. 47 is a diagram of a laptop shelf tray with slots in the rear corners of the tray.

FIG. 47 depicts a tray portion 645 of a laptop shelf with slots 646 and 647 in the rear corner portions of the laptop shelf tray 645 passing from the top surface of the laptop shelf tray 645 through the body of the laptop shelf tray 645 and out the bottom surface of the laptop shelf tray 645. A strap used to secure a laptop to the laptop shelf tray 654 of a laptop shelf as described in the embodiment with relation to FIG. 46 could be threaded through the slots 646 and 647 in FIG. 47 instead of the notches 639 and 640 in FIG. 46 in order to secure the strap 641 from sliding forward or backward.

While the notches 639 and 640 in FIG. 46 and the slots 646 and 647 in FIG. 47 are shown to be in the rear portion of the laptop shelf trays 637 and 645, these notches 639, 640 and slots 646, 647 could be positioned elsewhere on the laptop shelf trays 637, 645 in order to properly secure the strap 641 that is used to secure the laptop 638 to the trays 637, 645 of the laptop shelf 635.

FIG. 48 depicts a tray portion 650 of a laptop shelf with one strap 652 that is connected to the left rear side of the laptop shelf tray 650 and one strap 651 that is connected to the right rear side of the laptop shelf tray 650. The strap 651 and the strap 652 may be pulled up and over a laptop that is placed on the top surface of the laptop shelf tray 650 and connected together tightly over the top surface of the laptop in order to securely hold the laptop to the top surface of the laptop shelf tray 650. The straps 651, 652 may be made of nylon or other flexible material and may employ Velcro as the strap in FIG. 18 depicts or a loop and Velcro as the strap in FIG. 19 depicts in order to be connected together and tightened and secured in the tightened position around the body portion of the laptop and the laptop shelf tray 650. Additionally, the straps 651, 652 made of nylon or other flexible material may instead employ a snap-in buckle as the strap in FIG. 17 depicts in order to be connected together, tightened and secured around the body portion of the laptop and the laptop shelf tray 650.

While FIG. 48 depicts two straps 651, 652 connected to each side of the laptop shelf tray 650, the strap may instead be one continual piece with one end of the continual piece of strap connected to one side of the laptop shelf tray 650 and the other end connected to the other side of the laptop shelf tray 650. In this case the strap may be adjustable in length or may be made of an elastic material so that it can be expanded in order to allow the laptop to be placed underneath it and then contracted in order to hold the laptop securely on the top surface of the laptop shelf tray 650.

In all of the above embodiments, some or all portions of the back plates and the trays of the laptop shelves may be transparent so that the user can see any portion of the exercise machine control console that is blocked by the laptop shelf back plate or tray by looking through the transparent portions of the back plate or tray when the laptop shelf is attached to the exercise machine control console or other component of the exercise machine. In addition, some portions of the back plates and of the trays may be not solid, that is, may have cutout holes so that the user can see portions of the exercise machine control console that are blocked by the laptop shelf back plate or tray by looking through the non-solid portions of the back plate or tray when the laptop shelf is attached to the exercise machine control console or other component of the exercise machine. This may be desirable in order to allow the exerciser to view the readouts on the exercise machine control console such as elapsed time spent exercising and the level of difficulty while the laptop shelf is attached to the exercise machine control console or other component.

In addition, while this specification primarily focuses on the invention used in conjunction with stationary exercise machines and exercise equipment, it will be apparent to those skilled in the art to which the invention pertains that the invention could be used in conjunction with other apparatus where a person engaging with the apparatus would benefit from the ability to attach the invention to the apparatus and place a computer on the invention in order to view content on the computer. One example of such a scenario includes attaching the invention to the box seat in a sporting venue where the user could utilize the invention with a computer to watch instant replays on the Internet or get sports statistics for the sporting match that they are watching.

A description on various mechanisms to generate revenue through the current invention is now described. One revenue stream may be based on selling the invention to consumers. The invention may be sold through online stores, retail stores, wholesale outlets, catalogues, magazine, phone sales or infomercials. The invention could be sold as a stand-alone product or bundled together with laptop computers, exercise machines or with computer games and/or computer game control consoles.

Another revenue stream may be based on selling the invention to commercial health clubs so that the health club would then offer the invention to their members for use in the health club. Another revenue stream may be based on selling the invention to hotels so that the hotels would then offer the invention to their clientele for use in the hotel gyms. Another revenue stream may be based on selling the invention to businesses that offer a corporate gym to their employees so that the businesses would then offer the invention to their employees for use in the corporate gym.

Another revenue stream may involve paid advertisements by manufacturers of products or services that would pay to have their products and logos featured on the invention. One example would be for a shoe manufacturer to advertise its running shoe on the invention since users of the invention often buy running shoes. Another example would be for a bicycle manufacturer to advertise its products to users of the invention riding a stationary bike. Another example would be for a television network to advertise its television shows that are available online on the invention since users of the invention consume online entertainment. The advertisements may be static such as decals placed on the invention or may be animated advertisements shown on the LCD displays on the invention as described above.

Another revenue stream may involve producers of online content paying for one of the buttons on the invention to be hardwired to their website address. As discussed above, the button would then be programmed to direct the user's laptop Internet browser to their particular website address. The user of the invention may be therefore more inclined to visit the sponsor's website address due to the convenience of the using the button programmed to the website address rather than using the laptop's keyboard and mouse to visit a different website address.

Another revenue stream may involve creating and selling content for use with the invention. This content could include websites, audio, video and animated content, and could be available online or through a CD or DVD. The content could be produced to entertain users of the invention during their workout. This revenue stream could be fee based whereupon the viewers of the content pay a single-use or monthly fee. This revenue stream could also be advertisement based whereupon the entertainment content could include paid advertisements. In addition, the content could also contain advertisements embedded into the content. If the content is provided online, the website that provides the content could also sell online advertising such as banner ads. Another revenue stream could involve licensing or selling the entertainment content to other online websites such as Yahoo and AOL.

Another revenue stream may involve creating an online fitness portal that contains not only content for use with the invention but also online functionality that helps the user of the invention with their workouts. This functionality could include online schedules of their various workouts, endurance tracking of their training, weight loss management, etc. The fitness portal could then offer fee-based services to the users of the site as well as selling advertising on the site such as banner ads. The fitness portal could also partner with other online portals to cross-promote the other portals and other products and services offered through the other portals.

Another revenue stream may involve addressing the youth obesity problem currently facing the United States by working with private and governmental agencies to fund the creation of fitness programs that utilize the invention for use by children. This may involve providing the invention to junior high and high schools for use with exercise equipment and may involve creating online entertainment specifically tailored to children to entertain them while exercising and using the invention.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A device for supporting equipment and for attaching to an apparatus, comprising:
   a tray which is configured to support the equipment and at least one surface of which includes a plurality of successive mounting locations that each comprise shapes in the at least one surface; and
   a back plate configured to attach to the apparatus, the back plate having an opening through which a portion of the tray extends and which is configured to engage the shapes of any of the mounting locations,
   wherein the shapes of each successive mounting location are configured so that the angle of the tray relative to the back plate is determined by which mounting location is engaged by the opening.

2. The device of claim 1, further comprising a strap coupled to the back plate for attaching the back plate to the apparatus.

3. The device of claim 2, wherein the back plate includes at least one slot through which the strap passes.

4. The device of claim 1 wherein the shapes of each mounting location include a downward tooth or a step.

5. The device of claim 1 wherein the shapes of each mounting location include a downward tooth and notch.

6. The device of claim 1 wherein the shapes of each mounting location include an upward lip extending from a top surface of the tray and at least one downward tooth and notch included in a bottom surface of the tray.

7. The device of claim 1 wherein the plurality of mounting locations are contiguous.

8. The device of claim 1, wherein the tray includes a computer.

9. The device of claim 1 wherein the opening is rectangular.

10. The device of claim 9 wherein the shapes of the plurality of mounting locations include an upward lip and at least one downward tooth and notch, wherein the opening includes a top edge having a back surface and a bottom edge, and wherein the upward lip engages the back surface and the at least one downward tooth and notch engage the bottom edge.

11. A device for supporting equipment and for attaching to an apparatus, comprising:
    a tray which is configured to support the equipment and which includes an upward lip and at least one downward tooth and notch that are located adjacent to each other; and
    a back plate configured to attach to the apparatus, the back plate having an opening through which a portion of the tray extends and having a bottom edge and a top edge having a back surface;
    wherein the upward lip presses against or contacts the back surface and the at least one downward tooth and notch press against or contact the bottom edge.

12. The device of claim 11, further comprising a strap which secures the back plate to the apparatus.

13. The device of claim 12, further comprising a slot in the back plate through which the strap passes.

14. The device of claim 12, further comprising an equipment strap for securing the equipment to the device.

15. The device of claim 11, further comprising at least one programmable button.

16. The device of claim 11, wherein the tray includes a computer.

17. A device for supporting a computer laptop and for attaching to an exercise apparatus, comprising:
    a tray for supporting the computer laptop, the tray including an upward lip and a plurality of downward pointing alternating teeth and notches;
    a back plate which is configured to attach to the apparatus and which includes an opening through which a portion of the tray including at least the upward lip extends, the opening having a bottom edge and a top edge having a back surface;
    wherein the tray is adjustably mounted to the back plate by the upward lip pressing against or contacting the back surface, and one of the downward teeth and notches pressing against or contacting the bottom edge; and
    a strap for attaching the back plate to the exercise apparatus.

18. The device of claim 17 wherein the tray includes a computer.

19. The device of claim 17 wherein the back plate is configured to attach to a treadmill.

20. The device of claim 17 wherein the back plate is configured to attach to a stationary bike.

* * * * *